US011753184B2

(12) United States Patent
Smith et al.

(10) Patent No.: US 11,753,184 B2
(45) Date of Patent: Sep. 12, 2023

(54) ASSEMBLY LINE FABRICATION AND ASSEMBLY OF AIRCRAFT WINGS

(71) Applicant: The Boeing Company, Chicago, IL (US)

(72) Inventors: Daniel R. Smith, Woodinville, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,286

(22) Filed: Nov. 10, 2021

(65) Prior Publication Data

US 2022/0153443 A1    May 19, 2022

Related U.S. Application Data

(60) Provisional application No. 63/115,056, filed on Nov. 18, 2020.

(51) Int. Cl.
*B64F 5/10* (2017.01)
*B23P 21/00* (2006.01)
(Continued)

(52) U.S. Cl.
CPC .............. *B64F 5/10* (2017.01); *B23P 21/004* (2013.01); *B23Q 9/0007* (2013.01); *B25J 11/005* (2013.01)

(58) Field of Classification Search
CPC ...... B64F 5/10; B23P 2700/01; B23Q 9/0007; B23Q 9/0042
See application file for complete search history.

(56) References Cited

U.S. PATENT DOCUMENTS 4,662,556 A * 5/1987 Gidlund .............. B23Q 9/0014
227/111
4,894,903 A * 1/1990 Woods ...................... B64F 5/10
29/559
(Continued)

FOREIGN PATENT DOCUMENTS

EP    2813350 A2    1/2015
EP    3048416 A1    7/2016
EP    3354396 A1    8/2018

OTHER PUBLICATIONS

Extended European Search Report regarding Application No. 21207585.7, dated Apr. 11, 2022, 7 pages.
(Continued)

*Primary Examiner* — Michael W Hotchkiss
(74) *Attorney, Agent, or Firm* — Yee & Associates, P.C.

(57) ABSTRACT

Systems, methods, and apparatus are provided for assembling a wing. Methods include coupling a robot arm to a bracket on a rib held against a wing panel, and operating the coupled robot arm to install shims between the rib and wing panel. Some methods further include mounting (e.g. detachably) the bracket, such as by aligning it with indexing features at the rib. In some methods, the bracket enforces a contour to the rib. Systems include a carriage coupled to a rib, and a robot arm extending therefrom that is operable to perform work (e.g. inspection, installing shims and/or fasteners, etc.) at an interface between the rib and a wing panel. Apparatus includes a robot arm dimensioned for placement at an interface between a rib and a wing panel, with the robot arm including an end effector to perform work upon the interface (e.g. inspection, installing shims and/or fasteners, etc.).

28 Claims, 35 Drawing Sheets

(51) Int. Cl.
*B25J 11/00* (2006.01)
*B23Q 9/00* (2006.01)

(56) References Cited

U.S. PATENT DOCUMENTS

| | | | | |
|---|---|---|---|---|
| 4,995,146 | A * | 2/1991 | Woods | B64C 3/185 269/910 |
| 6,073,326 | A * | 6/2000 | Banks | B21J 15/10 227/111 |
| 6,098,260 | A * | 8/2000 | Sarh | B21J 15/10 227/52 |
| 6,170,157 | B1 * | 1/2001 | Munk | B64F 5/10 29/407.01 |
| 6,210,084 | B1 * | 4/2001 | Banks | B23Q 9/0007 408/97 |
| 6,314,630 | B1 * | 11/2001 | Munk | B25B 5/163 29/469 |
| 6,467,385 | B1 * | 10/2002 | Buttrick | B27B 5/04 30/372 |
| 6,855,099 | B2 * | 2/2005 | Hazlehurst | B21C 51/005 33/286 |
| 7,076,856 | B2 * | 7/2006 | Sarh | B25B 11/005 29/796 |
| 8,479,394 | B2 * | 7/2013 | Glazebrook | B23P 19/10 382/152 |
| 8,657,274 | B2 * | 2/2014 | Hazlehurst | B21J 15/142 269/903 |
| 9,395,041 | B2 * | 7/2016 | Perla | B23K 31/02 |
| 9,486,917 | B2 * | 11/2016 | Reid | B25J 11/005 |
| 9,610,693 | B2 * | 4/2017 | Sarh | B25J 15/0052 |
| 9,669,919 | B2 * | 6/2017 | García Martín | B32B 37/1018 |
| 9,725,191 | B2 * | 8/2017 | Yamane | B23P 19/10 |
| 9,772,313 | B2 * | 9/2017 | Blom | G01N 29/043 |
| 9,776,330 | B2 * | 10/2017 | Day | B64F 5/10 |
| 10,137,544 | B2 * | 11/2018 | Batt | B23P 21/002 |
| 10,196,158 | B2 * | 2/2019 | Erickson | B25J 18/02 |
| 10,226,944 | B2 * | 3/2019 | Kerr | B64F 5/40 |
| 10,232,897 | B2 * | 3/2019 | Hafenrichter | B25J 15/0019 |
| 10,265,760 | B2 * | 4/2019 | Dixon | B23B 35/00 |
| 10,518,483 | B2 * | 12/2019 | Nesbit | B23P 19/04 |
| 10,906,157 | B2 * | 2/2021 | Olberg | B25H 1/02 |
| 11,267,586 | B2 * | 3/2022 | Yamane | B25B 11/02 |
| 2003/0207742 | A1 * | 11/2003 | Hazlehurst | B23Q 16/00 29/430 |
| 2007/0036618 | A1 * | 2/2007 | Fritsche | B23Q 1/28 408/56 |
| 2008/0155807 | A1 * | 7/2008 | Toh | B23P 19/04 29/700 |
| 2008/0308211 | A1 * | 12/2008 | Crumpler | B23P 19/00 156/70 |
| 2009/0282668 | A1 * | 11/2009 | Sanchez-Brunete Alvarez | B23P 19/04 29/428 |
| 2010/0037444 | A1 * | 2/2010 | Reid | B23Q 9/0007 29/33 R |
| 2010/0122444 | A1 * | 5/2010 | Reid | B23Q 9/0007 29/243.54 |
| 2011/0243676 | A1 * | 10/2011 | Marguet | B23B 41/00 408/72 R |
| 2013/0031764 | A1 * | 2/2013 | Sarh | B25J 9/106 901/30 |
| 2013/0185925 | A1 * | 7/2013 | Sarh | B21J 15/105 29/283 |
| 2014/0305217 | A1 * | 10/2014 | Tapia | G01N 27/9013 901/44 |
| 2014/0365061 | A1 | 12/2014 | Vasquez et al. | |
| 2015/0266147 | A1 * | 9/2015 | Reid | B64F 5/10 29/525.01 |
| 2016/0046393 | A1 * | 2/2016 | Frauen | B25J 5/02 901/41 |
| 2017/0312923 | A1 * | 11/2017 | Erickson | B25J 18/02 |
| 2019/0329905 | A1 * | 10/2019 | Chan | B23Q 9/0007 |
| 2020/0002025 | A1 * | 1/2020 | Papendick | B64C 1/061 |
| 2021/0094133 | A1 * | 4/2021 | Sato | B23P 19/04 |
| 2022/0055165 | A1 * | 2/2022 | Midyette | B23Q 9/005 |
| 2022/0097869 | A1 * | 3/2022 | Urmston | B64C 3/187 |

OTHER PUBLICATIONS

Netherlands Patent Office Written Opinion and Search Report with English Translation, dated Jun. 29, 2021, regarding Application No. NL2027421; 12 pages.

* cited by examiner

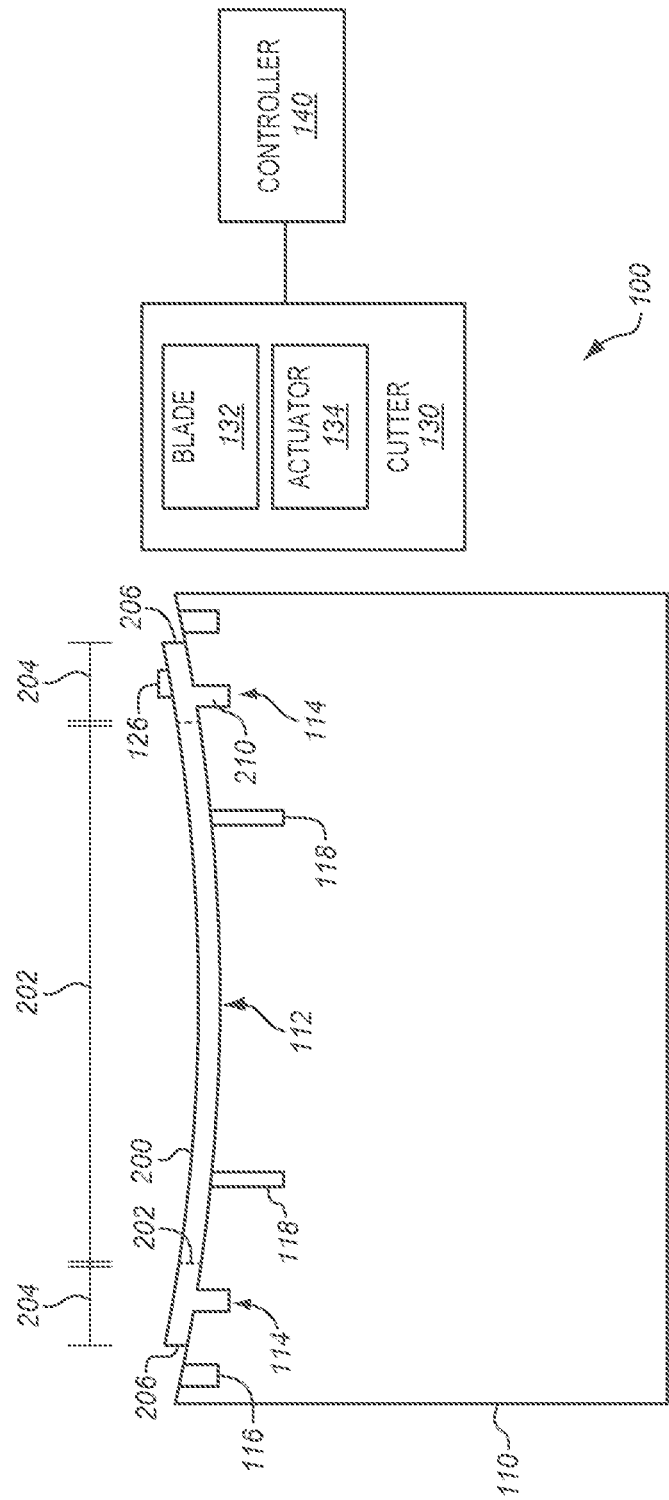

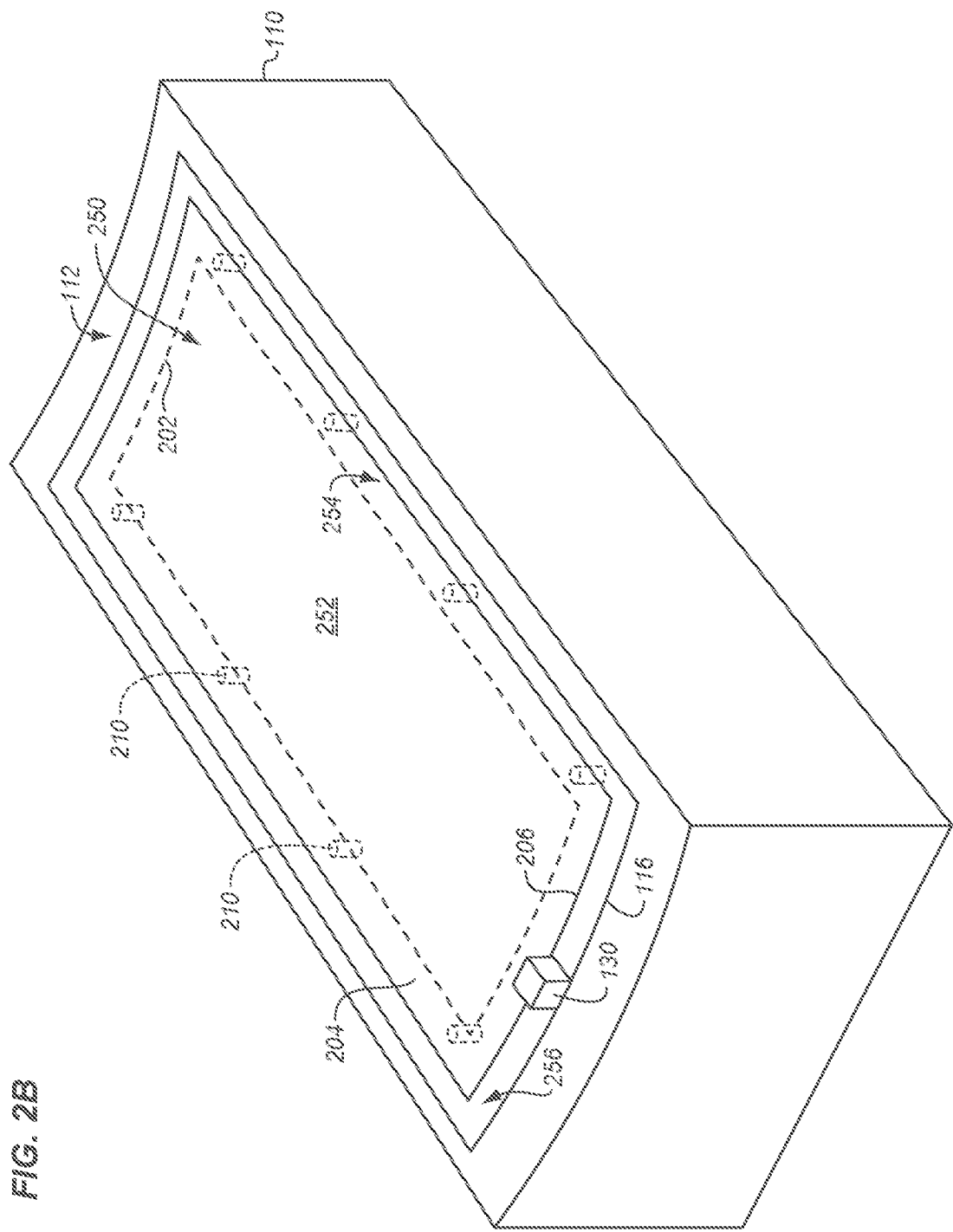

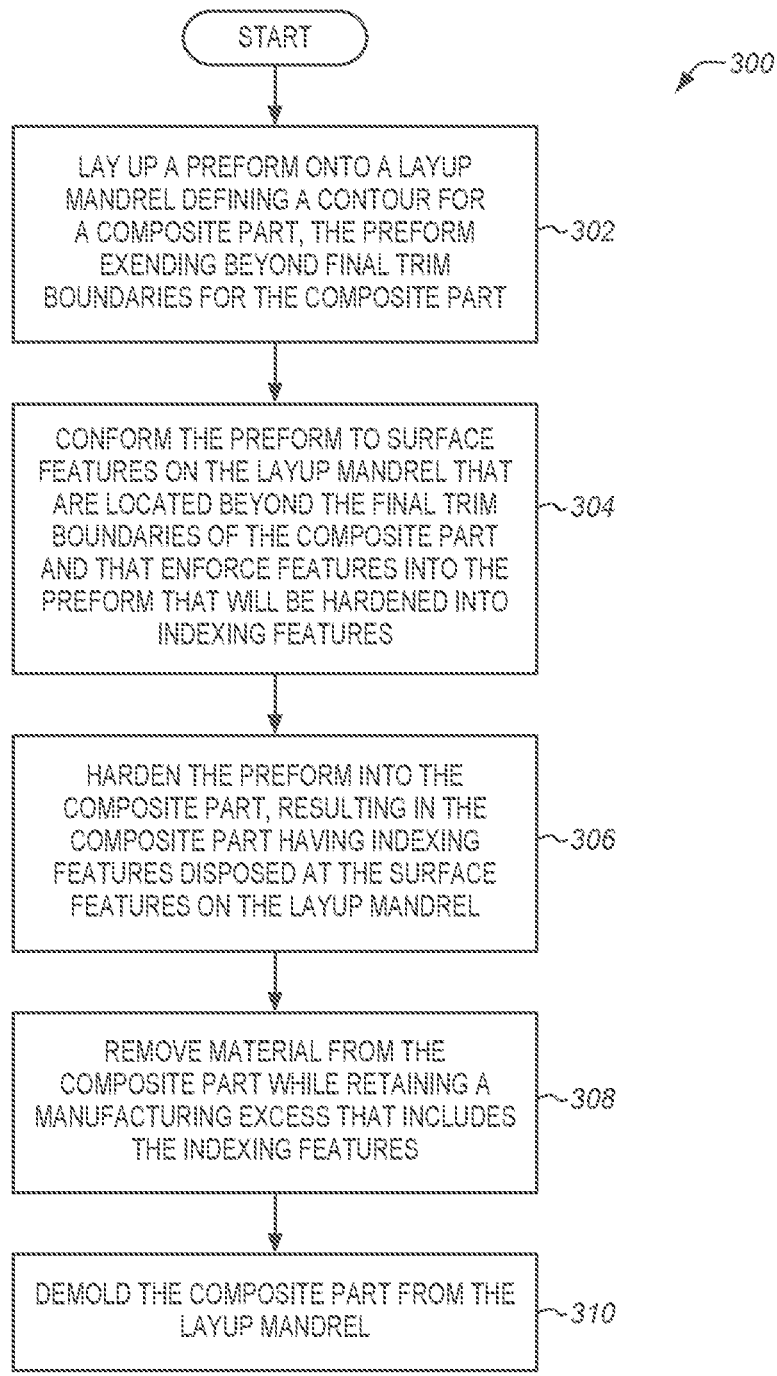

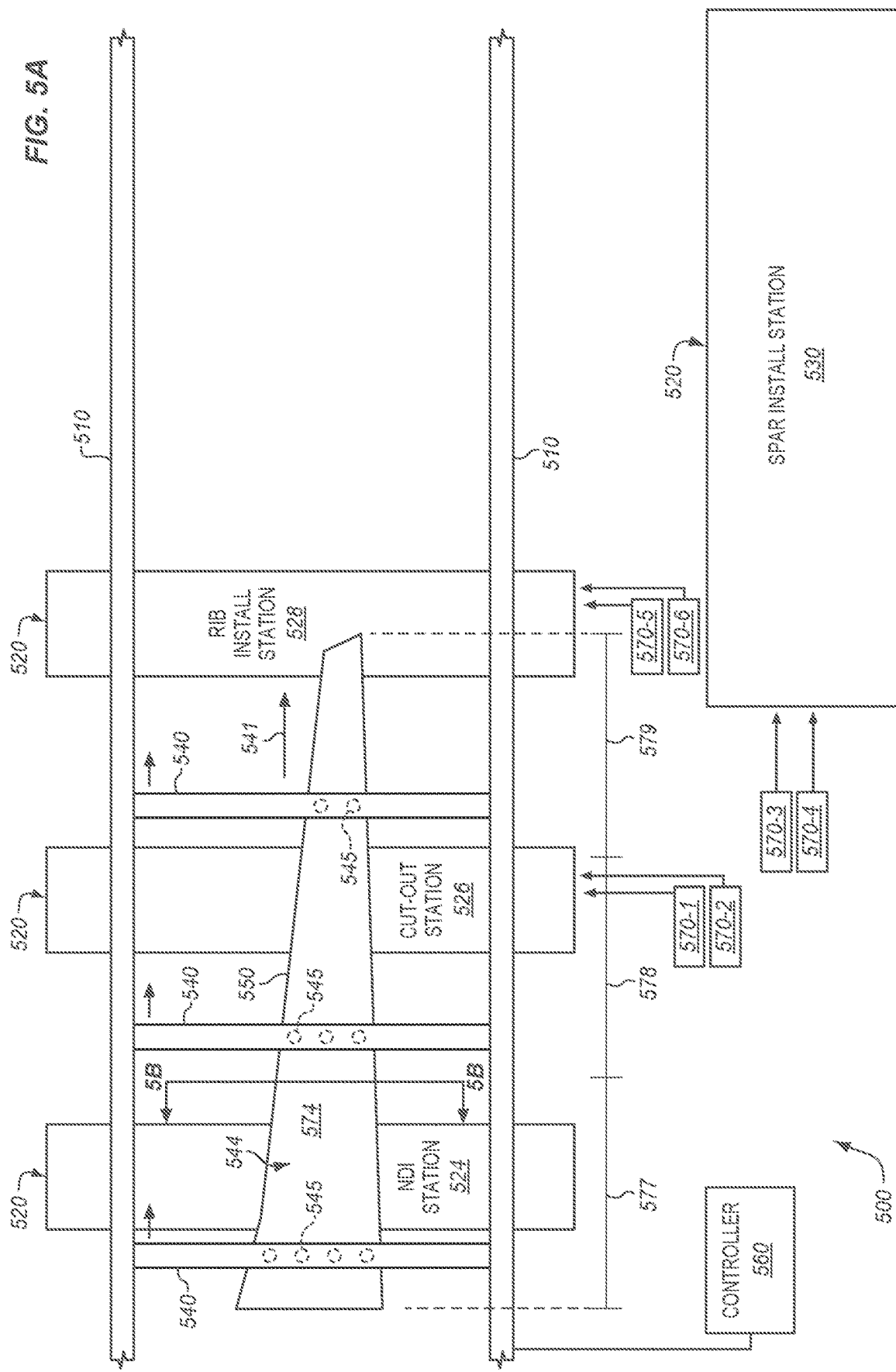

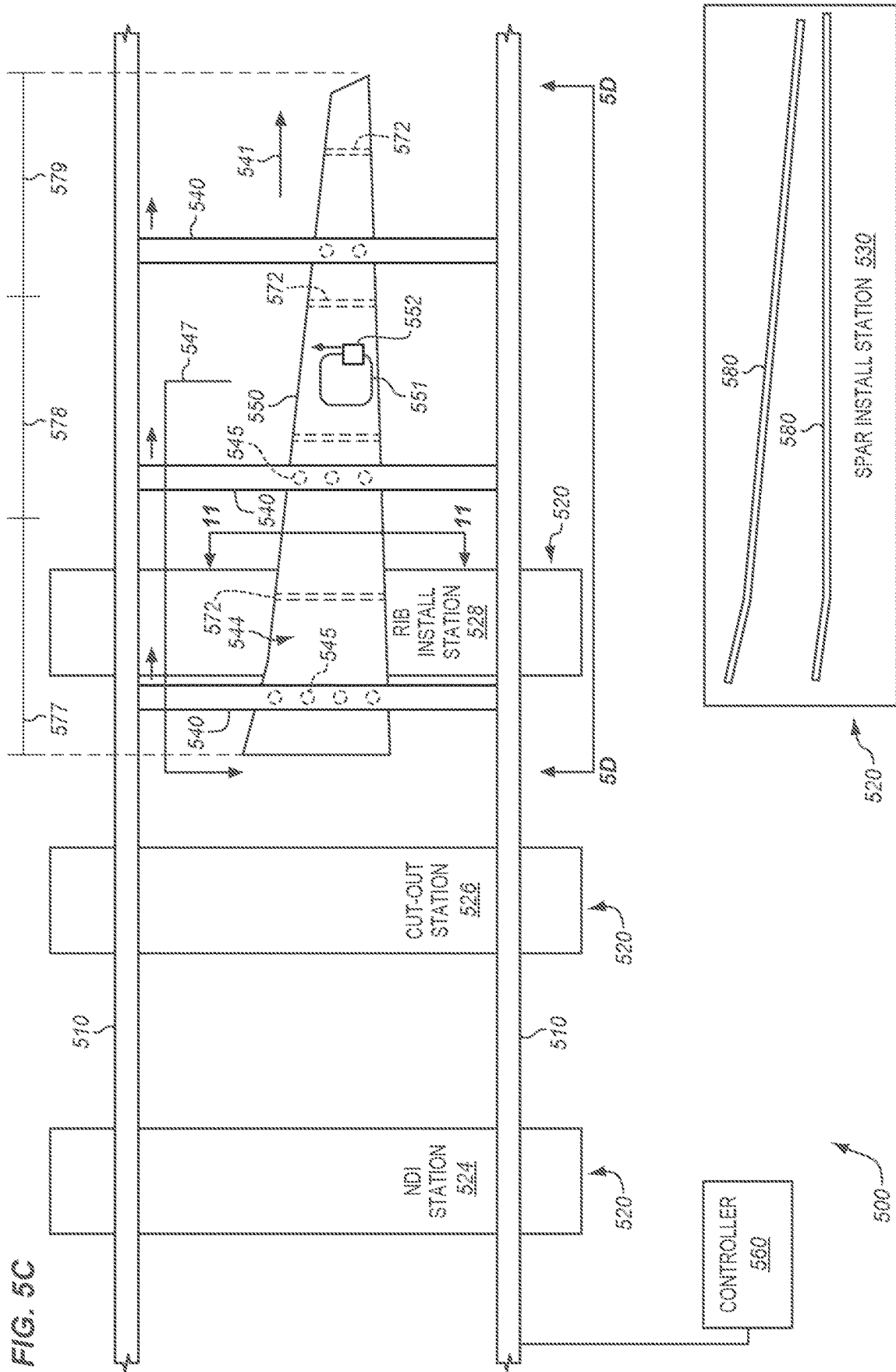

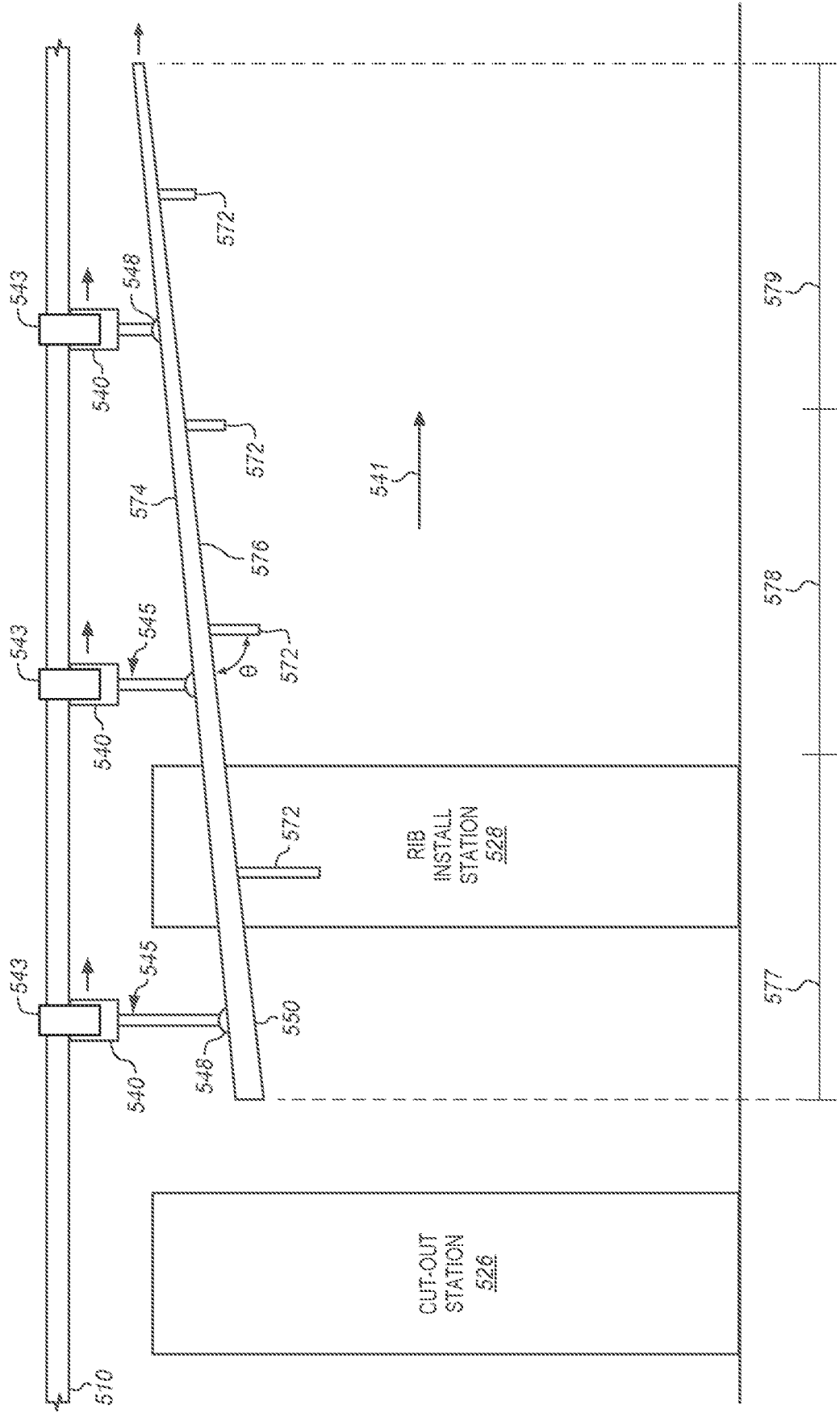

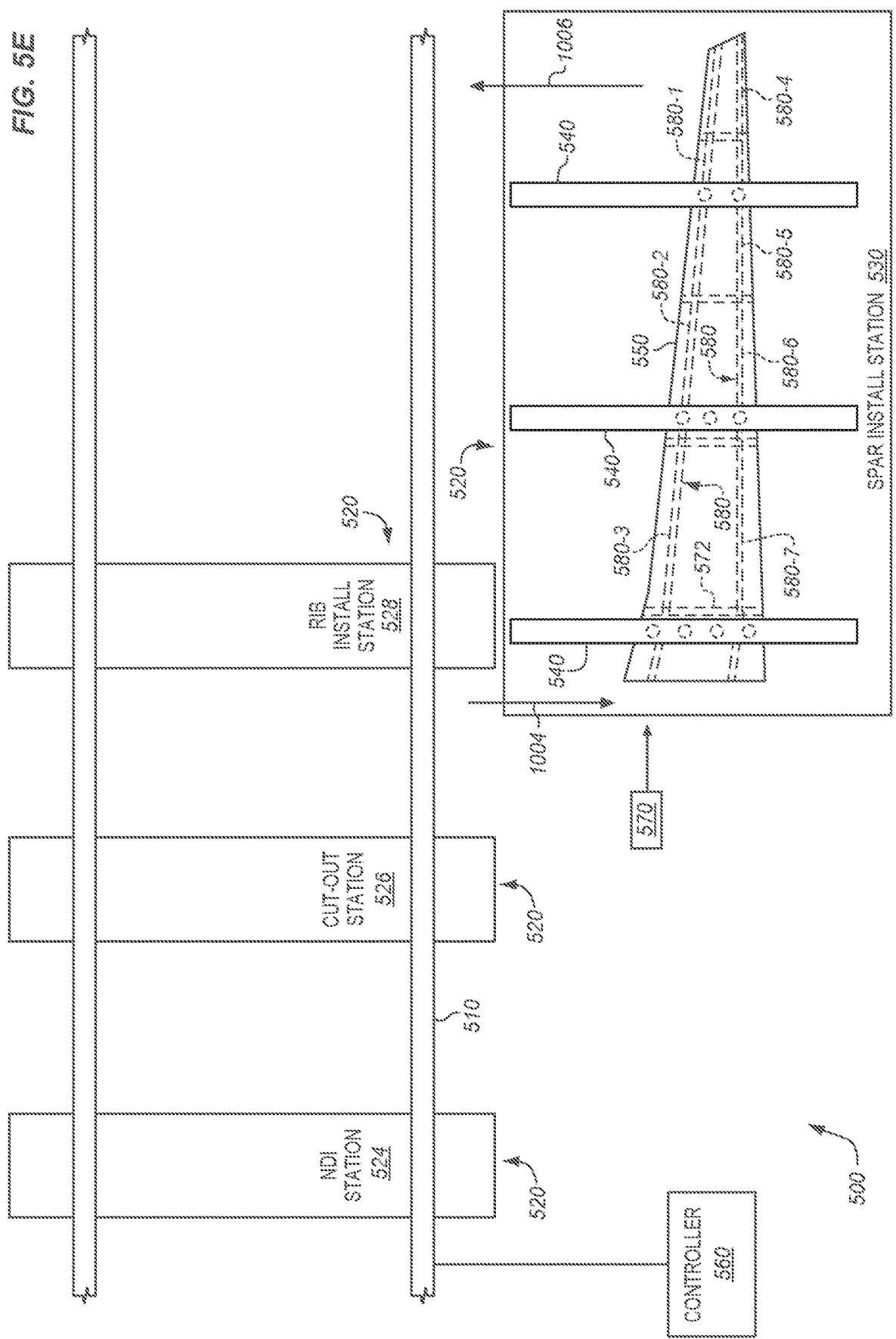

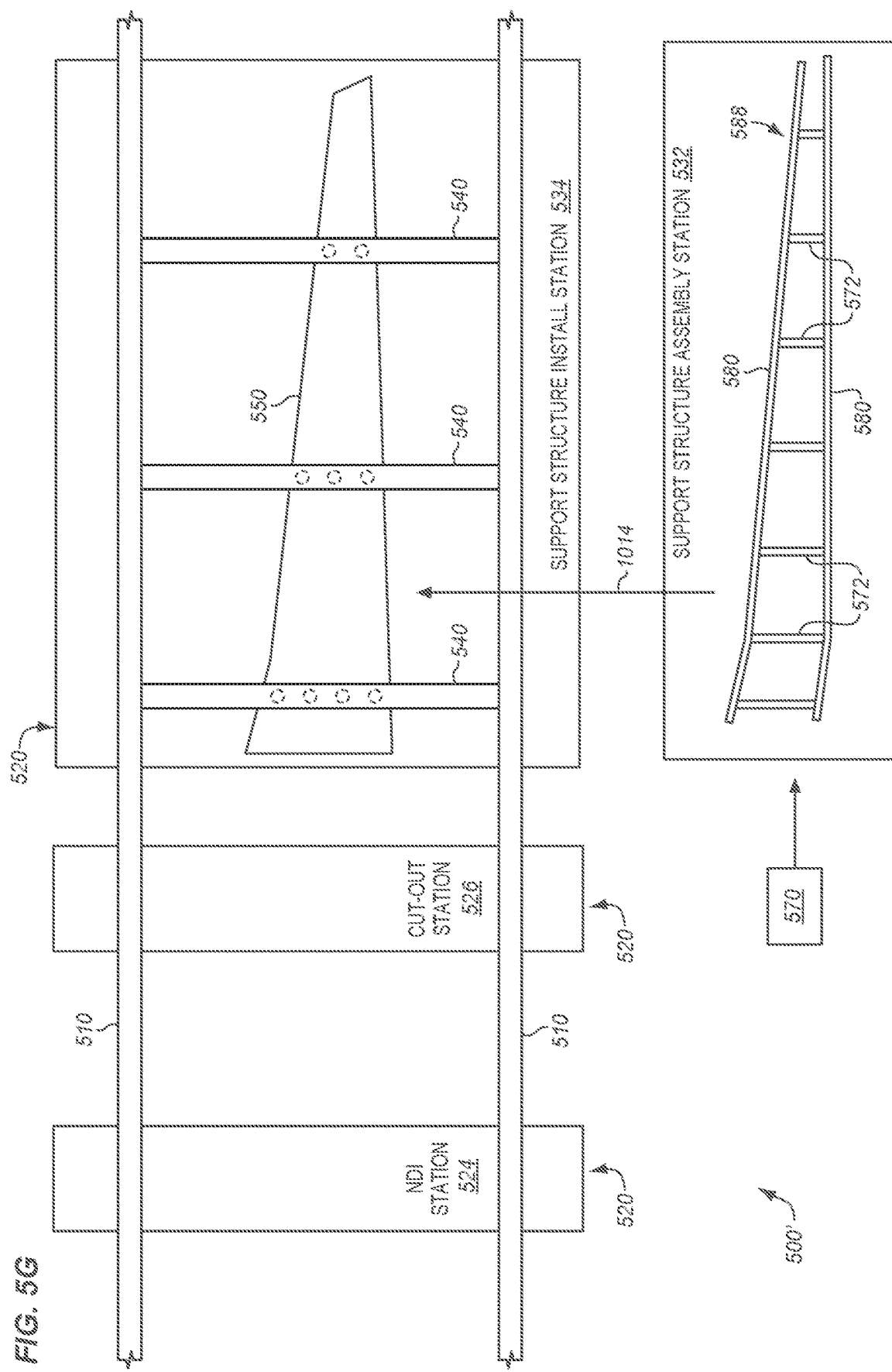

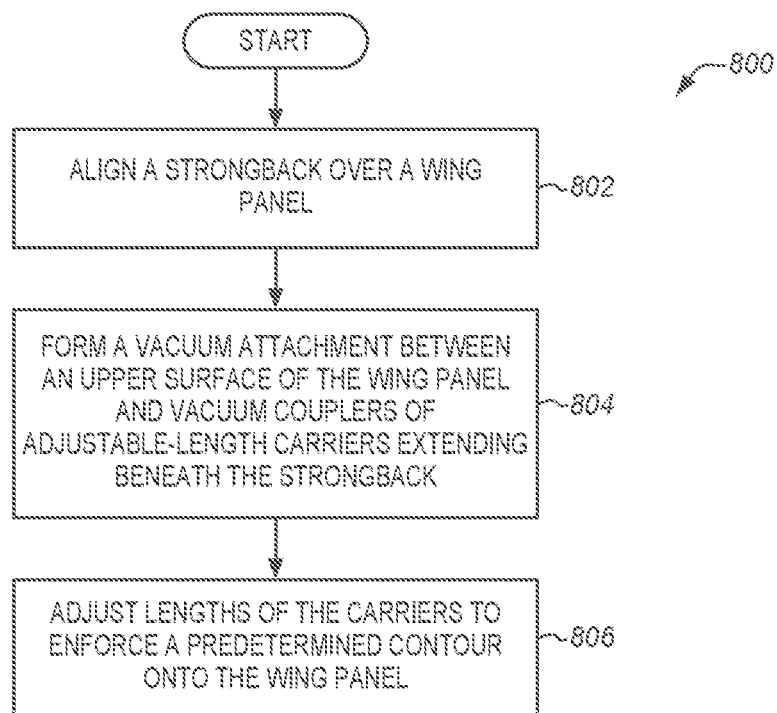

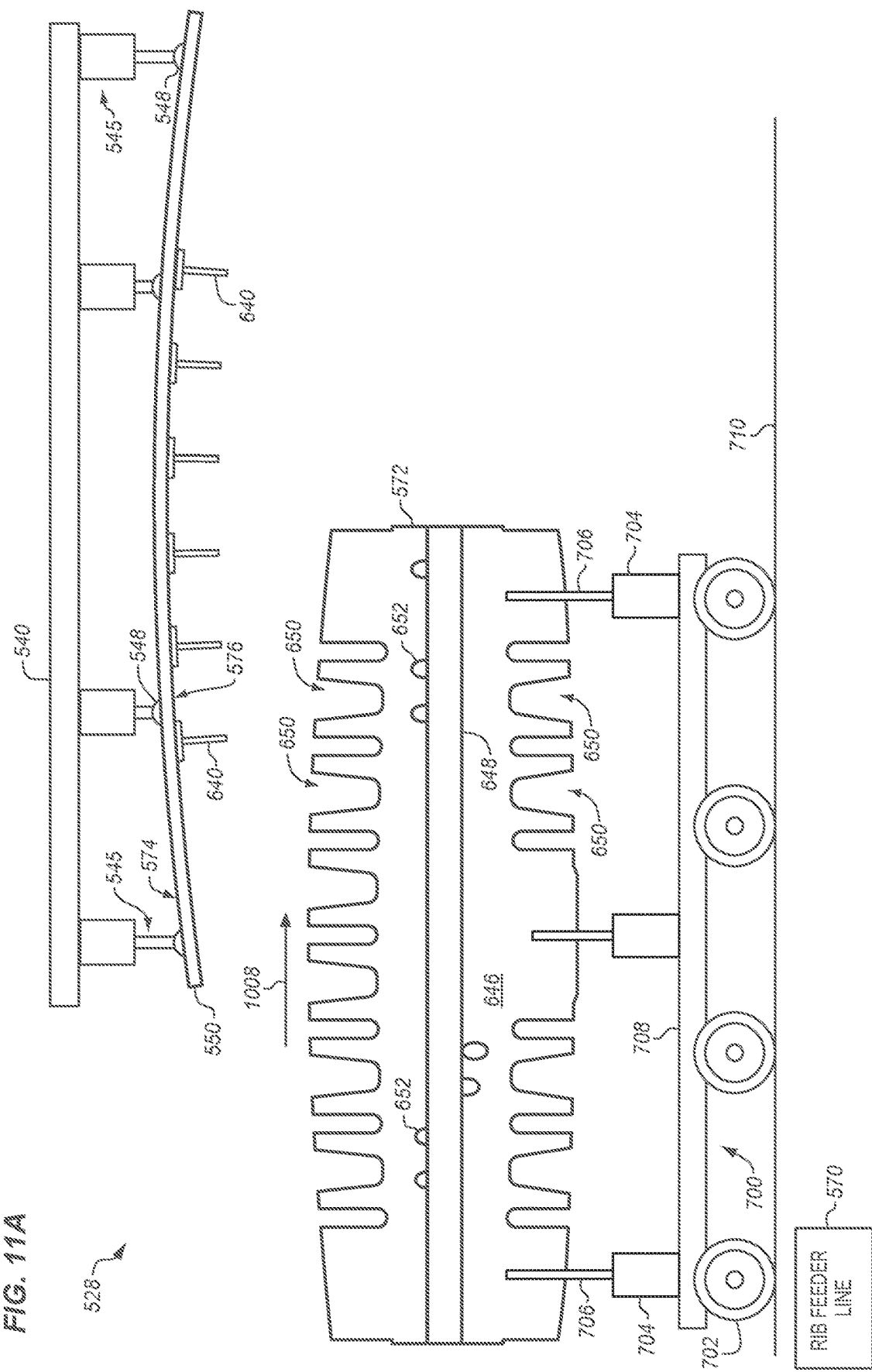

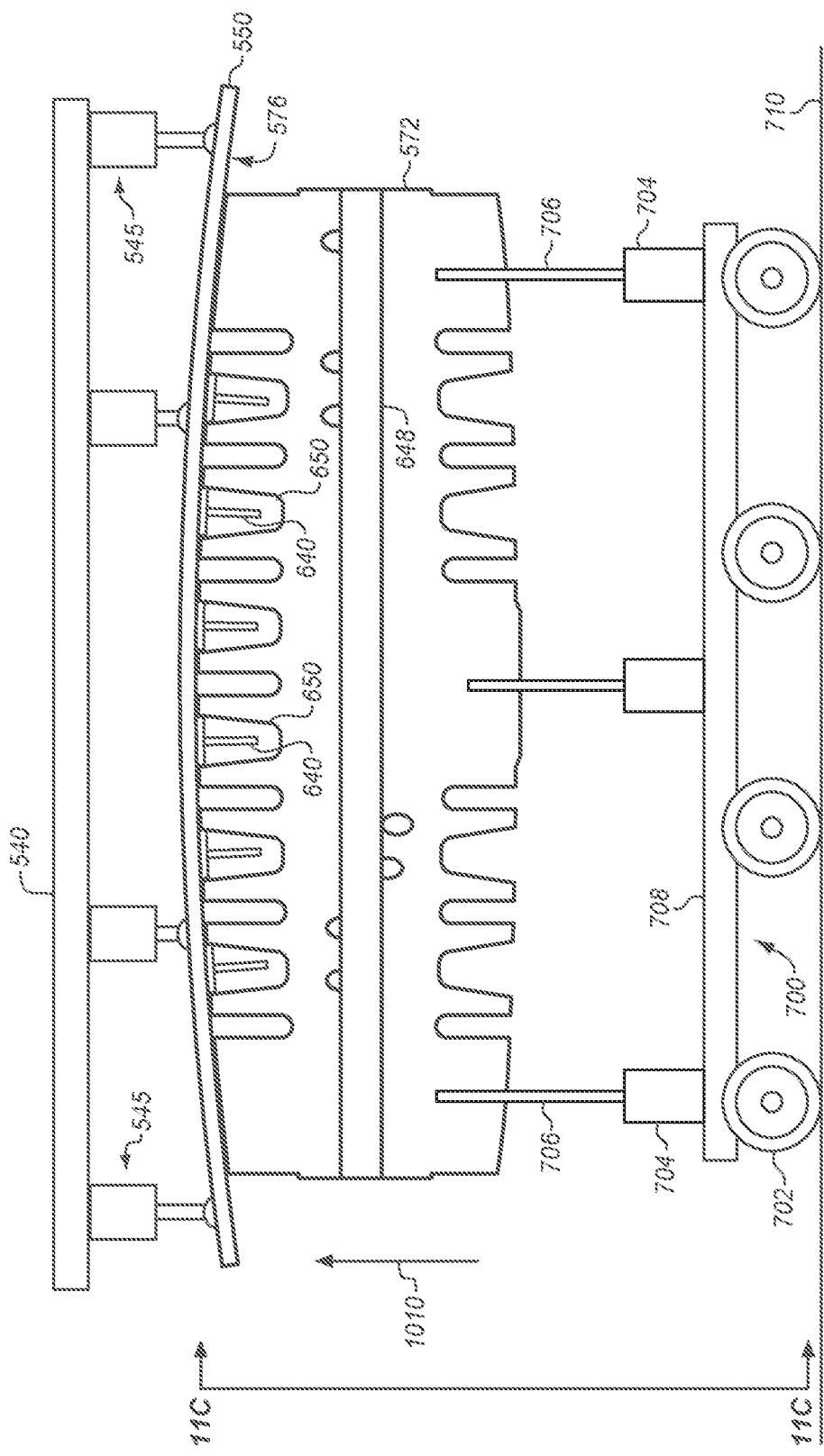

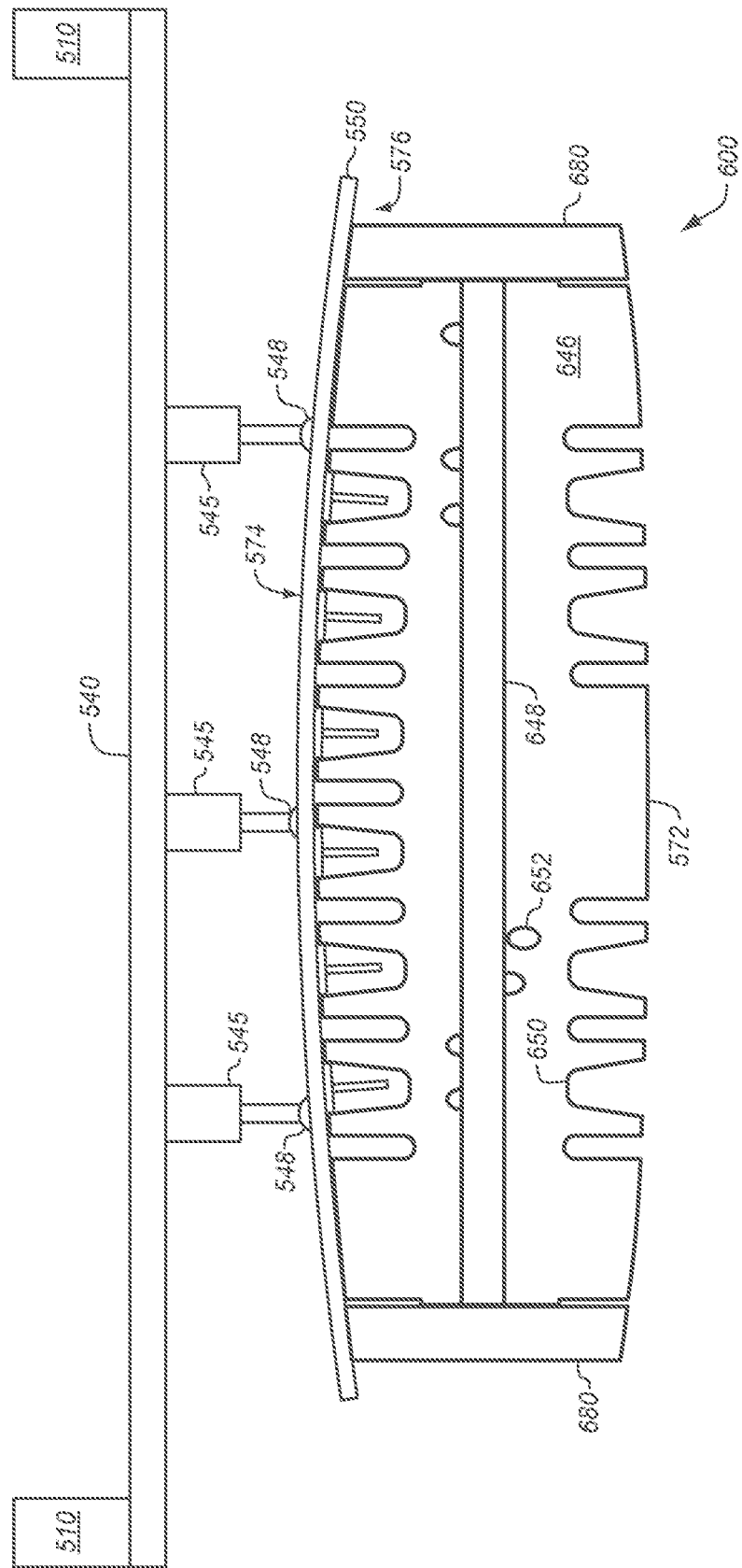

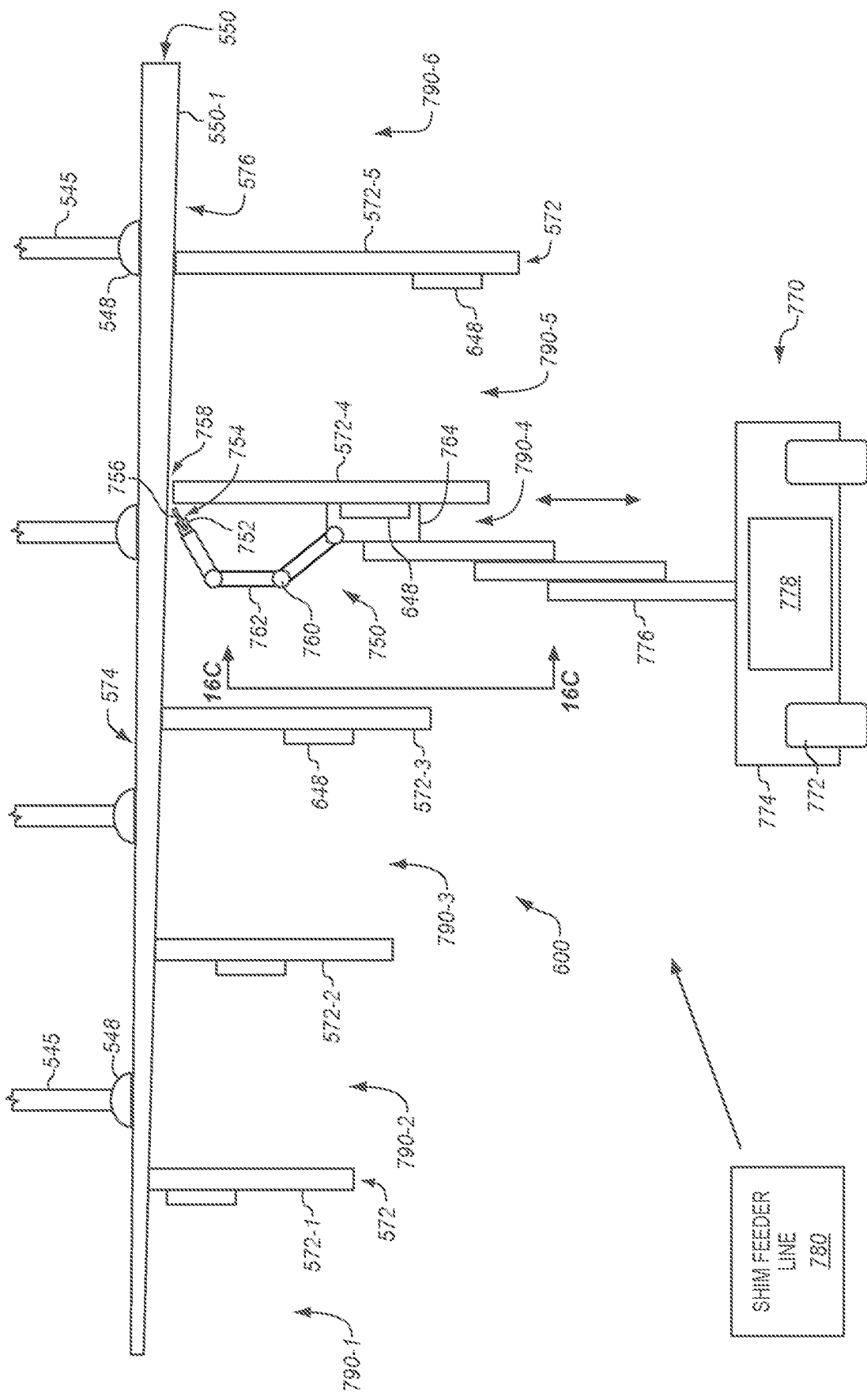

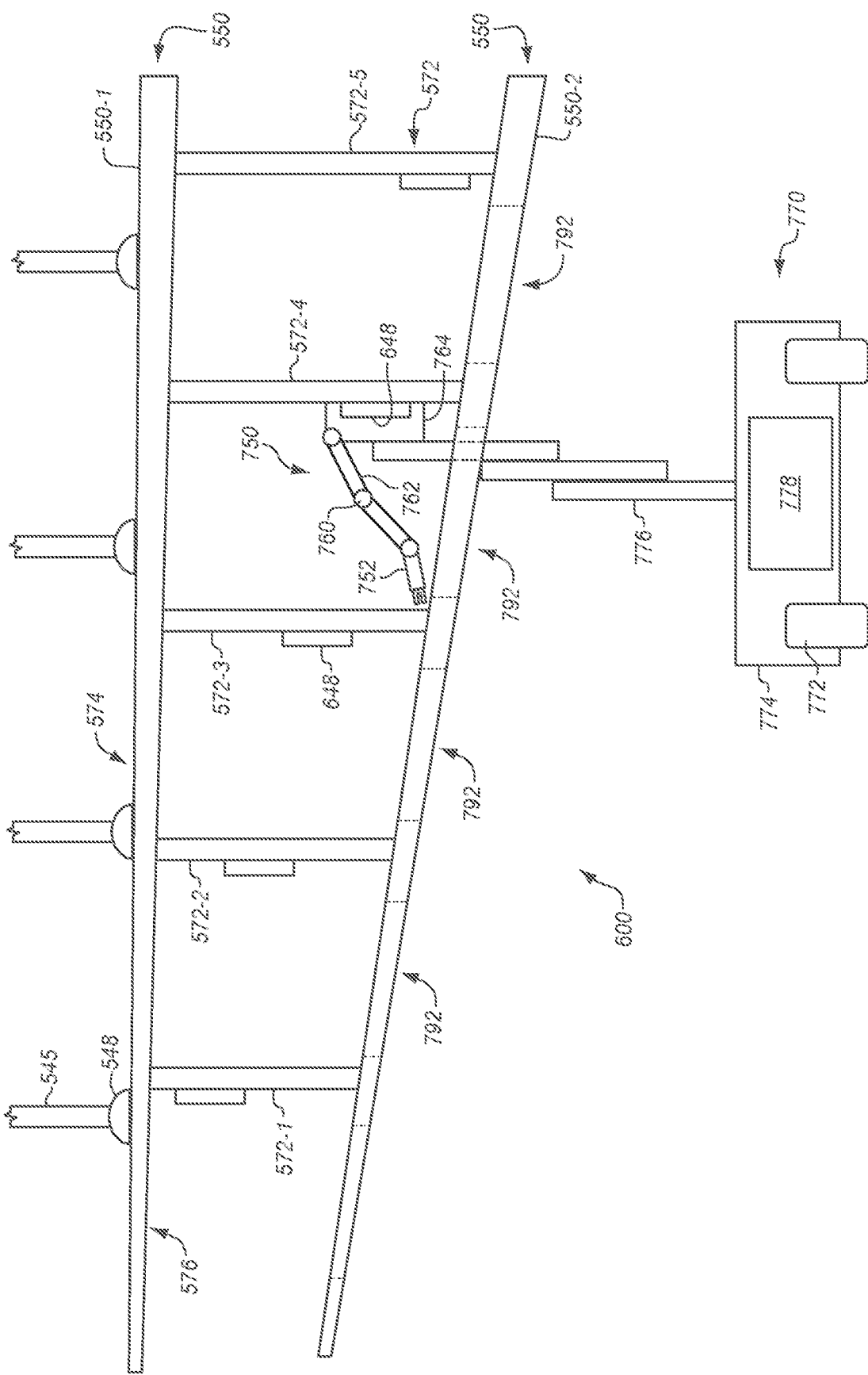

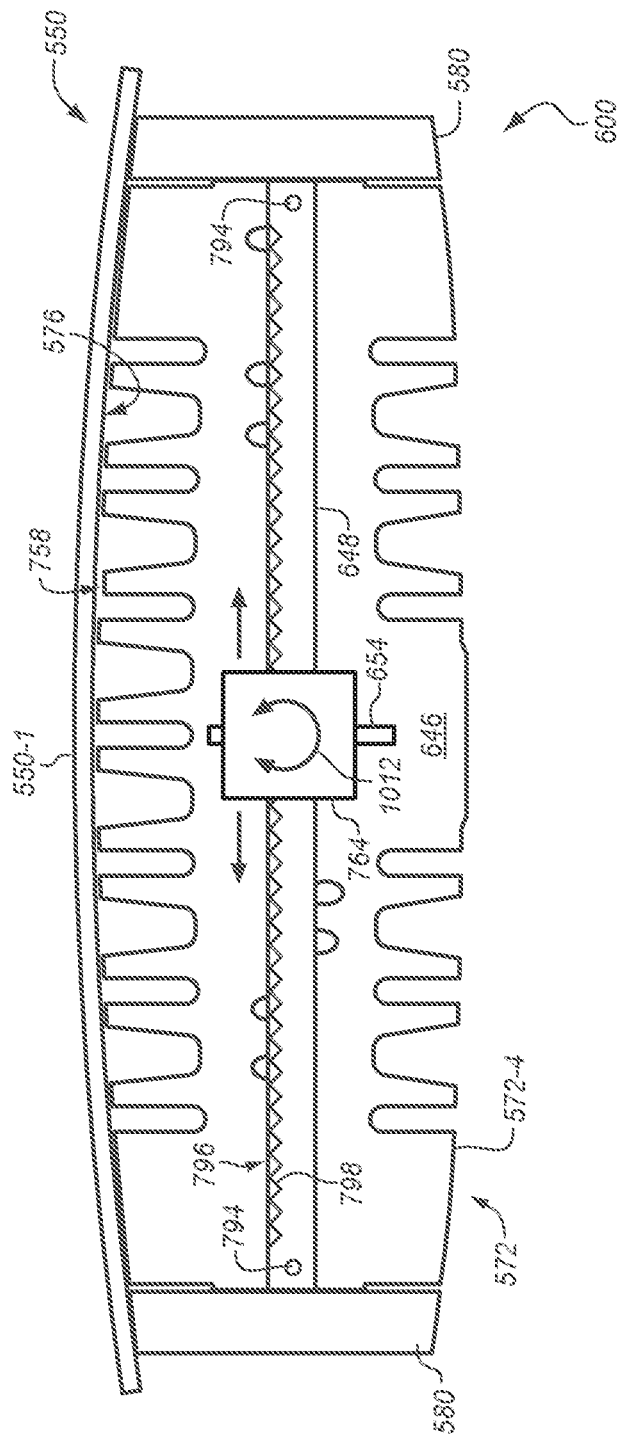

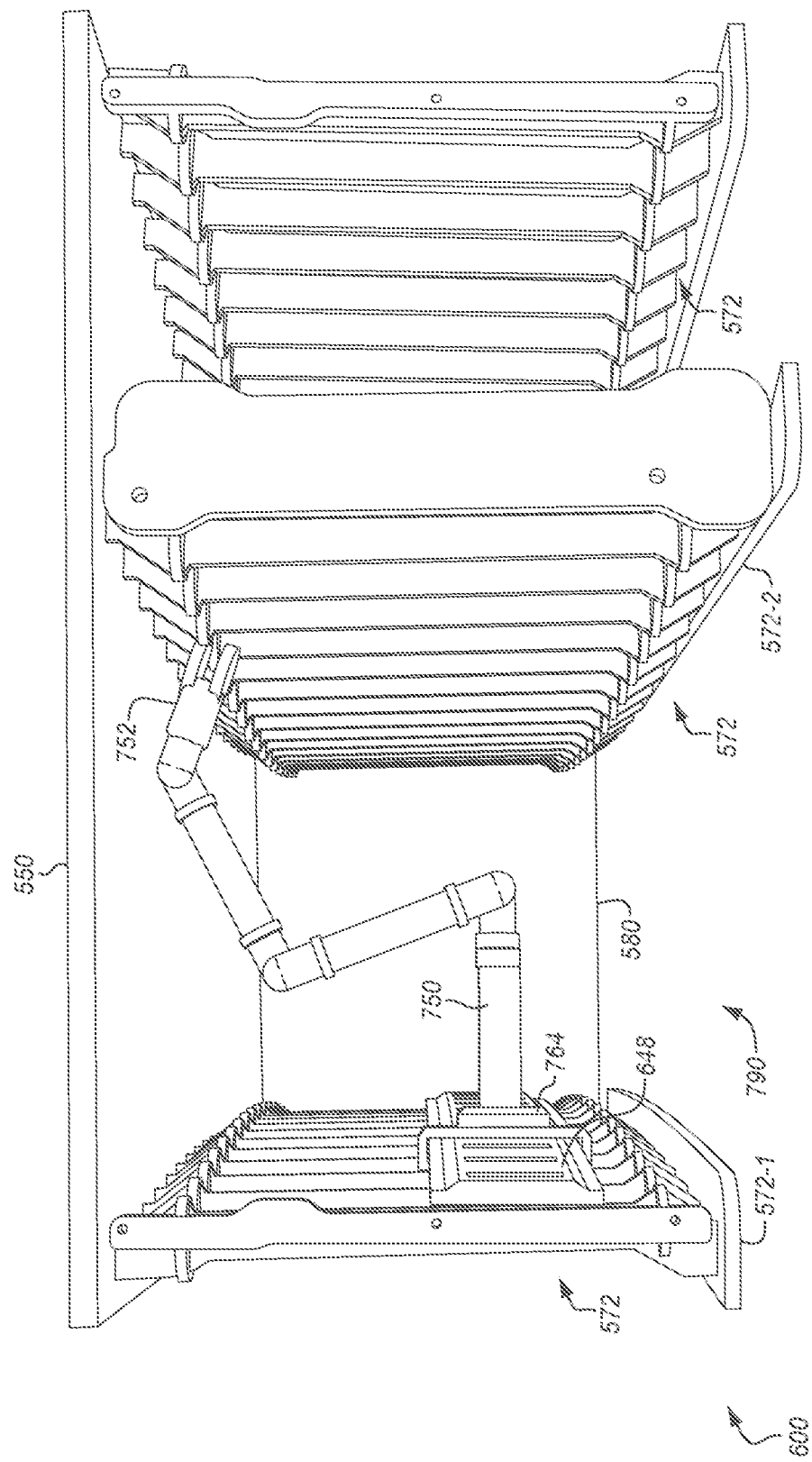

ASSEMBLY LINE FABRICATION AND ASSEMBLY OF AIRCRAFT WINGS

CROSS-REFERENCE TO RELATED APPLICATION

This application claims the benefit of U.S. Provisional Patent Application Ser. No. 63/115,056, filed Nov. 18, 2020, and entitled "Assembly Line Fabrication and Assembly of Aircraft Wings;" which is incorporated herein by reference in its entirety.

FIELD

The disclosure relates to the field of aircraft, and in particular, to fabrication and assembly of aircraft wings.

BACKGROUND

An airframe defines the mechanical structure of an aircraft. Airframes are made of multiple components that provide desired structural properties. For example, a portion of an airframe for a wing of an aircraft may include components that are mechanically coupled together (e.g., via co-bonding, co-curing, or fasteners) in accordance with design parameters. In particular, a wing assembly generally includes upper and lower wing panels, each of which include a wing skin stabilized by a series of stringers, that together sandwich a support structure consisting of forward and rear spars that extend along the span of the wing panels, and that are connected together by a series of parallel ribs that each extend chordwise across the wing panels. As presently practiced, components of an airframe are fabricated and assembled in predefined cells on a factory floor. For example, components may be laid-up, cured, or otherwise fabricated at one cell, and then may be transported in their entirety to a new cell where work is performed.

While the fabrication processes discussed above are reliable, they encounter delays when work at a specific portion of a component is completed more slowly than expected. For example, if a particular portion of a wing takes longer than expected to be laid-up or fastened together, then the entire wing assembly remains at the cell until all of the work that has been delayed is completed. Furthermore, after a component has been moved, a great deal of time is spent cataloging the configuration of the component. This time is not value-added time. Furthermore, frequent moves between cells add a substantial amount of time that is not value-added. That is, each movement of a component between cells (and hence, each cell used in the fabrication process) requires setup time, and this setup time should be minimized to enhance efficiency. Current designs utilize automated optical inspection techniques and/or probes to inspect position of parts along six degrees of freedom across their dimensions, but these are particularly time-consuming and expensive processes.

Therefore, it would be desirable to have a method and apparatus that take into account at least some of the issues discussed above, as well as other possible issues.

SUMMARY

Embodiments described herein provide for enhanced systems and techniques that facilitate fabrication and assembly of aircraft wings via an assembly line. According to these embodiments, large components such as wing panels are transported in pulses or moved continuously. Discrete work stations disposed along the assembly line perform various work tasks on the component (e.g., during pauses between pulses or while the component is moved continuously). As discussed in greater detail below, the embodiments herein focus on assembling a wing assembly by following the progress of a wing panel, to which other components (for example, ribs, and spars, and then another wing panel) are gradually installed, through an assembly line. In some embodiments, indexing features, for indexing the component (e.g., a wing panel) to one or more of the work stations, are formed into the component. In embodiments in which the component is a wing panel, indexing features are formed into a manufacturing excess region of the wing panel that will eventually be trimmed off, as part of the forming of the wing panel. The wing panel may be indexed to a work station by means of these indexing features. In some embodiments, work stations are disposed in close enough proximity to each other such that a wing panel, due to its size, may encounter multiple work stations simultaneously. For example, an assembly line may include a sequence of stations arranged in a process direction so that a forward portion of the wing panel first encounters an inspection station (such as a non-destructive inspection, or NDI, station), then a cut-out station, and then a rib install station, as it is moved in the process direction. These stations may be disposed closely enough to each other so that when, for example, a forward portion encounters the rib install station, a middle portion of the wing panel encounters the cut-out station, and a rearward portion encounters the NDI station, such that two or more of the stations, or all three, may perform work tasks on the portion of the same wing panel that is within the purview of the respective station, such as at the same time or overlapping in time. This assembly technique provides a technical benefit by integrating transportation processes into assembly processes, and by reducing the amount of work to be performed on a large component each time the component is moved.

Some embodiments are methods for inspecting a wing panel, in which the methods include: advancing the wing panel in a process direction through a Non-Destructive Inspection (NDI) station having one or more inspection heads, and inspecting a portion of the wing panel with one or more inspection heads at the NDI station. Some methods further include suspending the wing panel beneath a strongback, for example prior to advancing the wing panel through the NDI station, such that the wing panel remains suspended beneath the strongback during advancement through the NDI station and inspection at the NDI station. In some of such methods, suspending the wing panel includes affixing vacuum couplers of the strongback to a surface of the wing panel. Some methods further include enforcing a predetermined contour to the wing panel, such as during advancement and/or NDI inspection of the wing panel. Some methods further include indexing the wing panel to the NDI station.

Some embodiments are methods for inspecting a wing panel, in which the methods include: receiving a wing panel at a Non-Destructive Inspection (NDI) station having one or more inspection heads, and inspecting a portion of the wing panel with one or more inspection heads at the NDI station during movement of the wing panel through the NDI station. In some methods, inspecting is performed during pulsed or continuous movement of the wing panel through the NDI station.

Some embodiments are non-transitory computer readable media embodying instructions which, when executed by a processor, are operable for performing the methods briefly mentioned above.

Some embodiments are systems for inspecting a wing panel, in which the systems include: a track; a strongback configured to suspend a wing panel beneath it, and to advance along the track in a process direction; and a Non-Destructive Imaging (NDI) station disposed at the track and that is configured to inspect the wing panel while the wing panel is suspended beneath the strongback. In some systems, the strongback is configured to enforce a predetermined contour onto the wing panel by means of adjustable-length pogos that include vacuum couplers. Some systems further include a controller configured to perform various actions, such as selectively retracting one or more vacuum couplers to allow NDI inspection of the wing panel, detecting out-of-tolerance conditions at the wing panel based on input from the NDI station, reporting out-of-tolerance conditions for rework, controlling operation of inspection heads of the NDI station, controlling advancement of the wing panel in the process direction, and relating input from the NDI station relating to locations on the wing panel. In some systems, the NDI station is configured to index with the wing panel and/or the strongback suspending the wing panel.

Other illustrative embodiments (e.g., methods, computer-readable media, systems, and so forth, relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 1 is a block diagram of a layup system that applies indexing features to a manufacturing excess of a preform that will be hardened into a composite part in an illustrative embodiment.

FIG. 2B illustrates a layup mandrel covered by a composite part in an illustrative embodiment.

FIG. 3 is a flowchart illustrating a method for applying indexing features to a manufacturing excess of a preform that will be hardened into a composite part in an illustrative embodiment.

FIGS. 5A-5F are diagrams of an assembly line for a wing in an illustrative embodiment.

FIG. 5G is a diagram of an alternative configuration of an assembly line for a wing in an illustrative embodiment.

FIG. 6 is a flowchart illustrating a method of enforcing a contour onto a wing panel in an illustrative embodiment.

FIGS. 11A-11D illustrate installation of a rib at an upper wing panel in an illustrative embodiment.

FIGS. 16A-16C are diagrams illustrating automated installation of shims between ribs and wing panels in illustrative embodiments.

FIGS. 17A-17C illustrate further views of a robot arm performing automated inspection and shim installation between ribs and wing panels in illustrative embodiments.

DESCRIPTION

Figure 2A:
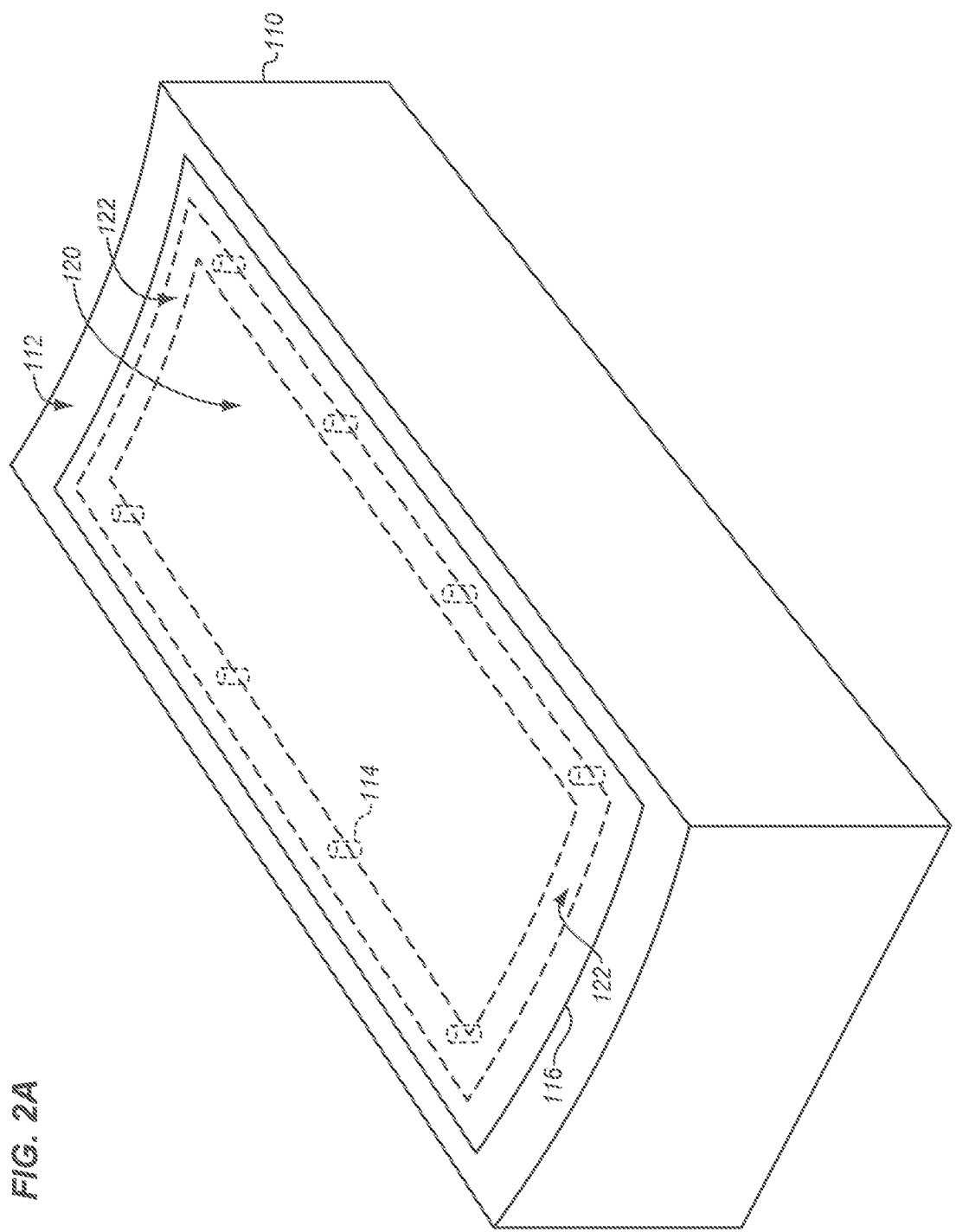
FIG. 2A illustrates a layup mandrel awaiting layup in an illustrative embodiment.

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

For convenience, the description is presented as a sequence of operations that may occur in the production of a wing for an aircraft, as it is assembled on an assembly line from constituent parts. In particular, the description begins with the formation of a wing panel from a preform, and proceeds through various operations performed on the wing panel, including the addition of structural components such as ribs and spars to the wing panel (which may be an upper wing panel), and joining another wing panel (such as a lower wing panel) to form a wing assembly. The term "wing assembly" is used herein generally to refer to a wing panel to which one or more major structural components, e.g. ribs and spars, has been affixed or installed, and may thus include a complete wing. However, as the description refers mainly to the formation of a wing panel and the addition of major structural components thereto, and not necessarily to the inclusion of cabling and mechanical and electrical systems that are typically also incorporated into a completed wing. Not all operations, processes, steps, and other actions described herein necessarily take place in all of the embodiments (e.g., embodiments of wing assemblies, embodiments of structural components thereof, embodiments of methods relating to the assembly thereof, etc.) described herein, or in other embodiments that are consistent with this disclosure. Further, the operations described, or certain actions included therein, may take place in a different order than as discussed, may take place at the same time or overlapping in time with other actions, may represent alternative operations for different wing panels (such as an upper wing panel as opposed to a lower wing panel, etc.), and so forth.

The wings and wing assemblies described herein may comprise metal parts and/or composite parts. Composite parts, such as carbon fiber reinforced polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

FIG. 1 is a schematic diagram of an illustrative layup system 100 that applies indexing features to a manufacturing excess of a preform that will be hardened into a composite part in an illustrative embodiment. In prior systems, manufacturing excess for a composite part—that is, material that is beyond the intended final dimensions or boundaries (e.g., the final perimeter) of the composite part—is trimmed immediately after demolding. For example, this may include placing a wing panel into a dedicated cell, scanning the wing panel to characterize it, and then trimming the wing panel (e.g., with a cutter) along the perimeter of the part until final perimeter dimensions are accomplished. Similar processes are applied when trimming manufacturing excess for a fuselage. As will be described in greater detail herein, layup system 100 is unique in that it utilizes material that is traditionally immediately trimmed from a composite part after demolding. In particular, various indexing features are formed into the manufacturing excess of the preform, which can then be used to index (e.g. position, orient, identify, etc.) the hardened composite part for further operations, such as at one or more stations in an assembly line or other manufacturing process. Layup system 100 comprises any system, device, or component operable to apply indexing features to a preform which will be hardened into a composite part. In this embodiment, layup system 100 includes a layup mandrel 110 (e.g., a rigid metal mandrel) that defines a contour 112 (e.g., a curved, flat, or otherwise shaped contour) for a preform that will be hardened into a composite part, such as a wing panel. A preform 200 is shown to be disposed on the layup mandrel.

As can also be seen with reference to FIGS. 2A and 2B, which show an isometric view of a simplified version of layup mandrel 110, the mandrel has surface features 114, such as indents, protrusions, ridges, grooves, notches, through-holes, blind holes, dams, etc. Like contour 112, which imparts a corresponding contour to the preform, surface features 114 are capable of being used to directly place corresponding indexing features, shown at 210, onto the preform. Others accommodate trimming of manufacturing excess at the layup mandrel 110, or drilling of a composite part hardened at the layup mandrel 110. In other words, the surface features 114 alter the shape of the preform 200 on a localized basis to place the indexing features 210 into the preform and/or hardened composite part, with the various types of surface features 114 offering different ways of forming the indexing features into the composite part. One way is in laying up the preform over a surface feature (e.g., a protrusion, which forms a corresponding indent in the preform that becomes part of the composite part after hardening); another way is by machining (e.g., by drilling) an indexing feature (e.g., a through-hole) into the composite part post-hardening. For example, in FIG. 1, surface features 114 are shown to include recesses 118 that are filled with potting compound and finished to a surface contour to complement the contour 112, so that indexing features such as through-holes may be drilled into the composite part hardened from the preform 200 prior to de-molding the part from the mandrel 110, with overshoot during the drilling operation removing some of the potting compound rather than damaging the surface of the layup mandrel. The surface features 114 are used to shape, or enforce, indexing features onto (and/or into) a preform 200 laid-up onto the layup mandrel 110.

Overshoot during machining, such as drilling or trimming, at the layup mandrel 110 after hardening necessitates rework of the potted surface(s) prior to the next use of the layup mandrel 110. The preform 200 is laid-up onto the layup mandrel 110 over the contour 112 and surface features 114.

As shown in FIG. 1 and as is also visible in FIG. 2A, which shows layup mandrel 110 awaiting a layup, the layup mandrel includes a layup region 120 for preform 200, which includes contour 112, and which is surrounded by a manufacturing excess region 122, within which are disposed surface features 114. Correspondingly, preform 200 is shown in FIG. 1 to extend past a final trim boundary or final perimeter 202 for the resulting composite part. The region of the preform that extends beyond the final perimeter 202 is the manufacturing excess, indicated at 204, which is defined by a manufacturing excess edge 206. Accordingly, surface features 114 are positioned to complementarily form indexing features 210 in preform 200. More particularly, the surface features 114 that are disposed in the manufacturing excess region 122 form indexing features 210 in the manufacturing excess 204 of preform 200 before hardening which, as noted above, may be utilized for indexing after the preform 200 has hardened into composite part 250. Although the curve of contour 112, which is shown as a shallow, concave surface, is shown to extend on layup mandrel 110 beyond the final perimeter 202 of the resulting composite part, this is not required to all embodiments, as the contour 112 is only required for the portion of the resulting composite part that is within the final perimeter 202. Also, while a concave layup mandrel 110 is illustrated, layup mandrels of any suitable shape may be utilized. For example, convex layup mandrels, and layup mandrels that define complex curvatures, are also possible. Also, while an outer mold line layup mandrel 110 is illustrated, inner mold line layup mandrels may be utilized in another embodiment.

While FIG. 2A shows layup mandrel 110 awaiting a layup, FIG. 2B shows a composite part, indicated at 250, which has been hardened from a preform 200, awaiting demolding from layup mandrel 110. Indexing features 210 of preform 200 have become indexing features 210 of composite part 250.

In some embodiments, the surface features 114 are separated from neighboring surface features by a predefined distance (e.g., several inches, several feet, etc.), such as to create evenly spaced indexing features 210 at/on/in the preform 200 and resulting composite part 250. In another embodiment, the surface features 114 are unevenly spaced from each other. The positions and/or predefined distance(s) between indexing features may depend, in part, on factors such as the arrangement of work stations on an assembly line.

Positions of the surface features 114 in the layup mandrel 110 are precisely toleranced (e.g., to a thousandth of an inch), and hence the positions of corresponding indexing features 210 at the preform 200 are also consequently known to a precise tolerance, even after the preform 200 has been hardened into composite part 250 and demolded from layup mandrel 110. Thereafter, the indexing features 210 may be utilized by stations in an assembly line in order to orient and position the resulting composite part in a desired manner so that work may be performed upon the composite part. Furthermore, because the layup mandrel 110 is re-usable, there is no need for a separate process of applying indexing features to preforms. Performing this process at a layup mandrel that is within tolerance results in indexing features that are also within tolerance. Recesses 118, also referred to as potting areas, are filled with a potting compound and placed to accommodate machining overshoot from a machining operation such as drilling operation to install indexing features (e.g. through-holes) after hardening into composite part 250 has been completed, as noted above, and refilled and/or resurfaced as necessary after machining and de-molding in order to prepare for the next preform.

Some embodiments include installing readable identifying means (shown generally at 126 in FIG. 1) in the preform, such as a Radio Frequency Identifier (RFID) chip. In such embodiments, one or more RFID chips are coupled, attached, or embedded into the manufacturing excess 204 of a preform 200. Readable identifying means such as an RFID chip can facilitate the indexing process by reporting information that characterizes aspects of the resulting composite part to which it is coupled. For example, an RFID chip can provide instructions to a work station regarding the portion of the structure within the purview of the particular work station. One or multiple RFID chips can provide instructions to one work station or multiple work stations, and there is no need for a one to one relationship of one RFID chip to one work station. In another example, the RFID chips report a type of structure/wing, including right or left, or upper or lower, or even model number, to the work station.

Further, although not shown in the drawings, one or more other readable identifying means 126 may be provided to preform 200, or to the composite part 250 formed therefrom, as part of the forming process, in addition to or instead of an RFID chip. For example, a bar code or other indicia, which may be scanned or read by a suitable reader by one or more work stations in an assembly line, may be inscribed or applied to the preform or resulting composite part, prior to de-molding. For the sake of this disclosure, all references herein to a particular type of readable identifying means 126 (such as an RFID chip, or a bar code) (and depictions thereof, in the drawings) are intended to broadly encompass any such readable identifying means.

The layup system shown in FIG. 1 further includes a cutter 130 having a blade 132 (e.g., a reciprocating or circular blade) and an actuator 134 that drives the blade 132 to cut portions of a composite part that are proximate to guides 116, which are shown in the form of adjoining grooves that encompass the manufacturing excess region 122, in the layup mandrel 110. That is, the guide 116 seats the cutter 130 and/or defines a path for cutter 130. Moreover, as shown in FIG. 1, the guide 116 may be filled with potting compound to accommodate a blade of the cutter (and refilled after use, similar to recessed areas 118). As shown in FIG. 2B, for example, in which the grooves that collectively form guide 116 are shown for clarity as a rectangular perimeter, composite part 250 is shown to include a portion 252 that is within layup region 120, as well as a portion 254 in the manufacturing excess region 122 that is conformed to surface features 114. A flash edge 256 of surplus material is shown in FIG. 2B to extend beyond the manufacturing excess region 122. The cutting operation, which is performed prior to demolding of the composite part 250 from the layup mandrel 110, removes flash edge 256 to define a manufacturing excess edge 206, and leaves a sufficient amount of manufacturing excess 204 to include indexing features 210 for use by stations in an assembly line. The rough cut provides a consistent edge, i.e. manufacturing excess edge 206, to the part during the manufacturing process, prior to trimming the edge to a final perimeter, i.e. final perimeter 202. This is desirable in contrast to working upon a part without a fixed consistent perimeter with respect to a manufacturing excess. Operations of the cutter 130 are managed by controller 140. Controller 140 may be implemented, for example, as custom circuitry, as a hardware processor executing programmed instructions, or some combination thereof.

Illustrative details of the operation of layup system 100 will be discussed with regard to FIG. 3 and method 300 shown therein. Assume, for this embodiment, that layup mandrel 110 has been cleaned and returned to the start of an assembly line after a composite part has been demolded from the layup mandrel 110. Thus, layup mandrel 110 awaits layup of a preform, such as preform 200, for a next composite part 250.

FIG. 3 is a flowchart illustrating a method 300 for applying indexing features to a manufacturing excess 204 of a preform 200 that will be hardened into composite part 250 in an illustrative embodiment. The steps of method 300 are described with reference to components of layup system 100 shown in FIGS. 1, 2A, and 2B, but those skilled in the art will appreciate that method 300 may be performed in other systems. As is the case with all of the methods illustrated and described in this disclosure, the steps shown in the flowchart described herein are neither all inclusive nor exclusive. Furthermore, the flowcharts herein (such as in FIG. 3) illustrate only a specific embodiment of a particular method (such as method 300), it will be understood that other embodiments of methods consistent with and encompassed by this disclosure include a fewer or greater number of steps than as shown, include steps performed in a different order than as shown in, and/or contain other (e.g., additional, fewer, and/or alternative) actions than as depicted. Further, as will become clear from the disclosure, as the various methods shown and discussed herein relate to several different operations and sequences that may be performed as a wing panel is formed and assembled into a wing assembly, methods in accordance with this disclosure may combine or otherwise include various steps and operations of two or more of various illustrated methods. Also, although reference numbers for components described above are used in the description of this method 300, it will be understood that the method (as well as other methods described herein) is applicable to components that may have different configurations than as illustrated and described above.

Focusing on method 300, in step 302, a preform 200 is laid-up onto the layup mandrel 110, such as onto a layup region 120, as well as onto a portion of the layup mandrel 110 that is located beyond final trim boundaries (i.e., the final perimeter 202) of the composite part 250, such as a manufacturing excess region 122. Manufacturing excess region 122 of the layup mandrel 110 includes surface features 114 configured to complementarily form indexing features 210 in the preform 200. The layup mandrel 110, in at least the layup region, defines a contour 112 for a composite part, and the preform 200 includes a manufacturing excess 204 that extends beyond the final perimeter for the composite part. Layup may be performed as the layup mandrel 110 itself is pulsed or moved continuously through an assembly line, and may include the synchronized operation of multiple lamination machines at once (e.g., during continuous motion of the layup mandrel, during pauses between movements of the layup mandrel, etc.). During layup, multiple plies of unidirectional fiber reinforced material are applied sequentially to build the preform 200 at a desired size and strength. The layup process extends the preform 200 beyond final trim (e.g. assembly-size) boundaries (e.g. beyond a final perimeter 202), which means that a portion of the preform 200 extends over surface features 114. In this embodiment, the preform 200 is a preform for a wing panel 550 with multiple layers/plies.

In step 304, the preform 200 is conformed to surface features 114 at the layup mandrel 110 that are located beyond the final trim boundaries of the composite part 250 and that complementarily form/enforce features into the preform 200 that will be hardened into indexing features 210. In one embodiment, this comprises consolidating the preform 200 by vacuum bagging the preform and applying consolidation pressure. In further embodiments, tows of fiber-reinforced material applied during layup in step 302 are compressed by a roller or other device to conform the preform 200 to the surface features 114.

In the illustrative method, steps 302 and 304 are usually performed in a clean room environment, to minimize the possibility of foreign object debris and other contaminants from contacting the preform 200, such as during layup. The layup mandrel 110 is then moved to an autoclave, which hardens the preform 200 into a composite part 250 via the application of heat and/or pressure. In step 306, the preform 200 is hardened into a composite part 250 that includes indexing features 210 complementarily formed therein, in that the indexing features 210 are complementary to the surface features 114, and are disposed at the surface features 114. During hardening, the preform 200 may be heated to a curing temperature for a thermoset resin within the preform 200, or the preform 200 may be heated to a melting temperature of a thermoplastic resin and then cooled until the thermoplastic resin solidifies. This results in the resulting composite part 250 having indexing features 210 disposed at the surface features 114 on the layup mandrel 110.

In further embodiments, additional indexing features 210 are added by milling or drilling the manufacturing excess, such as by installing holes, notches, channels, and/or grooves that remove material from the manufacturing excess. In still further embodiments, additional indexing features 210 such as pins, clips, rings, etc. are utilized and/or installed.

Some embodiments include installing readable identifying means 126 (such as an RFID chip, a bar code, and so forth) to the manufacturing excess 204, either of the preform 200 or of the composite part 250. Phrased another way, RFID chip and/or other readable identifying means 126 are placed in manufacturing excess 204 either prior or subsequent to hardening the preform into the composite part 250.

In step 308, material is removed (e.g., cut or otherwise separated) from the composite part 250 while retaining a manufacturing excess 204 that includes the indexing features 210. The cutting operation of step 308 creates a consistent perimeter/border of manufacturing excess 122. In one embodiment, this comprises operating a cutter 130 along guides 116 in order to cut away a resin flash (or flash edge 256) or other border of the composite part 250, resulting in a manufacturing excess edge 206. In one embodiment, trimming off flash edge 256 of the composite part is 250 performed prior to demolding the resulting composite part 250 from the layup mandrel 110. The composite part 250 retains manufacturing excess 204 having indexing features 210 that will be used for indexing the composite part as it is worked upon by work stations in an assembly line. The composite part 250 may also include indexing features 210 in areas that will be trimmed off to accommodate, for example, wing access doors or other portions of a wing panel, and/or manufacturing excess beyond a wing panel final perimeter. A final perimeter 202 can then be achieved by trimming off the remaining manufacturing excess later in the process. That is, one or more of the indexing features may be subject to removal to accommodate the addition of one or more components during assembly. For example, work stations can be designed to trim out manufacturing excess or portions thereof, install components such as ribs or spars, join components such as wing panels together, etc. In further embodiments, additional indexing features 210, such as holes, notches, channels, grooves, and so forth, are installed into/formed at the composite part 250 via drilling, milling, or other operations. In a further embodiment, removing material from the composite part 250 comprises installing such additional indexing features 210.

In step 310, after removing material, such as separating flash edge 256 and/or placing indexing one or more indexing features 210, from the composite part 250, the composite part is demolded from the layup mandrel 110. The composite part 250 then proceeds (not shown) to an assembly line for further fabrication and assembly, while the layup mandrel 110 returns for cleaning and receiving another preform for a composite part. In one embodiment, the layup mandrel 110 is also reworked (e.g., refilled with potting compound to restore layup contour 112 as needed after drilling or cutting overshoot into potted areas of recesses 118 prior to demold, repaired, etc.) and transported to start a layup start location, such as on a wing panel layup line.

The method may then continue. For example, and as described in greater detail herein, the resulting composite part 250 may be indexed to a work station in an assembly line via the indexing features 210, and work may be performed on the composite part at the work station while the composite part is indexed to the work station. In some embodiments, the composite part 250 is suspended or otherwise conveyed through the assembly line by a shuttle, such as a strongback. The composite part 250 may be indexed to the shuttle, such as by means of a corresponding indexing unit on a strongback. The strongback may in turn index to a work station, in which case the composite part may be said to be indexed to the work station via the strongback. In any case, the indexing characterizes to a work station at least a portion of the composite part 250 (and/or the strongback) within the purview of the work station. In further embodiments, multiple indexing features interact with multiple work stations and/or with the strongback. The indexing may occur for one or more work stations, until eventually the manufacturing excess 204 is trimmed from the composite part 250 (e.g., after indexing features located in the manufacturing excess are no longer being used for assembly). After trimming, the composite part 250 has its final perimeter 202, and the indexing features 210 in the manufacturing excess have been removed. The composite part 250 is then integrated into a wing assembly of an aircraft.

Method 300 provides a substantial advantage over prior techniques, because it enables indexing features 210 to be installed into a composite part 250 during layup, by reference to surface features 114 on a mandrel 110 that has been precisely toleranced. This eliminates the need for the preform 200 to be precisely measured in order to install indexing features 210, because the indexing features are already placed at precisely known locations by virtue of the placement of the surface features and placement relative to the layup mandrel 110. The precision of the layup mandrel 110 and layup processes is therefore leveraged to avoid the need for downstream contour scanning and indexing. The precision of the layup mandrel 110 is therefore extended/leveraged beyond just layup processes to include post hardening processes such as trimming, milling or drilling to add indexing features prior to the demold of the composite part 250. Therefore the accuracy relationship of multiple surface features 114 and correspondingly formed indexing features 210 placed into the composite part 250 by using the layup mandrel 110 is carried along as the composite part advances, which may enable fabrication processing steps to occur simultaneously on the same part.

Figure 4:
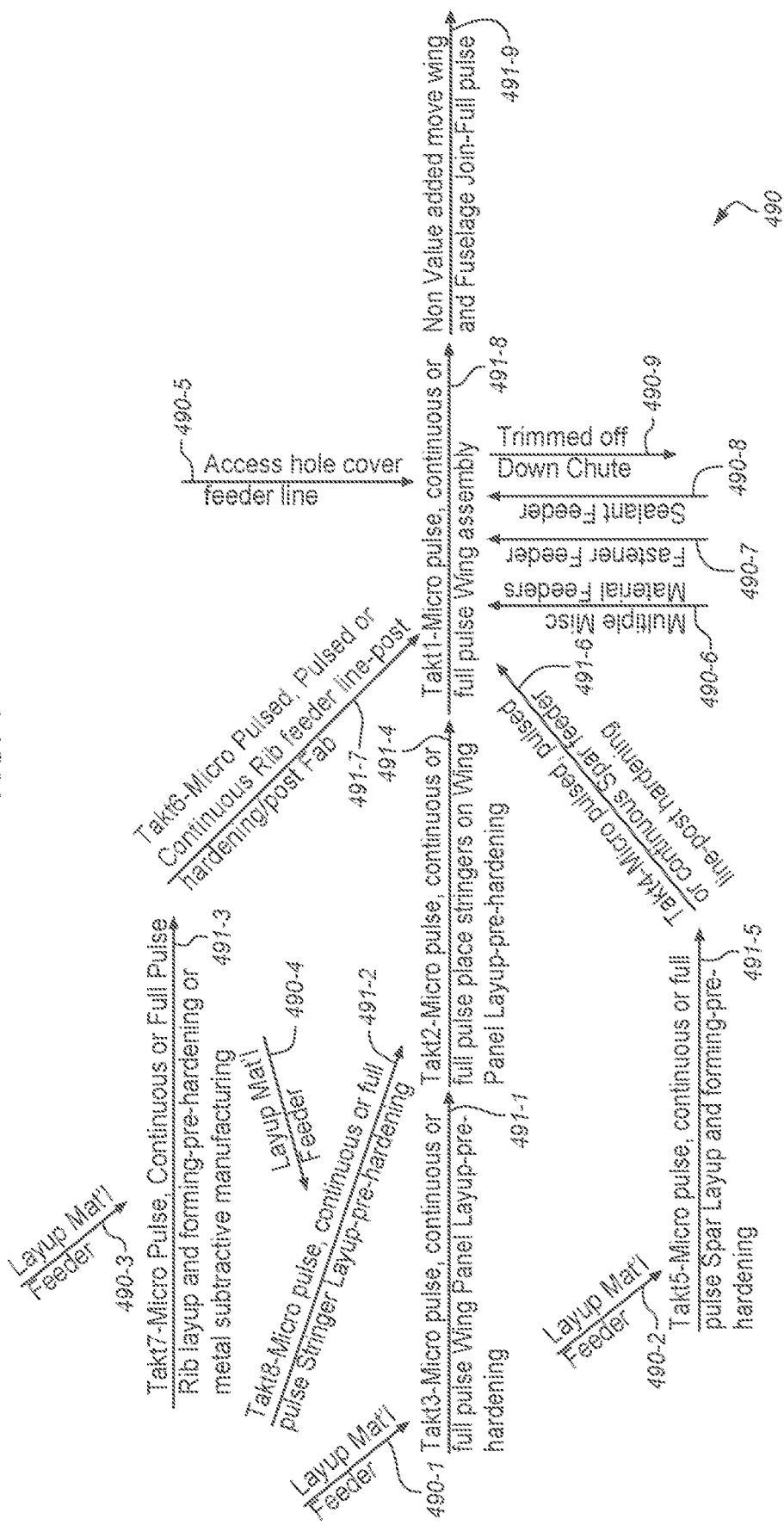
FIG. 4 depicts takt timing for feeder lines for a composite part in an illustrative embodiment.

An example diagram showing how different feeder lines and assembly or layup lines can be coordinated in an assembly line for assembling, for example, a wing assembly, is shown in FIG. 4. FIG. 4 is a flow diagram illustrating an example of a schema, shown as schema 480 for feeder lines 490 and assembly/layup lines 491, in an illustrative embodiment. Schema 480 provides a detailed example flow diagram for wing fabrication pertaining to feeder lines and takt times. All of the feeder lines, from layup material feeder lines through join operations for integrating wings to fuselage sections, are depicted, for a particular embodiment. In addition, each step indicated by an arrow is performed according to a desired takt time based upon the takt time of the component that it feeds into.

In this embodiment, each feeder line is designated with a different reference number 490 (e.g., 490-1, 490-2, etc.), and each assembly or layup line is designated with a different reference number 491 (e.g., 491-1, 491-2, etc.). More specifically, a feeder line 490-1 provides layup material to a wing panel layup line 491-1. A feeder line 490-2 provides layup material to a spar layup line 491-5. A feeder line 490-3 provides layup material to a rib layup line 491-3, and a feeder line 490-4 provides layup material to a stringer layup line 491-2. Also, layup lines feed into other layup lines. Rib layup line 491-3 feeds into a rib post-fabrication line 491-7, wing panel layup line 491-1 feeds into a wing stringer placement line 491-4, and spar layup line 491-5 feeds into a spar post-fabrication line 491-6.

Each feeder line is shown to have a takt time that facilitates fabrication of the component that it fabricates. The takt times between feeder lines and the assembly lines that they feed are synchronized to provide just in time ("JIT") delivery of components to the respective work station 520, or work stations 520, that use those components (e.g., as consumable goods, as inputs to a product being manufactured, etc.). The resulting component moves along assembly line 500 with work stations 520 and is also progressed at a takt time. Each of the feeder line 490-1 through 490-9 and or lines 491-1 through 491-9 takt times can be the same, or some may be the same, or all can be different. Each feeder line 490-1 through 490-9 progresses at a common takt for that particular line.

The takt time for each feeder line may be dependent upon a desired production rate for an assembly line that the feeder line feeds. For example, if ribs are attached at a rate of one per hour and are attached by two hundred fasteners, then two hundred fasteners should be supplied to a rib install station per hour by a feeder line, resulting in a fastener takt time of three and one third fasteners per minute.

In this embodiment, for example, rib layup line 491-3 progresses at a takt7 time and feeds into rib post-fabrication line 491-7. Wing panel layup line 491-1 progresses at a takt3 time and feeds into wing stringer placement line 491-4. Spar layup line 491-5 progresses at a takt5 time and feeds into spar post-fabrication line 491-6.

The rib post-fabrication line 491-7 progresses at a takt6 time, wing stringer placement line 491-4 progresses at a takt2 time, and spar post-fabrication line 491-6 progresses at a takt4 time. All feed into a wing assembly line 491-8, which progresses at a takt1 time and also receives access port covers from access port cover feeder line 490-5, receives miscellaneous materials from miscellaneous material feeder line 490-6, receives fasteners from fastener feeder line 490-7, and receives sealant from sealant feeder line 490-8. The wing panel 550 is hardened in the autoclave in line 490-10. The composite part 250 is then trimmed and (in some embodiments) indexing features 210 are added prior to separation from mandrel 110, for example in a demolding station, in line 490-11. Trimmed excess material is removed from the wing assembly line 491-8 via down chute 490-9. After fabrication is completed for a wing, line 491-9 moves the wing towards a fuselage for joining. Each of the various lines discussed above may provide material and/or a component just in time to the line that it feeds, at whatever rate may be desired. The takt time of the downstream line may or may not be equal to the line or lines feeding it. Each line may have a unique takt time.

Any of the assembly lines, including feeder lines, can operate as micro pulse, full pulse, and/or continuous lines with the fabrication process proceeding from left to right (relative to schema 480), with the various takt times synchronized for JIT delivery of components and/or materials at the next line downstream. As used herein, a "pulse" refers to advancement of a component in a process direction through an assembly line followed by a pause. A component can be "micro pulsed" (a term that herein refers to advancement of a component in the process direction by a distance that is less than its length) or can be "full pulsed" (advancement of a component by a distance equal to or more than its length). As a part of pulsed fabrication, components in an assembly line are pulsed synchronously, and multiple work stations can perform work on different portions of the components during the same pauses between pulses, or during the pulses themselves. Phrased another way, the stations each perform work on a portion of the wing panel at the same time, such that each station performs work on a different portion during a pause in advancement of the wing panel along the track.

This parallel processing significantly increases work density within the factory. The takt for each of the micro pulsed or fully pulsed components can be the same or different, or a defined fraction of a takt time for another assembly line that receives the component. For example, a takt time at feeder line 490-2 for layup material for a spar may be different for a takt time at feeder line 490-1 for layup material for a wing panel, which may be different for a takt time for sealant provided via sealant feeder line 490-8. In one embodiment, the takt time is constant for each illustrated segment.

As noted above, the individual feeder lines discussed herein may be pulsed or continuously operated. Pulsed lines may implement micro pulses, wherein the components being fabricated are advanced by less than their length before receiving work from a work station during a pause, or may be full pulsed, wherein the components are advanced by an amount equal to their length. Furthermore, the various components (e.g., wing assemblies, wing panels, ribs, spars, etc.) can be fabricated from composite parts, or via additive or subtractive manufacturing techniques for metals. For example, in one embodiment, ribs are fabricated via subtractive manufacturing of metal components at rib post-fabrication line 491-7, while wing panels are fabricated as composite parts (e.g., a preform) at wing panel layup line 491-1.

Various aspects of the schema illustrated in FIG. 4 and described above may be implemented in any fabrication setting, for example on a factory floor and/or in an assembly line for a wing, such as to coordinate the timing of assembly, movement (e.g., pulsed and/or continuous), and/or delivery of components and supplies, and/or other operations, on a JIT basis, or otherwise. Concordantly, the illustrative embodiments of an assembly line, such as the assembly line 500 depicted in FIGS. 5A-5F and described below corresponds to assembly line 491-8. However, other assembly lines and manufacturing processes consistent with this disclosure, may implement such a schema, or any aspects thereof, even if not specifically mentioned in the description of the embodiments.

Figure 5B:
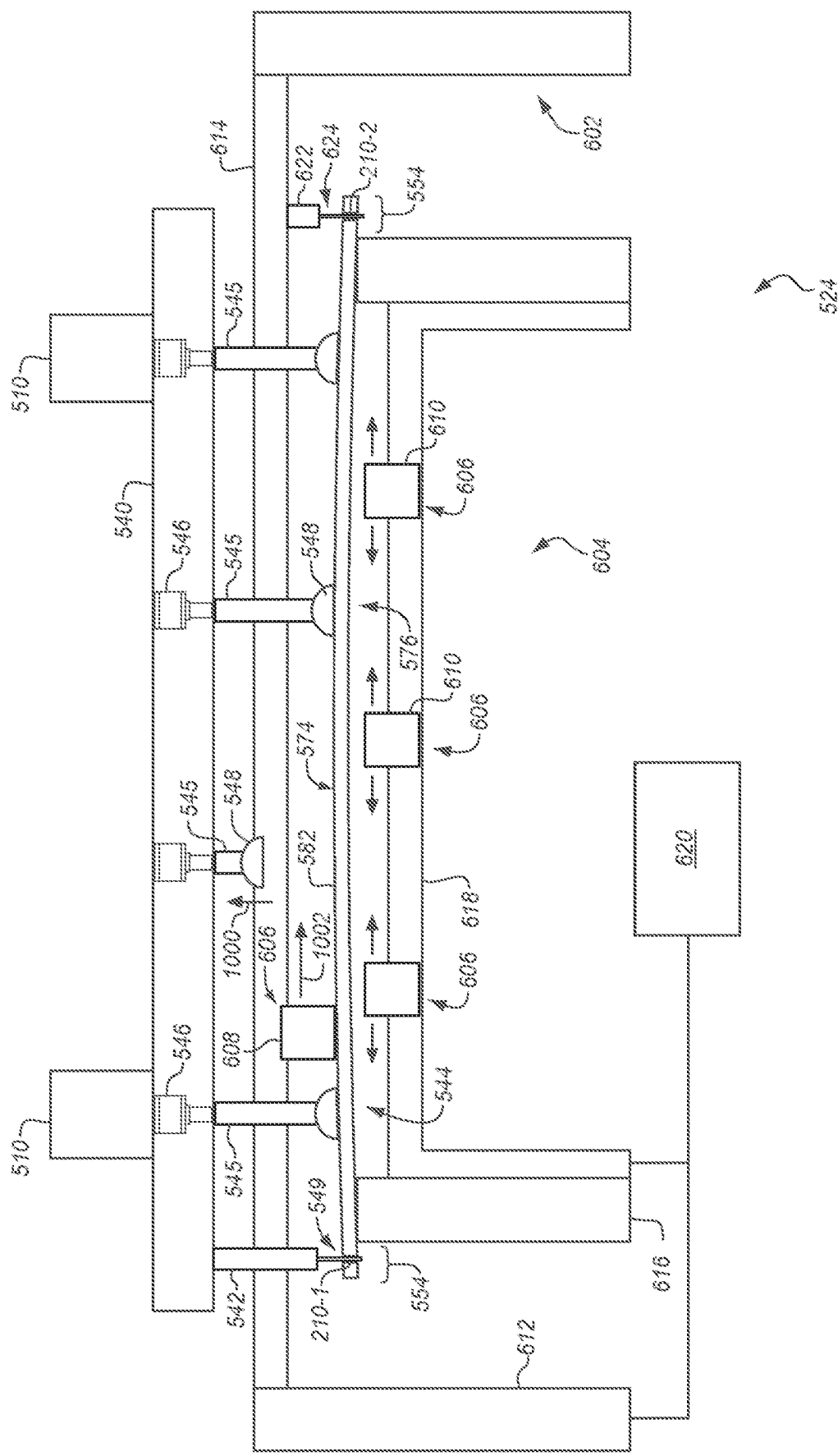

FIGS. 5A-5F depict various aspects of an example assembly line 500 for a wing in an illustrative embodiment. The assembly line 500 may be utilized to perform work upon wing panels, such as a wing panel 550, fabricated via the techniques and systems provided above in FIGS. 1-4. The description of FIGS. 5A-5F, as well as of the structures, components, and operations illustrated therein, are provided with respect to a wing panel, but are applicable to any composite part. The wing panel 550 is somewhat generically described, and may be an upper or lower, or right or left, wing panel. Where operations or features specific to a certain type of wing panel 550 are described (e.g., an upper wing panel), the wing panel will be indicated as such. The assembly line 500, a top view of which is shown schematically in FIG. 5A, includes a track 510, along which a shuttle, shown in the form of a group of three strongbacks 540, travels in a process direction 541 (e.g., in a pulsed fashion from station-to-station, or continuously). The track 510 comprises one or more rails, rollers, or other elements that facilitate motion (e.g., rolling or sliding) of the shuttle along the track 510. The track 510 is capable of being mounted to a floor, suspended from above, etc., depending on the specific environment in which it is used. In the illustrated embodiment, the track 510 is disposed above the various stations, and the shuttle (strongbacks 540) carries the wing panel 550 in the process direction. In particular, as can be seen in FIG. 5D, a strongback 540 is shown to include adapters 543, which mate with track 510 and enable locomotion via the track 510. For example, the adapters 543 may drive a strongback 540 along the track 510, or may enable the track 510 to drive a strongback 540. Either way, this configuration is intended to broadly encompass any suitable manner of structure designed to convey the wing panel 550 in a process direction 541. In further embodiments, the track 510 includes a chain drive, motorized cart, or other powered system (not shown) that is capable of moving the strongback 540 in the process direction 541.

One or more strongbacks 540 advance a wing panel 550 through a variety of work stations, generally designated at 520, that perform work on the wing panel 550. In FIG. 5A, three strongbacks 540 cooperate to carry a single wing panel 550. However, a greater or fewer number of strongbacks 540 may be used, as suitable. For convenience, the term "strongback" herein refers generally to a single structure that is configured to extend over a transverse section of a wing panel 550, such as a chordwise section, although for convenience the term may be used herein to refer generally to a shuttle that includes a plurality of such structures. When two or more strongbacks 540 cooperate to carry a component such as a wing panel 550, they may be coupled to each other (not shown) in a manner that maintains their constant relative position, so that only one strongback 540 is driven along the track 510. In such a manner, wing panels 550 of different lengths may be carried through assembly line 500, such as by coupling a suitable number of strongbacks 540 together in order to support the entire length of the wing panel 550.

In some embodiments, indexing features of the wing panel 550, such as located in the manufacturing excess, may be used to index the wing panel 550 with the strongback 540 that supports it. In the view in FIG. 5B, which corresponds with view arrows "5B" in FIG. 5A, strongback 540 is shown to include an indexing unit 542, which is configured to interface with corresponding indexing features installed in a manufacturing excess 554 of the wing panel 550 (which may correspond to manufacturing excess 204 of a preform 200 that was hardened into wing panel 550, per the fabrication process described above). In the illustrated embodiment, the indexing unit 542 physically couples with an indexing feature, in that the indexing unit 542 is shown to include a head 549 that is received within indexing features 210-1, which is shown as a through-hole. Although only one indexing unit 542 is shown in FIG. 5B, each strongback 540 may include any suitable number of indexing units, each of which may be configured to couple with an indexing feature 210 of the wing panel 550, such as to initially align, and/or maintain alignment of, the strongback with the wing panel. Like the indexing features 210, the indexing units 542 may take any suitable configuration, and may include coupling means other than to enable a mechanical coupling, such as magnets, and so forth. The indexing units may be configured to couple with a variety of different indexing features 210, or indexing features that may vary in location from one wing panel 550 to another, for example to enable the strongback 540 to couple with different wing panels, as needed.

In FIG. 5A, the work stations 520 of assembly line 500, are shown to include a non-destructive inspection or NDI station 524, a cut-out station 526, a rib install station 528, and a spar install station 530. These work stations, as well as the operations performed at each, as well as other illustrative work stations, are discussed in greater detail below. Other embodiments may include different work stations than those shown, work stations disposed in a different order, multiples of one or more types of work station, and so forth. For example, in some embodiments, a fastener sealing station is utilized to seal the wing, and work stations are also included for installing electrical components, electrical equipment, and/or fuel tank related systems.

As can be seen in FIG. 5A and more clearly in FIG. 5B, during work at the various work stations 520 such as NDI station 524, the wing panel 550 remains suspended beneath strongback 540 by carriers 545 (e.g., independently adjustable components such as telescoping carriers, also referred to herein as pogos) that include vacuum couplers 548, which apply a removable vacuum connection to the wing panel in order to affix to the wing panel underneath the strongback 540). The view in FIG. 5B shows four carriers 545, three of which are shown to have their vacuum couplers 548 positioned against the upper surface 574 of the wing panel 550, and one of which is shown to be in a shortened configuration so that its vacuum coupler 548 is spaced from the upper surface of the wing panel. Referring briefly to FIG. 5A shows that a different number of carriers 545 are used for each of the three strongbacks 540 that collectively support wing panel 550, with the carriers linearly disposed along the width of the wing panel. However, any number and/or configuration of carriers 545 may be used. The carriers 545 are aligned to each contact the wing panel 550 at a predefined location and height on the wing panel 550. Each carrier is rigid, once set to a desired length. Accordingly, the carriers 545, or more particularly the alignment of the carriers 545 relative to each other and their lengths relative to the wing panel 550, may be arranged to impart forces which are transferred through the wing panel 550, and enforce a desired contour 544 into the wing panel 550. Thus, the strongback 540 suspends the wing panel 550 beneath it while enforcing a contour 544 onto the wing panel. This contour 544 may be that imparted to the wing panel by layup mandrel 110 (e.g., contour 112 as shown in FIG. 1), or a different contour required for a specific application. Thus, while the strongback 540 advances along the track 510 in a process direction 541, the contour 544 is enforced by holding each carrier 545 at a desired height, which forces a geometry at the wing panel 550 that corresponds with the contour 544.

The attachment mechanism shown in the illustrated embodiment, as can be seen in FIG. 5B, is one in which carriers 545 engage with an upper surface 574 of the wing panel 550, to form a vacuum grip between the vacuum couplers 548 of the carriers and the wing panel 550. The length of the carriers 545 is controlled by actuators 546, such as hydraulic or pneumatic actuators, or linear actuators. For example, one of carriers 545 is shown to be in the process of being shortened, as indicated by arrow 1000. The carriers 545 may have their length adjusted, for example, before a vacuum attachment is formed (for example, in order to facilitate initial alignment for the vacuum couplers 548), and/or after vacuum attachment is formed (in order to bend the wing panel 550 into a desired shape and/or enforce a desired contour upon the wing panel). In some embodiments, actuators 546 are controlled via controller 620.

Although the shape of the wing panel 550, including the contour and curvature thereof, is determined during layup and hardening, contour enforcement and adjustment may be desired after the wing panel has been demolded. Contour enforcement, ensures that the wing panel 550 maintains a desired shape and does not assume an undesirable contour, such as from sagging under its own weight. In some embodiments, the contour enforced by strongback 540 and carriers 545 facilitates installation of ribs and spars onto the wing panels, such as by ensuring proper alignment between the component and the portion(s) of the wing panel to which the component is to be installed. Specifically, the carriers 545 enforce both chordwise and spanwise contours to a desired level of tolerance. In one embodiment (not shown), the carriers 545 are capable of moving relative to the strongback to predefined positions, in order to enforce contours for a variety of wing shapes. Moreover, the "upper surface" 574 to which carriers 545 attach, may be the exterior surface of a wing panel 550 that is oriented "right side up" relative to strongback 540, or may be the interior surface of a wing panel that is inverted, according to whichever orientation is preferable for contour enforcement (and/or other operations as the wing panel 550 proceeds through the assembly line 500).

During the discussion of assembly line 500 and the operations performed by the various stations 520, intermittent references will be made to various flowcharts presented in the drawings (e.g., FIGS. 6-10) that illustrate methods in accordance with the components and operations illustrated in FIGS. 5A-5G. For example, FIG. 6 is a flowchart illustrating a method 800 of carrying a wing panel 550 in an illustrative embodiment. According to method 800, step 802 includes aligning a strongback 540 over a wing panel 550. In some embodiments, this comprises driving a strongback 540 along the track 510 until it is positioned over a desired and/or predetermined transverse portion of the wing panel 550, such as a chordwise portion. In some embodiments, this comprises driving multiple strongbacks 540 until they are each positioned over different desired and/or predetermined transverse (e.g., chordwise) portions of the wing panel 550. In one example, one strongback 540 may be moved along the track 510 until it is positioned over a different portion of the wing panel 550 than another strongback 540 that remains stationary. In some embodiments, aligning the strongback 540 is performed by, or includes, indexing the strongback 540 to the wing panel 550. In some of such embodiments, this indexing is done by coupling the strongback 540 with one or more indexing features of the wing panel 550, such as by physically coupling an indexing unit 542 of the strongback 540 with a corresponding indexing feature 210 of the wing panel 550. Indexing the strongback 540 with the wing panel 550 in this manner may maintain the strongback and the wing panel in proper alignment, such as throughout the subsequent actions of the method.

Step 804 includes forming a vacuum attachment between an upper surface 574 of the wing panel 550 and vacuum couplers 548 of pogos 545 extending beneath the strongback 540, thereby coupling the pogos 545 to the upper surface 574 of the wing panel 550. In one embodiment, this comprises extending each of the pogos 545 until vacuum couplers 548 of the pogos physically contact the upper surface 574 of the wing panel 550. In a further embodiment, the pogos are attached systematically from the middle of the wing panel 550 (e.g., chordwise or spanwise) and then moved outward, attached systematically starting with the pogo that is at a most out-of-contour location on the wing panel, or attached all at once, and so forth.

As described in greater detail below, the positions of the pogos 545 along the surface of the wing panel 550 may be determined by a variety of factors, one of which is the manner in which the pogos, and the stress and/or strain forces imparted thereby, can cooperate in different possible configurations to enforce the predetermined contour to the wing panel. There are, however, other competing factors. As one example, as detailed below, inspection of the wing panel 550, such as via non-destructive inspection (NDI) scanning may require an NDI inspection head to be positioned at, or moved over, one or more specific locations on the wing panel 550. Because the pogos can be selectively retracted, this can be accommodated either by temporarily retracting a pogo 545 to allow NDI inspection of the location on the wing panel 550 to which the vacuum coupler 548 is coupled, or by initially attaching the pogos to the wing panel only at locations that will not interfere with NDI inspection. As another example, attachment of ribs and spars to the lower surface 576 (e.g., an interior surface) of wing panel 550 may involve fastening operations (e.g. drilling) to occur at corresponding locations on the upper surface 574 of the wing panel. As such, the positions of the pogos 545 may be located so as not to interfere with such operations. Accordingly, the positions of the pogos 545 may optimize some or all of these (and/or other) considerations.

The coupling applied is the result of drawing a vacuum between the vacuum coupler 548 and the wing panel 550, and more specifically a surface thereof, such as upper surface 574. The amount of vacuum force applied over a portion of the wing panel 550 is sufficient to grip and hold the wing panel, and is also enough to flex the wing panel and hold it according to a desired contour 544. Specifically, the volume between the carrier 545 and the wing panel 550 is evacuated to a pressure that permits the atmospheric pressure around the vacuum coupler 548 to cause the carrier 545 to removably adhere to the wing panel 550. The vacuum remains applied via the carriers 545 during transport, including during pulses and pauses.

Step 806 includes adjusting lengths of the pogos 545 to enforce a predetermined contour onto the wing panel 550. That is, after the vacuum attachment is formed, the length of the pogos 545 is adjusted (e.g., via pressure, actuators, etc.) to conform wing panel 550 with a desired contour 544. In the illustrated embodiment, the pogos 545 are independently adjustable. That is, depending on a position of each pogo 545 along the length and width of the wing panel 550 (e.g., as determined via manual or laser-assisted processes), and depending on the desired contour, the pogo is adjusted to a desired length. If the wing panel 550 is already in conformance with the desired contour, then no adjustment or only minor adjustment to the length of one or more pogos 545 may be performed. Alternatively, if the wing panel 550 is not in conformance with the desired contour (e.g., not within tolerance), then adjusting the length of the pogos 545 bends or contours the wing panel (e.g., by applying a desired amount and direction of strain) in order to hold the wing panel in a desired shape.

In some embodiments, scanning is performed to determine an initial wing panel contour. It is possible that no changes in the contour need to be enforced if a wing panel 550 is already at a desired (e.g. predetermined) contour initially, either across the entire wing panel or one or more portions thereof. In some of such embodiments, adjustments to the length of each pogo 545 (i.e., longer or shorter) relative to the strongback 540, push and/or pull the wing panel 550 into a desired contour. Adjustments to the length of each pogo 545 is based at least in part by a determination of the extent to which the wing panel 550 is out of alignment with the desired contour. That is, the length of some of the pogos 545 may require adjustment, whereas the length of others of the pogos 545 may not (e.g., if only some of the sections of the wing panel 550 are not aligned with the predetermined contour). The location of the vacuum couplers 548 of the pogos 545 are precisely located relative to the upper surface 574 of the wing panel 550 to ensure that when the pogos are at the desired length, the contour enforced by the pogos corresponds with expectations.

The length of the pogos 545 may be adjusted on the fly (e.g., by adjusting air logic applied to a pneumatic actuator controlling length, adjusting a hydraulic actuator controlling length, etc.) to align the pogos for establishing a vacuum attachment in a first phase (e.g., step 804), and then enforcing a contour in a second phase (e.g., step 806). This facilitates length adjustment during initial attachment because if the pogos 545 are set rigidly to a particular length based on an expected shape of the wing panel 550, then the vacuum couplers 548 may not be able to form a vacuum attachment if the wing panel is out of contour (i.e., because the pogos are too long or short).

In some embodiments, scanning is performed to determine whether the wing panel 550 is in the predetermined contour. This may be done while the length of the pogos 545 are being adjusted, or after all of the pogos have been adjusted.

The method may then continue, for example to advance the wing panel 550 while the contour is enforced, such as by moving the strongback 540 along track 510 in a process direction 541, and/or performing work on the wing panel while the contour is enforced, such as at the various stations 520. In embodiments in which scanning is performed, the method may include contour scanning during or after work operations are performed, for example to ensure that the wing panel 550 remains in the desired contour—or, in other words, that the wing panel has not become out of alignment with the predetermined contour as a result of the work operations.

Returning to FIG. 5A, stations 520 disposed along the track 510 perform work on the wing panel 550, and may all operate at the same time (or at overlapping times) as each other, or synchronized with one or more others, to perform different tasks at different sections of the wing panel 550 (e.g., in the wing root section 577, mid length section 578, wing tip section 579, etc.). In this embodiment, NDI station 524 inspects the wing panel 550 for out-of-tolerance conditions (e.g., internal voids, foreign object debris or FOD, edge delamination or inconsistency, etc.), cut-out station 526 cuts access ports into the wing panel 550 (e.g. in manufacturing excess 554), rib install station 528 mounts ribs to the wing panel 550, and spar install station 530 installs spars to the wing panel 550.

In this embodiment, as will be explained in greater detail below, ribs are attached to the wing panel 550 during micro pulse advancement. This can comprise multiple work stations operating on each rib at once, or multiple work stations each operating on different ribs during the same period of time. The spars are later attached while the wing panel 550 is retained at a full pulse work station 520. However, depending on the embodiment, the spars are attached before the ribs, or could be installed in a full- or micro-pulse process. The ribs are attached to the wing panel 550 and spar using either micro pulsed or full pulse assembly. Alternatively, the wing panel 550 is lowered into position over ribs which are then attached, and spars are pulsed to the wing panel 550.

In one embodiment, the rib and spar installation processes are performed by providing ribs and spar segments in a JIT manner from parallel feeder lines, such as by means of feeder lines similar to continuous rib feeder line 491-7 and continuous spar feeder line 491-5, respectively, as shown in schema 480 in FIG. 4. Feeder lines are individually shown in FIG. 5A with a different reference number 570 (e.g., 570-1, 570-2, etc.). These feeder lines may be the same as, similar to, or different from, the various feeder lines 490 shown in schema 480, in terms of the materials or components provided, the takt time according to which the feeder line provides materials or components, etc. In one embodiment, several spar segments may be coupled, e.g. end-to-end, to form a spar. In further embodiments, there are several rib install stations along with one or more fastener sealing stations and a plurality of spar install stations. Another embodiment has each spar comprising three segments that are spliced together at the ends of a rib.

The stations 520 are disposed along the track 510 and may be separated by less than the length of wing panel 550 or even a portion thereof. In one embodiment, such an arrangement enables multiple stations, such as NDI station 524, cut-out station 526, and rib install station 528, to perform work on the wing panel 550 simultaneously or overlapping in time. In further embodiments, the stations are distanced and/or otherwise configured such that only one work station at a time performs work on the wing panel 550.

Figure 5F:
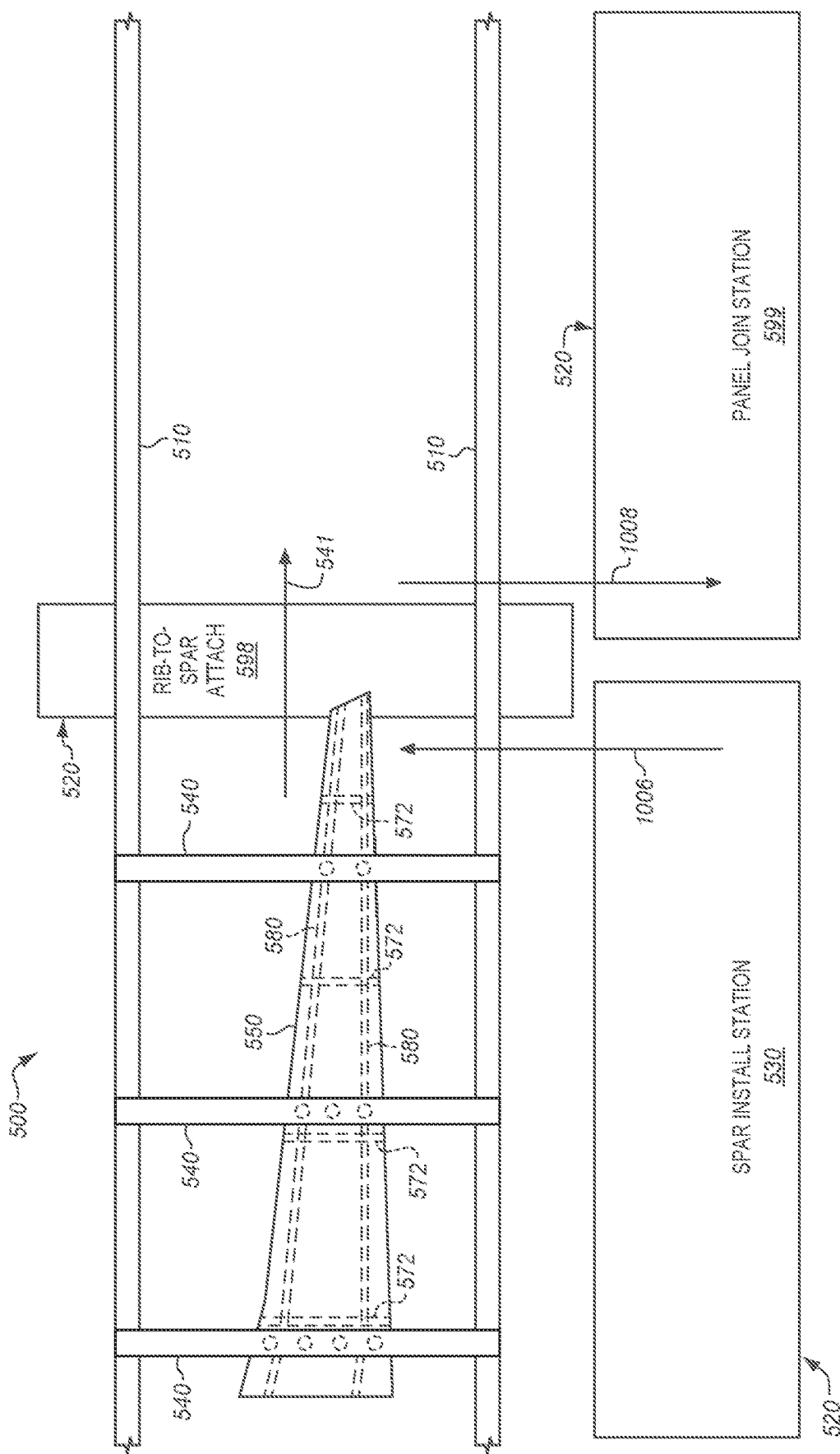

As discussed in further detail herein, after proceeding through the work stations 520 shown in FIG. 5A, the wing panel 550 (which may be an upper wing panel, to which ribs and spars may be installed) enters a panel join stage, shown as panel join station 599 in FIG. 5F, that attaches another wing panel (which may be a lower wing panel) to form a completed section of airframe (e.g. a wing assembly) for a wing. The panel join stage operates alone (e.g., by itself on the entirety of the wing, without other stations operating) after a wing panel 550 halts at the panel join station 599 for fastening. In one embodiment, the pausing of the wing panel 550 at the panel join station 599 lasts while other wing panels are pulsed through the work stations, until the other wing panels have advanced by at least their entire length.

In the illustrated embodiment, feeder lines 570-1 through 570-6 correspond, at least in part, to feeder lines 491-7, 491-4, and 491-5. Feeder lines 570-1 through 570-6 provide resources and components on a just in time (JIT) basis to the various work stations 520 discussed above, and their operations are controlled and/or synchronized by controller 560 (or additional controllers 560) according to a desired takt time. In one embodiment, feeder line 570-1 corresponds at least in part to access port cover feeder line 490-5, and provides newly fabricated access hole covers to cut-out station 526. Feeder line 570-2 provides fasteners to cut-out station 526. Feeder line 570-3 provides fasteners to spar install station 530. Feeder line 570-4 provides sealant to spar install station 530. Feeder line 570-5 provides fasteners to rib install station 528, and feeder line 570-6 provides sealant to rib install station 528. In further embodiments, additional/other feeder lines provide newly fabricated ribs, fasteners, and sealant spars, lower panels, etc. to various work stations.

In one embodiment, an upper wing panel proceeds through the work stations 520 shown in FIG. 5A, and is followed by a lower wing panel. As briefly noted above, the lower wing panel does not receive ribs or spars (i.e., because these components are already installed to the upper wing panel). As will become clear, cut-out stations, such as cut-out station 526, perform a majority of the work on the lower wing panel, while a majority of work on the upper wing panel consists of installing ribs and spars.

Each station 520 in the assembly line 500 is designed to physically couple, to image, and/or to otherwise interact with an indexing feature 210 in the wing panel 550, or with a strongback 540 that is itself physically coupled with an indexing feature 210. The indexing features 210 are placed at desired locations along the wing panel 550. In some embodiments, the indexing features are aligned along the wing panel 550. In some embodiments, the indexing features are not aligned. In some embodiments, the indexing features are equally spaced, and in some embodiments, the indexing features are not equally spaced. In some embodiments, the number of indexing features is equal to the number of work stations in the assembly line. In some embodiments, there can be more or fewer indexing features 210 than work stations at the assembly line. The indexing features 210 are disposed in a manufacturing excess 554 of the wing panel 550, which is trimmed away prior to a wing being assembled into an airframe for a fuselage.

In this embodiment, each of the stations 520 in the assembly line 500 inserts into, grasps, fits, or aligns to an indexing feature 210. In addition to (or instead of) a physical (e.g. mechanical) coupling, indexing in some embodiments may be facilitated or accompanied by reading an RFID chip and/or other readable identifying means 126 (e.g., a bar code, etc.) on the wing panel. An illustrative example of a physical coupling is shown in FIG. 5B, which shows a section of the wing panel 550 within NDI station 524. Among the various structural components of NDI station 524 is an upper NDI unit 602, which includes an upper frame 614. Upper frame 614 is shown to include an indexing unit 622. In a manner similar to that described above with indexing unit 542 of strongback 540, indexing unit 622 of the NDI station 524 physically couples with an indexing feature of the wing panel 550, specifically by means of a head 624 that is received in indexing feature 210-2 located in a manufacturing excess 554, with indexing feature 210-2 shown as a through-hole. Again, although only one indexing unit 622 is shown in FIG. 5B, each work station 520 may include any suitable number of indexing units 622, each of which may be configured to couple with an indexing feature of the wing panel 550, such as to initially align, and/or maintain alignment of, the wing panel with the work station. Like the indexing features, the indexing units 622 may take any suitable configuration, and may include coupling means other than to enable a mechanical coupling, such as magnets, and so forth. The indexing units may be configured to couple with a variety of different indexing features, or indexing features that may vary in location from one wing panel to another, for example to enable the work station(s) to couple with different wing panels, as needed.

In the illustrated embodiment, indexing feature 210-1 of the wing panel 550 is shown to be coupled to an indexing unit 542 of the strongback 540, whereas indexing feature 210-2 is shown to be coupled to an indexing unit 622 of the NDI station 524. This is intended to illustrate example indexing configurations for the sake of explanation, rather than to indicate that indexing a wing panel by means of a physical coupling to both the strongback and the work station is required to all embodiments. In some embodiments, one or more work stations index with a strongback supporting the wing panel instead of directly indexing with the wing panel. In some embodiments, one or more work stations index with the wing panel 550 instead of with a strongback 540. In some embodiments, work stations index with both the wing panel and a strongback. In any of these embodiments, the strongback may also index with the wing panel.

When an RFID chip (or other readable identifying means) is used, for example in addition to or as an alternative to another type of indexing feature, an RFID scanner (or suitable reader) may couple to provide indexing when brought into communication at a work station. In further embodiments, the strongback 540 itself physically couples with the indexing features 210, RFID chip, and/or hard stops or other features to index the strongback 540 to the work stations. During assembly, the strongback 540 is coupled with/mounted for movement along track 510, and is pulsed (e.g., micro pulsed by less than a length of the wing panel 550, according to a takt that may or may not be commonly shared with other assembly lines). In one embodiment, a limiting factor on takt is the amount of time a portion of the wing panel 550 spends within the purview of a particular work station, plus the pulse time. This time can be adjusted by changing the work scope of the particular work station, or adding additional work stations to do the same work (such as multiple rib install stations 528 as opposed to only one), and so forth. The pulses discussed herein may be implemented as a distance at least equal to the shortest distance between indexing features 210 (e.g., a pitch distance between ribs, or "rib pitch," or a multiple or a fraction of a rib pitch, etc.) or full length or a fraction length of the wing panel 550. In embodiments where pitch distance between ribs, and/or rib pitch, is used for pulse length, that can be used to establish a micro pulse length. The wing panel 550 can be continuously moved, and indexed to the work stations 520. Once indexed, work is then performed by the work stations 520. Whenever the indexing features 210 (and/or RFID chip) and the strongback 540 are mated or otherwise in communication, the strongback 540 is indexed to one or more of the work stations 520, and the location of the wing panel 550 is indexed to a location in a coordinate space shared by the track 510 and known to the work stations. In a further embodiment, indexing also includes conveying a 3D characterization of structure, such as of contour 544, within the purview of the work station. For example, an RFID chip or other readable identifying means 126 (e.g. a bar code) can convey information indicating a geometry of the composite part being worked upon.

In one embodiment, indexing is performed at least according to a wing panel 550 carried upon a strongback 540 that moves along a track 510 comprising a rail system located above the work stations 520. The rail system could be coupled to a gantry or a structure above the work stations such as a ceiling or to the floor such as embedded within the floor, bolted to the floor, etc., or may be coupled to another portion of the factory. The wing panel 550 has been fabricated on a layup mandrel 110 according to precise dimensions as discussed above. Because the layup mandrel 110 has finely toleranced surface features, and because the preform 200 for the wing panel 550 was laid-up over and conformed to those surface features, the wing panel 550 includes indexing features 210 that are precisely located in a manufacturing excess 554. Thus, once the wing panel 550 is indexed and suspended under the strongback 540 and advanced to a work station 520, the 3D position and rotation of the wing panel 550, including the contour 544, is conveyed by indexing and is precisely known at the work station 520. Indexing may thus remove the need, for example, for a full scan via probes or robust optical technology at each work station 520. This information is provided to the work station 520, as needed, as part of the indexing, for example, via information provided by an RFID chip. This allows one line to work in series on different parts for an aircraft, for example right and left upper and lower wing panels, or even on different parts (e.g., wing panels) for different aircraft models. Thus, the characteristics of the wing panel 550 within the purview of the work station 520 is conveyed to the work station as part of each pulse or micro pulse. As a wing panel has more variation from pulse location to pulse location than a fuselage panel, manufacturing excess at the wing panel may include a larger number of surface features to facilitate indexing.

Because of the precise indexing performed, the positions of the tools at each work station 520 relative to the wing panel 550, when indexed to the work station, are precisely known. In some embodiments, the wing panel 550 is locked into place at the work station 520. The 3D position and orientation of the wing panel is then established or indexed into any Numerical Control (NC) programming, or manual or automated system in use at the work station. Therefore, no setup time or scanning may be needed after each movement (e.g., pulse and/or micro pulse) of the wing panel. Furthermore, structure added to or removed from the wing panel 550 in the prior work station 520 may be added to whatever wing panel model or representation is within the system, without the need to scan the wing panel for changes.

The operations of the work stations 520 are managed by a controller, generally indicated in FIG. 5A as controller 560. In one embodiment, controller 560 determines a progress of the strongback 540 along the track 510 (e.g., based on input from a technician), and uses this input to manage the operations of the work stations in accordance with instructions stored in an NC program. Controller 560 may be implemented, for example, as custom circuitry, as a hardware processor executing programmed instructions, or some combination thereof.

The following paragraphs discuss the operations of the various work stations 520 shown in FIG. 5A. As shown in FIG. 5A, in assembly line 500, three work stations 520—specifically, NDI station 524, cut-out station 526, and rib install station 528—are disposed along track 510 in close enough proximity so that a wing panel 550 may encounter all three work stations as it progresses in process direction 541. More specifically, given the span-wise 590 length of wing panels 550 from leading edge to trailing edge (e.g., a wing tip to a wing root, as oriented in the illustrated embodiment), different portions of a wing panel may proceed through two or more different work stations 520 at the same time. For example, wing panel 550 is shown positioned such that a trailing portion of the wing panel, shown as wing root section 577, encounters NDI station 524 at the same time that a leading portion, shown as a wing tip section 579, encounters rib install station 528, and a middle portion, shown as mid length section 578, encounters cut-out station 526. As such, one, or two, or all three of these work stations 520 may perform operations on the respective portion(s) of wing panel 550 at the same time, or overlapping in time. In some embodiments, not all of these operations are necessarily performed at the same time, even though portions of the wing panel 550 are positioned in each work station 520. In one embodiment, NDI is performed at NDI station 524 as portions of the wing panel 550 are pulsed through the work station. Thus, NDI occurs within NDI station 524 on only that portion of the wing panel 550 within the work station at any one time.

FIG. 5B is a front view of NDI station 524 (and, as noted above, corresponds with view arrows "5B" in FIG. 5A), which is shown in the process of inspecting a wing panel 550, with wing panel 550 shown in cross section, in the illustrative embodiment. FIG. 5B illustrates inspection techniques and systems that may be implemented, for example, prior to installation of ribs and spars onto the wing panel. FIG. 5B depicts a strongback 540 that suspends a wing panel 550 beneath it. The NDI station 524 is disposed at the track 510, and inspects the wing panel 550 while the wing panel 550 is suspended beneath the strongback 540.

The NDI station 524 shown in FIG. 5B includes an upper NDI unit 602 and a lower NDI unit 604. Upper NDI unit 602 includes supports 612 and a frame 614 that carry one or more NDI inspection heads 606, shown as upper NDI inspection head 608, which is configured to move relative to wing panel 550 and inspect the upper surface 574 thereof. Lower NDI unit 604 of NDI station 524 is also shown to include a frame 618 and supports 616 that carry additional NDI inspection heads 606, shown as lower NDI inspection heads 610, in a manner than allows the inspection heads to inspect the lower surface 576 of the wing panel 550. For simplicity, NDI inspection heads 606 are also referred to as "inspection heads," or simply "heads." Inspection heads 606 may be mobile—that is, they may be configured to move relative to the upper NDI unit 602, the lower NDI unit 604, and/or the wing panel 550, or they may instead be stationary or fixed. For example, in the illustrated embodiment, upper inspection head 608 is shown, via directional arrow 1002, to be in the process of moving relative to the upper surface 574 of wing panel 550, as enabled by a track and/or a drive or any suitable mechanism (not shown) of the upper NDI unit 602. Some or all of lower inspection heads 610 may also be mobile, in which case they may be independently moveable, configured to move in unison as an array, and so forth, or they may be stationary. Further embodiments may include any number or configuration of inspection heads other than as shown in FIG. 5B. Mobile inspection heads may be used for surface inspection during pauses between advancements or other movements of the wing panel 550 relative to the NDI station 524, such as by individually traversing distinct areal portions of a surface of wing panel 550. Fixed inspection heads may be used for surface inspection as the wing panel 550 pulses or otherwise moves relative to the NDI station 524. For efficiency, the arrangement of inspection heads 606 relative to NDI station 524, and/or to the position(s) of the wing panel 550 as it advances through the work station 520, may be one that disposes the inspection heads at locations of interest, for example at locations where out of tolerance conditions are more likely to be found, such as those for which inspection of prior wing panels and/or analysis of prior wing panels indicates a need or desire for inspection, and are not placed where there is less need for inspection. Other arrangements of inspection heads may be used as desired or needed for a particular application. Some embodiments may include upper and lower inspection heads disposed in pairs, on either side of the wing panel 550, such as to carry out through-transmission inspection techniques. In some embodiments, inspection heads 606 are disposed to inspect an entire surface, or surfaces, of the wing panel 550. For example, in a further embodiment, fixed NDI inspection heads are placed such that the inspection occurs during the pulse, and the inspection heads are disposed in order to cover the entire surface without the need for head movement. This set up can be employed on both the upper and lower surfaces and can be implemented with less complexity than systems which utilize mobile heads. The inspection heads 606 discussed herein may comprise ultrasonic transducers that transmit ultrasonic energy through the wing panel 550 in order to characterize internal features of the wing panel. The operations of the inspection heads 606 (e.g., both the upper inspection heads 608 and lower inspection heads 610) are managed by a controller, shown at 620, which operates an NC program to coordinate the actions of the inspection heads to facilitate scanning of the wing panel 550 in a pulse-echo or through-transmission mode. Controller 620 may interface with, and be distinct from, controller 560. In some embodiments, controller 560 may provide the aforementioned functions of controller 620.

As noted above, NDI station 524 is shown in the illustrated embodiment to be physically indexed to the wing panel 550 by means of indexing unit 622 of the NDI station, the head 624 of which is received within indexing feature 210-2 of the wing panel 550.

Strongback 540 includes telescoping or adjustable-length carriers or pogos 545 which include vacuum couplers 548 configured to removeably attach to upper surface 574 of the wing panel 550—forming a vacuum grip between the vacuum couplers 548 and the wing panel 550. As noted above, the length of the carriers 545, such as to impart or enforce a contour to wing panel 550, is controlled by actuators 546, such as hydraulic or pneumatic actuators, or linear actuators. Controller 620 may coordinate the control of actuators 546. In some embodiments, controller 620 coordinates control of actuators 546 with the operation of NDI station 524, such as to allow inspection of the wing panel 550 in a manner that avoids or accommodates vacuum couplers 548 coupled to the wing surface. In one such embodiment, the controller 620 directs the strongback 540 to selectively retract one or more of the vacuum couplers 548 by shortening corresponding carriers 545 to allow inspection head 608 of the NDI station 524 to inspect portions of the upper surface 574 of the wing panel 550 (such as portion 582) to which vacuum couplers 630 had been attached. This is shown in FIG. 5B with the coordinated shortening of one of carriers 545 to retract its vacuum coupler 548 from portion 582, indicated by directional arrow 1000, with the movement of upper inspection head 608 toward portion 582, as indicated by directional arrow 1002. When the NDI inspection of, for example, portion 582 is completed, the corresponding carrier 545 is extended such that its vacuum coupler 548 is again vacuum connected to the upper surface 574 of the wing panel 550. In a similar manner, other portions of the upper surface 574 of wing panel 550 that are obscured by a vacuum coupler 548 may be systematically inspected. Of course, such a configuration is not required to all embodiments. For example, in further embodiments, the inspection heads 606 are routed around the carriers 545 and vacuum couplers 548, which are not retracted during NDI inspection. In further embodiments, the contour of wing panels 550 vary from type of wing panel, or of wing panel for different models, and the carriers 545 are therefore extended to different positions/extensions depending on the contour of the wing panel.

In further embodiments where a strongback 540 is used, inspecting locations on the wing panel 550 that contact the strongback (e.g., by means of pogos 545 and vacuum couplers 548) via NDI is performed prior to suspending the wing panel beneath the strongback.

Figure 7:
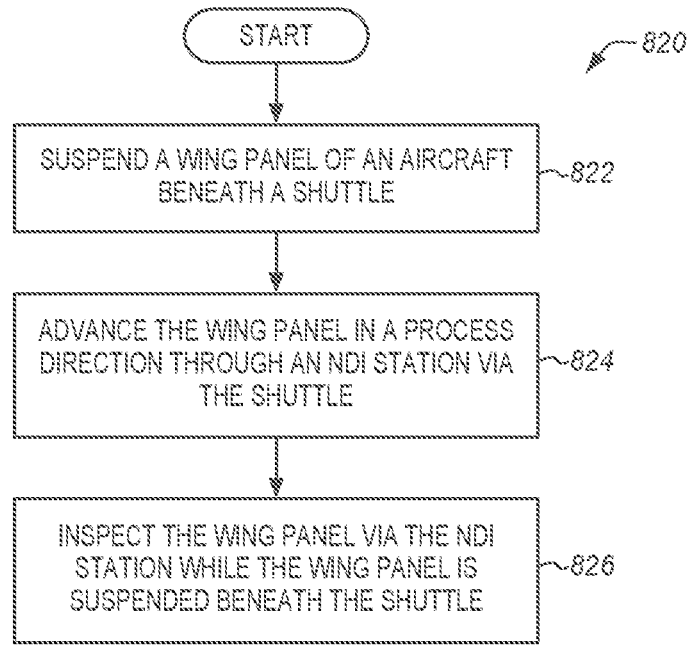
FIGS. 7 and 8 are flowcharts illustrating methods of non-destructive inspection of a wing panel in an illustrative embodiment.

FIG. 7 is a flowchart illustrating an embodiment of method of inspecting a wing panel, designated as method 820. Method 820 progresses in a series of steps that include actions described with reference to the components and structure shown in FIG. 5B, as well as in FIGS. 1-4 and 5A. Method 820 is shown to begin with step 822, which includes suspending a wing panel 550 beneath a shuttle, such as strongbacks 540. In one embodiment as discussed above, suction is applied via the retractable vacuum couplers 548 to hold the wing panel 550 in position and to enforce a desired contour 544 onto the wing panel 550. Specifically, the vacuum coupling of a vacuum coupler 548 along with the inflexibility of the strongback 540 and the extendability of pogos 545 allows contour enforcement to be performed on the wing panel 550. The pogos 545 are removably coupled to the wing panel 550 in order to manipulate it into a desired contour.

Step 824 includes advancing the wing panel 550 in a process direction through an NDI station 524 via the shuttle. In embodiments in which the shuttle is a strongback 540, this includes driving the strongback 540 along a track 510 as described above for earlier methods, and may be performed via pulsed or continuous movement techniques. In embodiments in which the shuttle takes another form, e.g. a cart, an Autonomous Guided Vehicle (AGV), and so forth, this step comprises driving the shuttle along a rail or appropriate pathway.

Step 826 includes inspecting the wing panel 550 via the NDI station 524 while the wing panel 550 is suspended beneath the strongback 540. In one embodiment, this includes performing pulse-echo techniques (e.g., via one or more individual inspection heads 606), or through-transmission techniques (e.g., via pairs of inspection heads 606 arranged on either surface of the wing panel 550). These arrangements detect differences in timing from expected values as ultrasonic energy travels through the thickness of the wing panel 550. This may comprise operating an array of inspection heads 606 at the NDI station 524 at once. Detected differences in timing are analyzed by the controller 620 to determine whether or not an out-of-tolerance condition exists that necessitates rework of the wing panel 550. Rework may be accomplished at a dedicated work station downstream of the NDI station 524. That is, controller 620 detects out-of-tolerance conditions at the wing panel 550 based on input from the NDI station 524, and reports the out-of-tolerance conditions for rework (e.g., via a notification provided to a technician). In a further embodiment, the controller 620 controls the NDI station 524, and controls advancement of the wing panel 550 in the process direction, and relates input from the NDI station to locations on the wing panel 550.

As noted above, in some embodiments, inspection involves selectively retracting one or more vacuum couplers 548, such as by the strongback 540, as one or more inspection heads 606 inspects a surface of the wing panel, such as to allow inspection of the corresponding portions of the surface otherwise obstructed by the vacuum couplers. In further embodiments inspection is performed by arranging carriers 545 and/or otherwise placing vacuum couplers 548 at locations on the surfaces of wing panel 550 where NDI inspection is not required, by inspecting locations on the wing panel that contact the strongback 540—such as the aforementioned portions to which the vacuum couplers 548 connect—via NDI prior to suspending the wing panel beneath the strongback, and/or by operating an array of inspection heads 606 to enable an entirety of inspection to be performed without requiring single inspection heads to be moved, and so forth.

As also noted above, the NDI station 524 may include NDI inspection heads 606 that are mobile, or fixed, or a combination thereof. In some embodiments, the method includes disposing at least some of the inspection heads at locations of interest, such as those for which prior inspection and/or analysis indicates a need or desire for inspection. In some embodiments, the inspection heads are located in order to enable the inspection of the entirety of a desired portion of the wing panel 550 (such as one or more entire portions thereof, or the entire wing panel). In some embodiments in which the NDI inspection heads are fixed, advancing the wing panel 550 includes advancing the wing panel past the fixed inspection heads as they inspect the portion of the wing panel. In such embodiments, it may be said that step 824 and step 826 take place at the same time, or overlap in time. In some embodiments in which the NDI inspection heads are mobile, advancing the wing panel 550 includes advancing the wing panel past the mobile inspection heads. In some of such embodiments, such as those in which advancing the wing panel 550 includes pulsing the wing panel in a process direction, the inspection is performed during pauses between the pulses and/or during the pulses. In some embodiments that include an array of inspection heads, the method includes moving the inspection heads relative to the wing panel 550 while operating the array. In any of these manners, the NDI station 524 inspects a portion of the wing panel 550 at a time, as it is advanced through the NDI station.

The position of the wing panel 550 relative to the NDI station 524, in some embodiments, is monitored by indexing the wing panel to the NDI station, such as by means of various indexing features and/or RFID chips, as noted above. In some embodiments, the indexing of the wing panel to the work station, either directly or via a strongback supporting the wing panel, conveys information about the wing panel to the NDI station controller, which in turn may direct NDI inspection of the wing panel based at least in part on this information. In some embodiments in which the indexing features are located in a manufacturing excess of the wing panel, the manufacturing excess is typically not inspected.

In some embodiments, the method continues with additional steps that are not shown in FIG. 7. For example, the method may continue by advancing the wing panel to the next work station (e.g., a cut-out station such as cut-out station 526, and so forth). In embodiments in which the wing panel is suspended beneath a strongback, such a method may advance the wing panel to the next work station while the wing panel remains suspended beneath the strongback. Some embodiments utilize multiple NDI stations for inspection, and some embodiments utilize the NDI station (or more than one NDI station) for NDI inspection of additional components. For example, in some of such embodiments, an NDI station scans stiffener flanges while scanning the wing panel, and additional NDI stations scan stringers attached to the wing panel.

Figure 8:
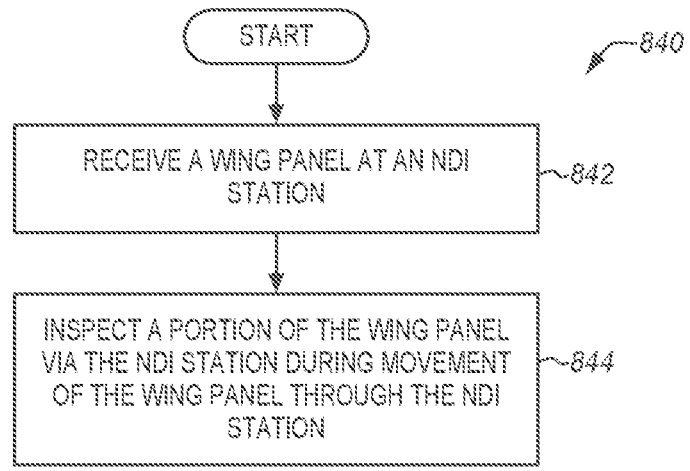

Above, it is noted that in some embodiments, NDI inspection is performed as the wing panel is advanced past NDI inspection heads. This may be done regardless of the manner of conveyance of the wing panel (e.g., via a strongback or otherwise). FIG. 8 further depicts a method 840 of inspecting a wing panel 550 in an illustrative embodiment. According to FIG. 8, step 842 includes receiving a wing panel 550 at an NDI station 524. Step 844 includes inspecting a portion of the wing panel 550 via the NDI station 524 during movement of the wing panel through the NDI station. The wing panel may be pulsed or advanced continuously through the NDI station, with inspection taking place during movement of the wing panel through the NDI station. As with method 820, in method 840, the NDI station may include mobile and/or fixed NDI inspection heads. In one embodiment the wing panel remains suspended beneath the strongback while the wing panel is at the NDI station. In a further embodiment, mobile inspection heads of the NDI station individually traverse distinct areal portions of the wing panel via mobile inspection heads of the NDI station. In this manner, inspection includes moving inspection heads relative to the wing panel while operating the array of inspection heads at NDI station.

Returning to FIG. 5A, mid-length section 578 of wing panel 550 is shown to be within cut-out station 526. Broadly, cut-out station 526 is configured to remove material from wing panel 550, for example within manufacturing excess 554 or otherwise. In some embodiments, cut-out station 526 cuts out one or more regions of wing panel 550, for example to install an opening such as an access port that will be utilized in a work station downstream, such as to provide access to the interior volume between wing panels after they have been joined together at a join station. Although not necessary to all embodiments, such access ports are typically installed in lower wing panels, as opposed to upper wing panels. As will become clear herein from the discussion relating to shimming operations (e.g., as shown and described with respect to FIGS. 16A-16C and 17A-17C), in some embodiments, a lower wing panel is provided with several access ports that provide access to bays between adjacent ribs, for example to facilitate shim installation by a robot arm. Thus, in such embodiments, cut-out station 526 may perform more work operations on a lower wing panel than on an upper wing panel. In either case, cut-out station 526 may install access port covers and/or doors into the wing panel 550, along with edge sealing, painting, and performing fastener drilling and installation, as suitable for the wing panel. In some embodiments, edge trimming of the manufacturing excess, and trimming of an access port, are performed at different work stations.

The terms "upper surface" and "lower surface" of wing panel 550 are used herein for convenience to indicate the relative orientations of the opposing surfaces of the wing panel as it is suspended below the strongback 540, in the illustrated embodiment. However, as will become clear herein, additional components (such as ribs and spars) may be installed to the lower surface 576 of wing panel 550 as the upper surface 574 thereof continues to be held by vacuum couplers 548 of pogos 545, to produce a wing assembly 600. As such, the surface indicated in FIGS. 5A-5G as lower surface 576 of the wing panel 550 becomes what may be thought of as an interior surface of a wing assembly 600, whereas the surface indicated as upper surface 574 of the wing panel 550 becomes what may be thought of as an exterior surface of a wing assembly 600. Accordingly, the terms "upper surface" and "lower surface" are not to be construed in a limiting sense.

FIG. 5C corresponds with the top view of assembly line 500 shown in FIG. 5A, but showing the strongback 540 as having advanced in the process direction 541 so that the wing root section 577 of wing panel 550 is within rib install station 528. Some aspects of FIG. 5A (e.g., various feeder lines, and so forth) are not shown in FIG. 5C, for simplicity. FIG. 5D shows a simplified side view corresponding with view arrows "5D" of FIG. 5C, with some components that are visible in FIG. 5C omitted to better illustrate the ongoing construction/progress of the wing panel 550 into a wing assembly 600. As noted above, rib install station 528 affixes (that is, temporarily and/or permanently installs) ribs 572. Ribs 572 are shown in these views in simplified form for ease of explanation, although they are often more complex in configuration and appearance, as described in greater detail in sections below.

FIG. 5C also shows, in spar install station 530, that spars 580 have advanced from feeder lines (not shown) to the station 530. As noted above, the supply of spars 580 to the spar install station 530 may be coordinated as just-in-time delivery for installation to a wing panel. Accordingly, FIG. 5C may show a state of assembly line 500 just before wing panel 550 is moved to spar installation station 530 for installation of the spars 580, which have just been supplied to the station.

FIG. 5C further illustrates the use of a mobile station 552 (also called a "follower"), which is configured to couple to the wing panel 550 and strongback 540 and perform work (such as trimming, installing fasteners, applying sealant, etc.) by traveling across the wing panel 550, for example along a mobile station track 551 that may be removably installed onto the wing panel 550. Although not required to all embodiments, mobile station 552 may perform the work during pulses (e.g., micro pulses), pauses (e.g., between micro pulses), or continuous motion of the wing panel 550 as it progresses through the assembly line 500. Depending on design, the mobile station 552 can "ride along" with (or "follow") the wing panel 550 for multiple pulses across multiple work stations 520, and can operate independently of the other work stations of the assembly line 500. During this process, the location and dimension of gaps (e.g. spacing) between strongbacks 540 enable placement of the mobile station track 551 and/or mobile station 552. In further embodiments, chutes and other complementary elements are disposed at the factory such that mobile station 552 passes over or though these elements during fabrication processes. Mobile station 552 may be removed along a return line, shown in FIG. 5C at 547, and sent, e.g. in a direction opposite the process direction 541 (e.g., upstream in assembly line 500) to be installed on a next wing panel as desired. In further embodiments, one or more of strongbacks 540 form a "smart bridge" by dynamically moving relative to the wing panel 550, in order to provide greater access to the wing panel 550 by the mobile station 552.

As noted above, FIG. 5D is a simplified side view of a portion of assembly line 500, showing wing panel 550 with attached ribs 572 being transported along track 510 while suspended below a set of three strongbacks 540. As briefly noted above, one or more adapters 543 may facilitate the movement of strongbacks 540 along the track 510. The ribs 572 are attached to a lower surface 576 of the wing panel 550 at a suitable angle, indicated as angle θ. As will be explained below, in some embodiments, ribs 572 are aligned vertically and raised into position for attachment to the lower surface 576 of the wing panel 550 (or, more specifically, an upper wing panel). As such, the wing panel may be suspended below the strongback(s) at an angle that corresponds to and/or facilitates the rib installation at angle θ. This is shown in FIG. 5D with the wing panel 550 tilted slightly upward from the wing root section 577 to the wing tip section 579.

FIG. 5D also provides another view of an illustrative configuration of pogos 545 and vacuum couplers 548. In the illustrated embodiment, the vacuum couplers 548 are capable of angular deflection relative to the pogos 545 and strongback 540. The angular deflection may be facilitated by a universal type joint, either at the point at which vacuum coupler 548 is coupled to the pogo 545 and/or at the point at which the pogo 545 is coupled to the strongback 540. The angular deflection may accommodate coupling to wing panel 550 during contour changes in the wing panel, to suspend the wing panel at a desired angle (as shown), and so forth. Owing to the angular flexibility of the vacuum couplers, by adjusting the pogos to appropriate lengths, the wing panel may be suspended at any desired angle. In further embodiments, otherwise-configured carriers 545 grip an upper surface 574 of the wing panel 550 (e.g., via clamping, interference fits, etc.). As explained in detail above, a desired contour can be enforced by adjusting the pogos 545 to predetermined lengths, which correspond with a desired vertical loft of the contour at each of multiple chordwise and spanwise locations.

As noted above, several factors may determine the positions of pogos 545, and their respective vacuum couplers 548, relative to the upper surface 574 of the wing panel 550, such as to enforce a contour to wing panel 550. In some embodiments, one factor is the manner in which ribs and spars are attached to the wing panel. For example, the pogos 545 and vacuum couplers 548 may be placed so that the positions of the vacuum couplers 548 on the upper surface 574 are spaced away from the corresponding positions on the lower surface 576 of the wing panel where ribs 572 will be attached to the wing panel (as in the view shown in FIG. 5D). This may be done, for example, to allow fabrication access to the rib 572 install area, and can facilitate either manual or automated drill and fastener installation connecting ribs to wing panels.

In FIG. 5D, one rib 572 is shown attached to the portion of wing panel 550 that is within rib install station 528. Other ribs 572, which are shown attached to the portions of wing panel 550 that have advanced past rib install station 528, were installed when those portions were within rib install station 528. Although four are shown, the number of ribs 572 may be, and often are, greater in an actual wing assembly 600. The wing panels, ribs, spars, and other components shown in FIG. 5D and the other drawings are for illustration purposes only and are not necessarily to scale or contour. For example, ribs 572 are shown in simplified, schematic form in this series of drawings. Later drawings, such as FIGS. 11A-11D and FIGS. 17A-17C, show illustrative ribs in greater detail. The rib configuration or number of ribs 572 of an actual wing assembly 600 may vary from that depicted herein.

FIG. 5E, a top view of assembly line 500 corresponding to those in FIGS. 5A and 5C, illustrates the wing panel 550 having been transported via strongbacks 540 to spar install station 530, wherein spars 580 are attached (e.g., as part of a full-pulse process). In this embodiment, the spars 580 are installed after the ribs 572, but in some embodiments the ribs 572 are installed prior to the spars 580. Also, FIG. 5E shows each spar, generally indicated at 580, as having been assembled from a number of individual spar segments, each separately indicated as 580-1 through 580-7 (however, unless specifically indicated otherwise, reference number 580 is used herein to refer to spars, as well as spar segments or spar sections). Spar install station 530 may receive preassembled spars 580, or individual spar segments or sections (e.g., 580-1 through 580-7) that are assembled at the spar install station, or both, from one or more feeder lines 570 (a representative one of which is shown in FIG. 5E). In embodiments in which spar segments are provided to spar install station 530, the spar segments may be assembled to each other prior to installation to the wing panel, for example to form a partial or whole spar that is then installed to the wing panel, and/or the spar segments may be installed as spar segments to the wing panel, forming a spar as they are separately installed. Additional components such as fasteners, sealant, and so forth are also supplied to spar install station 530 to facilitate installation. After installation, the strongbacks 540 transport the wing panel 550 back to track 510, and the wing panel 550 is further transported to receive additional work. In the illustrated embodiment, the strongbacks 540 progress to spar install station 530 in any suitable manner, such as a redirect track (not shown) configured to allow movement to spar install station 530 in direction 1004. After installation, the strongbacks may either progress in direction 1006 back to track 510 via the same redirect track, for example for further progress along track 510 (e.g. toward a panel join station), or are directed to another track, or progress along a track other than track 510. Another embodiment has spar install station 530 disposed along track 510 so that advancement of a strongback 540 in the process direction brings a wing panel into, through, and out of the station.

The illustrated configuration is an example of a configuration that may allow a work station 520, such as spar install station 530, to be selectively bypassed. As noted above, in some embodiments, ribs and spars are attached only to upper wing panels, and not to lower wing panels. In such embodiments, efficiency in transporting and/or performing work on wing panels may be achieved in a configuration that may allow one or more work stations 520 to be selectively bypassed, such as with upper wing panels being advanced into the spar install station 530, but with lower wing panels being advanced past the station. In some of such embodiments, the lower wing panels may instead be directed to a work station configured for work specifically on lower wing panels, and not on upper wing panels, such as a work station that cuts access ports into the lower wing panel (for example, a work station such as cut-out station 526). In these embodiments, additional spars and/or spar segments are then fed to spar install station 530 for attachment to a next wing panel 550 traveling along the track 510.

FIG. 5F illustrates an embodiment wherein, after work is complete at spar install station 530, wing panel 550 has been moved in direction 1006 back to track 510, and is ready to be advanced (in a pulsed or continuous fashion) in a process direction 541 along track 510 to further work stations 520, shown as a rib-to-spar attach station 598, and a panel join station 599, at which a lower wing panel may be joined to an upper wing panel to which ribs and spars have been attached. This operation results in a wing assembly 600 awaiting installation of, for example, further components, and/or electrical and other systems.

In FIG. 5F, rib-to-spar attach station 598 is shown to be disposed on track 510, whereas panel join station 599 is shown to be disposed off track 510, requiring movement of the wing panel 550 in direction 1008 to the panel join station 599. This may represent a configuration in which only upper wing panels proceed along this portion of the assembly line 500, with lower wing panels having been redirected to another track (not shown) or station, for example, by bypassing spar install station 530 and rib-to-spar attach station 598, and instead being delivered to panel join station 599 to await joining to an upper wing panel. Or, a lower wing panel may simply be transported through rib-to-spar attach station 598 without any work operations performed on it, thus effectively bypassing it. Or, in some embodiments, one or more work stations 520 may be configured to have multiple purposes, for example to perform certain work operations on, for example, upper wing panels, and other work operations on lower wing panels. Such configurations are within the scope of this disclosure.

In accordance with the concepts, components, systems, and apparatus discussed above relative to FIGS. 5A-5F, it is evident that other embodiments of an assembly line 500 that are consistent with this disclosure may take other configurations than those specifically illustrated and described. For example, some embodiments may produce a wing assembly using a different order of operations of joining wing panels, ribs, and spars, and thus may include some or all of the various work stations 520 in a different order, or include work stations other than those shown, or multiples of work stations 520, or work stations that perform some or all of the functions of work stations 520 in addition to other tasks, and so forth. In some of such embodiments, instead of spars and ribs being individually installed to a wing panel (such as an upper wing panel), as in the illustrated embodiments of assembly line 500, spars and ribs may instead be attached to each other, to form a ladder-like structure (with the spars as the "rails" of the ladder and the ribs forming the "rungs" thereof), which is then installed to a wing panel. Accordingly, such embodiments may include one or more work stations that assemble spars to ribs (to which may be supplied ribs, spars or spar sections, and fasteners, from appropriate feeder lines), and one or more work stations that install the rib-and-spar structure to the wing panel, and/or install the rib-and-spar structure between an upper wing panel and a lower wing panel. As with the illustrated embodiment of assembly line 500, the various components and structures supplied to the aforementioned work stations may be configured for JIT delivery to the appropriate work station.

An example of this is shown in FIG. 5G, which shows an alternative configuration of an assembly line, indicated as assembly line 500'. FIG. 5G generally corresponds with the top view of assembly line 500 shown in FIGS. 5C and 5E. However, whereas the assembly line configuration shown in FIGS. 5C and 5E includes a rib install station 528 and spar install station 530, at which ribs 572 and spars 580, respectively, are individually and separately installed to wing panel 550, the assembly line 500' shown in FIG. 5G instead is shown to include different work stations 520; specifically, a support structure assembly station 532, and a support structure install station 534. Support structure assembly station 530 is supplied with ribs 572 and spars 580, and fastening and/or sealing supplies, from one or more feeder lines 570 (a representative one of which is shown in FIG. 5G). For example, feeder lines corresponding to 491-6 and 491-7, as shown in FIG. 4, may provide spars and ribs, respectively, just in time and in the desired order to support structure assembly station 532 for assembly into a ladder-like support structure indicated at 588. Spars 580 may be preassembled or complete prior to provision to support structure assembly station 532, or may be provided thereto in the form of separate spar segments or sections (not individually shown) for assembly with ribs 572 into support structure 588.

When assembled, support structure 588 is transported (e.g., laterally) into support structure install station 534, as indicated by arrow 1014, and installed to wing panel 550. A cart or other manner of shuttle may transport the support structure 588, which may then be raised upward to the wing panel for installation. Alternatively or additionally, the wing panel may be lowered to the support structure 588. Although not shown in the view of FIG. 5G, fasteners and other supplies may be provided to support structure install station 534 together with the support structure, or separately via one or more feeder or supply lines. As such, FIG. 5G may show a state of assembly line 500' just before a completely assembled support structure 588 is delivered to support structure install station 534 for installation to a waiting wing panel 550. The movement of wing panel 550, via strongback 540 along track 510, may be coordinated with the provision of an assembled support structure 588, so that both the wing panel 550 and the support structure 588 are delivered to support structure install station 534 at the same time, or one or the other may be provided just-in-time for installation, and so forth.

The wing panel 550, with a support structure 588 of ribs 572 and spars 580 installed thereto, may proceed to a panel join station (such as panel join station 599 shown in FIG. 5F) so that another wing panel, such as a lower wing panel, may be installed to the assembly. The alternative configuration discussed above with respect to FIG. 5G may offer advantages over the configuration shown in assembly line 500, for example by not involving transporting a wing panel laterally relative to track 510 in order for spar installation to take place (as shown in FIG. 5E), or by achieving efficiency in installing ribs and spars together rather than separately, and so forth.

With reference to the various components of and concepts and operations embodied in, assembly line 500 presented in FIGS. 5A-5G and described above, FIG. 9 is a flowchart illustrating a method 860 of fabricating a wing via an assembly line, such as assembly line 500, in an illustrative embodiment. In step 862, a wing panel 550 is suspended beneath a shuttle, such as strongback 540, that enforces a contour 544 onto the wing panel 550. For example, in one embodiment the carriers 545 are affixed to the wing panel 550 via vacuum couplers 548, and are vertically positioned to enforce the contour. As described above, in some embodiments, suspending the wing panel 550 includes indexing the strongback 540 with the wing panel. The indexing may be a physical coupling (e.g., physically attaching to, or otherwise establishing a link with) between the strongback 540 and one or more indexing features installed in the wing panel 550, for example in a manufacturing excess of the wing panel 550. Additionally or alternatively, the indexing feature may consist of or include readable identifying means, such as an RFID chip/tag or a bar code, and indexing includes reading the identifying means with a suitable reader, such as an RFID reader, a scanner or bar code reader, and so forth (not shown).

In step 864, the wing panel 550 is advanced in a process direction, such as process direction 541, through at least one work station 520 (and usually multiple work stations 520) in an assembly line 500 via the strongback 540 while the contour 544 (e.g., as defined by upper surface 574 of FIG. 5B) is enforced. For example, the strongback 540 may be advanced along the track 510 while vacuum couplers 548 of the carriers 545 to the wing panel 550 are disposed at vertical positions that correspond with the contour 544. As noted above, enforcing a desired contour may be performed by aligning carriers 545 that each contact the wing panel at a predefined location on the wing panel, and during this process, the wing panel 550 may advance through an NDI station such as NDI station 524, which performs NDI on the wing panel. During pauses between pulses, or during continuous motion, the wing panel 550 is indexed to the various work stations 520. This can be performed by indexing the work stations 520 to the indexing features 210 of the wing panel 550 itself, such as described above with respect to indexing the strongback 540 to the wing panel, or by indexing the work stations 520 to indexing features of the strongbacks 540 carrying the wing panel 550.

In step 866, structural components such as ribs 572 and spars 580 are installed into the wing panel 550 while the contour 544 is enforced (by the combination of strongback 540, carriers 545, and vacuum couplers). This may comprise co-bonding and/or fastening the ribs 572 and spars 580 to the wing panel 550 while the wing panel 550 remains suspended from the strongback 540. Or, it may involve assembling ribs 572 and spars 580 into a support structure 588, which is then installed to the wing panel 550 while the wing panel remains suspended from the strongback. In one embodiment, advancing the wing panel 550 comprises pulsing (e.g., by full-pulse, or micro pulse) the wing panel in a process direction, and installation of ribs 572 and spars 580 is performed during pauses between the pulses. In a further embodiment, advancing the wing panel 550 comprises continuously moving the wing panel in a process direction, and installation of ribs 572 and spars 580 is performed while the wing panel continuously moves.

Figure 9:
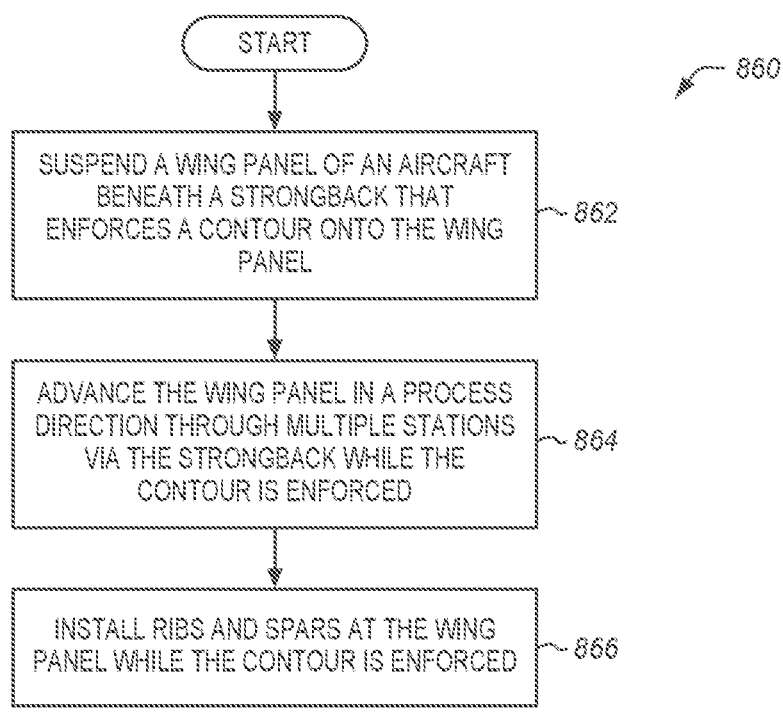
FIG. 9 is a flowchart illustrating a method of installing ribs and spars to a wing panel in an illustrative embodiment.

Although not specifically shown in FIG. 9, in some embodiments, method 860 further includes additional operating work stations 520 arranged along the process direction to perform a variety of different work operations, such as installing ribs and/or spars, joining ribs and/or spars to each other and/or to the wing panel, performing rework, inspecting the wing panel, cutting/installing access ports, and so forth. In some embodiments, multiple work stations 520 are provided to perform the same type of operation.

Method 860 may provide one or more technical benefits over prior techniques, for example because it enables a wing panel 550, or a portion thereof, to remain indexed to each of the work stations 520 in a fabrication environment, even as the wing panel is transported through multiple work stations 520 for receiving work. That is, the wing panel 550 remains indexed to the strongbacks 540 during transport, which means that the work stations 520 can rapidly index themselves to the strongbacks 540, the wing panels 550, or both. Furthermore, the technique of suspending the wing panel 550 beneath a strongback 540 enables greater and more ergonomic access and inspection of the wing panel 550 during assembly processes (e.g., by technicians).

Figure 10:
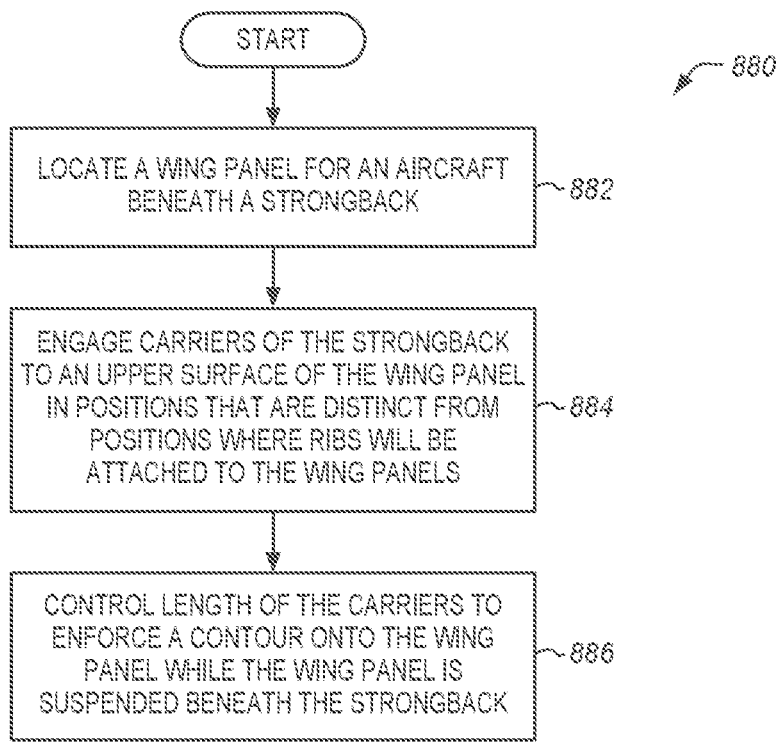
FIG. 10 is a flowchart illustrating a further method of enforcing a contour onto a wing panel in an illustrative embodiment.

FIG. 10 is a flowchart depicting a method 880 of enforcing a contour onto a wing panel in an illustrative embodiment. According to method 880, step 882 includes locating a wing panel for an aircraft beneath a strongback. As described in detail above, this step may involve moving a wing panel 550 underneath a strongback 540 that is configured to extend over a transverse section of the wing panel, indexing the wing panel to the strongback via indexing features (e.g., physical indexing features and/or readable identifying means) of the wing panel, hard stops, visual techniques, and/or other processes. Step 884 includes engaging pogos of the strongback to an upper surface of the wing panel in positions that are distinct from positions (e.g., corresponding positions on the lower surface of the wing panel) that correspond to where structural components, such as ribs and spars, will be attached to the wing panel. As noted above, this is performed to allow fabrication access to the rib or spar install area, for example to facilitate manual or automated drilling, fastener installation, and so forth, to allow ribs and spars to be installed to wing panels. The ribs may be made from metallic materials or composites. If the rib is made from aluminum, then one or more layers of fiberglass or other material are placed at an intersection between the aluminum and the carbon fiber. This can be accomplished via fiberglass isolation plies along with sealant at the wing panel in areas where the ribs will be placed (sometimes referred to as the "rib land area"). In one embodiment, this comprises physically engaging the pogos to the upper surface, and activating vacuum systems that apply suction via the pogos to the wing panel.

Step 886 includes controlling a length of the pogos to enforce a contour on the wing panel while the wing panel is suspended beneath the strongback. The pogos are independently adjustable. In one embodiment, controlling the length of the pogos is performed by setting the pogos to a predetermined length, while in further embodiments, this comprises operating actuators or air pressure to enforce specific lengths on each pogo. When the pogos are all set to their desired lengths, the wing panel is held in conformance with a desired contour at which ribs can be installed, provided the vacuum couplers of the respective pogos are located properly for the particular wing panel.

As noted above, in some embodiments, scanning is performed to determine an initial wing panel contour. It is possible that no changes in the contour need to be enforced if the wing panel is already at a desired contour. In such circumstances, a retention force applied by each pogo may be less than in circumstances where a contour of the wing panel is actively enforced by the pogos. Adjustments to the length of each pogo (i.e., longer or shorter) relative to the strongback, e.g. to push and/or pull the wing panel into a desired contour, is determined by design parameters for the wing panel. The locations of the vacuum couplers of the pogos are precisely located relative to the upper surface of the wing panel to ensure that when the pogos are at the desired length, the contour enforced by the pogos corresponds with expectations.

Figure 11C:
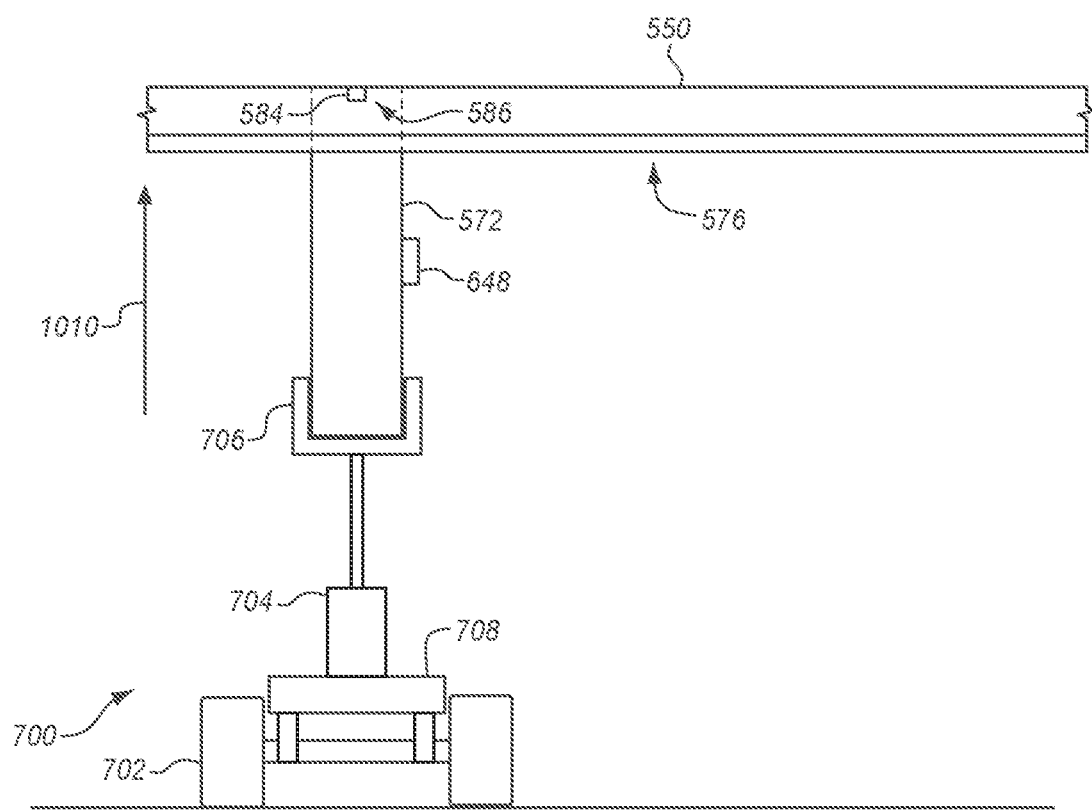

As noted above, in FIGS. 5A-5G, which show various aspects of assembly line 500 (or 500') for a wing assembly, including the operations that take place as a wing panel 550 proceeds through a variety of work stations 520 disposed along the assembly line, many systems, operations, and components (e.g., ribs 572) are shown in simplified form and/or schematically, for ease of explanation. FIGS. 11A-11D illustrate, in greater detail, the installation of additional components to wing panel 550 in the production of a wing assembly 600. In particular, FIGS. 11A-11D show the installation of a rib 572 to wing panel 550, which in the embodiment shown is an upper wing panel 550-1, at rib install station 528. As such, wing panel 550 may be referred to in the following section as "upper wing panel 550-1," or simply as "wing panel 550-1," for convenience. The term "wing assembly" refers to the structure produced when wing components such as wing panels, ribs, and/or spars, are assembled together. As described in detail below, FIG. 11A shows a rib 572 being moved into position beneath upper wing panel 550-1 by means of a shuttle, and FIGS. 11B and 11C show the rib being lifted upwards toward the lower surface of the upper wing panel for installation thereto. FIG. 11D shows a resulting wing assembly 600, with the rib 572 installed to the wing panel 550-1, and with a pair of spars 580 installed at either end of the rib 572.

The view shown in FIGS. 11A and 11B correspond generally with that of view arrow "11" in FIG. 5C, and show wing panel 550-1, in a chordwise sectional view, suspended beneath a strongback 540 by means of pogos 545 that are coupled with the upper surface 574 of the wing panel via vacuum couplers 548, in accordance with the explanation provided above. Wing panel 550-1, or at least the cross-sectional portion shown in FIG. 11A, is disposed within rib install station 528. As detailed in the discussion above, the wing panel 550-1 may be indexed to the work station 520, either directly or via one or more of the strongbacks 540 supporting it. Wing panel 550-1 is shown to have several stringers 640 installed to its lower surface 576, which are shown to have a T-shaped cross-section. While six stringers 640 are shown, a greater or fewer number of stringers may be used for a particular upper wing panel and/or rib 572, and/or for a particular position along the spanwise length of the wing panel. In the context of an assembly line, such as assembly line 500 shown in FIGS. 5A-5F (and/or assembly line 500' shown in FIG. 5G), stringers 640 may have been installed prior to rib installation, such as at any point upstream of the rib install station 528, or provided during the initial fabrication of the upper wing panel from a preform.

Although a number of rib configurations are possible and within the scope of this disclosure, rib 572 in FIGS. 11A-11D is shown as an elongate, solid structure including a web 646 that is reinforced—that is, held in contour—by a stiffener 648 (e.g., a beam or bracket that enforces a contour onto the rib prior to affixing the rib to the wing panel 550). The top and bottom edges of the rib 572 are shaped to follow the respective contours of the wing panels to which the rib 572 are to be installed, and are provided with a number of openings or "mouse holes" 650 that are sized and positioned to accommodate, for example, stringers 640, as well as cables and other structure that may be installed (not shown).

Web 646 also includes a number of access holes 652 that are located inward from the edges of the rib, for similar purposes.

In FIG. 11A, the rib 572 is advanced into position, and in one embodiment enters the rib install station 528 from a feeder line (indicated at 570), which may be a rib feeder line (such as rib feeder line 491-7), that supplies the ribs 572 to rib install station 528 in a just-in-time or JIT timing scheme. More specifically, in FIG. 11A, the rib 572 is held at a vertical orientation while being transported via a shuttle 700 (e.g., a manual cart or an automated cart propelled on rails, an Autonomous Guided Vehicle (AGV), etc.). The rib 572, as discussed above, may be fed via a just in time feeder line to the shuttle 700, and may be moved during a pause between pulses to enter the rib install station 528. In the configuration shown, shuttle 700 advances perpendicular to a process direction of the wing panel 550. The shuttle 700 is shown to be driven by wheels 702 (e.g., motorized wheels) across floor 710, but may alternatively be disposed on rails, or a track, and so forth. The wheels 702 drive the chassis 708, which translates the chassis 708 horizontally/laterally in direction 1008, and thus transports the rib 572 to a position/location directly underneath the wing panel 550. The shuttle 700 may include indexing features (not shown) to facilitate indexing of the cart relative to the rib install station 528, to assure proper positioning of the shuttle relative to the rib install station prior to advancing into position beneath the wing panel 550, and/or of the shuttle (and thus the rib) relative to the upper wing panel 550-1 when the shuttle is advanced into position. Such indexing features may take the form of cups and cones of a cup-and-cone indexing systems, hard stops, and/or other configurations. The chassis 708 holds one or more actuators 704, as well as supports 706 that are affixed to the actuators 704. Supports 706 are configured to cradle the rib 572 in vertical orientation. The actuators 704 (or other lifting apparatus) are configured to drive the supports 706 vertically, such as to lift the rib 572 vertically into contact with lower surface 576 of the wing panel 550.

FIG. 11B shows the rib 572 after it has been driven vertically upward in direction 1010 to contact a lower surface 576 (e.g., onto a rib land area) of the upper wing panel 550-1. The mouse holes 650 disposed along the upper edge of the rib 572 can now more clearly be seen to be sized and positioned to accommodate stringers 640. The clearance between the rib 572 and the stringers 640 at the mouse holes 650 may be greater or less than as shown. The rib 572 is held at a desired orientation and position by supports 706, during the coupling to the wing panel. Although the disclosure has in the prior discussion used the term "installation," this term may encompass a temporary or a permanent attachment. Thus, when the rib 572 is first brought into contact with the wing panel, the coupling may be temporary, e.g., by clamping and/or tacking the rib 572 in place, or permanent, such as by the use of temporary or permanent fasteners (e.g., via automated or manual drill and fastener installation techniques, before and/or after removal of the shuttle 700), or the rib 572 can be permanently affixed while aligned with the upper wing panel 550-1. In some embodiments, for example those described further below with reference to FIGS. 16A-16C and FIGS. 17A-17C, shims may be installed to fill gaps at the rib to wing panel interface after the rib 572 has been temporarily fastened to the wing panel, but prior to permanent installation thereto. Either way, once coupled to the upper wing panel 550-1, the coupling means hold the rib 572 at the desired position, so the shuttle 700 may be removed.

In other embodiments, one or more strongbacks 540 suspend the upper wing panel below via pogos 545 that form a vacuum attachment to the wing panel, and lower the wing panel into contact with the rib 572 by adjusting lengths of the pogos (and/or lowering the strongback 540), as opposed to the rib 572 being raised upward to the wing panel. Still other embodiments may employ a combination of movements of both rib 572, and upper wing panel, in order to bring the two components into contact. In some embodiments, the rib 572 is installed subsequent to the installation of a spar or spar segment (not shown in this view), and the spar facilitates holding of a contour (e.g., a spanwise contour, while chordwise contour is held by the rib). Specifically, in such an embodiment, the spar 580 may prevent lateral (e.g. chordwise) shifting of the rib 572, spanwise shifting of the ribs relative to each other, twisting of the ribs 572 and upper wing panel 550-1 about a spanwise 590 axis, and so forth. Further, in some embodiments, a support structure (such as support structure 588) is assembled from ribs and spars, which is then installed to the wing panel. Such embodiments may involve the use of multiple shuttles, and/or a differently configured shuttle, as compared to shuttle 700, to transport and/or lift the support structure to the wing panel.

FIG. 11C corresponds with view arrows 11C of FIG. 11B, and further illustrates the relationship between shuttle 700, rib 572, and upper wing panel 550-1. FIG. 11C further illustrates that in this embodiment, the upper wing panel 550-1, and specifically the lower surface 576 thereof, includes an alignment feature 584 configured to align with a complementary alignment feature 586 at the rib 572. The configuration of alignment features 584 and 586 may be any that achieves registration of the rib with the upper wing panel 550-1, such as a cup-and-cone configuration, and so forth. There may be multiple corresponding pairs of indexing features for each rib. Furthermore, in some embodiments, alignment feature 584 is installed during fabrication of the upper wing panel 550-1 as an indexing feature 210. These alignment features facilitates alignment of the rib 572 prior to fastening the rib 572 to the upper wing panel 550-1. Thus, in one embodiment, lifting the rib 572 includes mating the rib 572 to an alignment feature 584 at the wing panel 550. The ribs 572 are delivered as needed to the rib install station 528 in a just in time (JIT) manner from a parallel assembly line/feeder line. In this manner, different ribs are created in serial for placement in wing assembly 600 in a pulsed environment as needed.

FIG. 11D is an end view of a wing assembly 600 that includes a wing panel 550 (e.g., an upper wing panel 550-1) with attached ribs, of which the rib 572 is visible (i.e., rib 572 blocks the view of other ribs behind it). The upper wing panel 550-1 is transported along an assembly line in an illustrative embodiment; for example, via strongback 540, which conveys the upper wing panel 550-1 (now part of wing assembly 600) along track 510. Wing assembly 600 may be at least partially disposed within a rib install station 528, such as shown in the view presented in FIG. 5C. In the embodiment shown in FIG. 11D, however, spars 580 are shown to be installed to either side/on either end of rib 572; as such, the wing assembly 600 may be at least partially disposed within a spar install station 530, such as shown in the view presented in FIG. 5E, or a rib to spar attach station 598, such as shown in the view of FIG. 5F, depending, for example, on the order in which the spars 580 and ribs 572 are installed.

Figure 12:
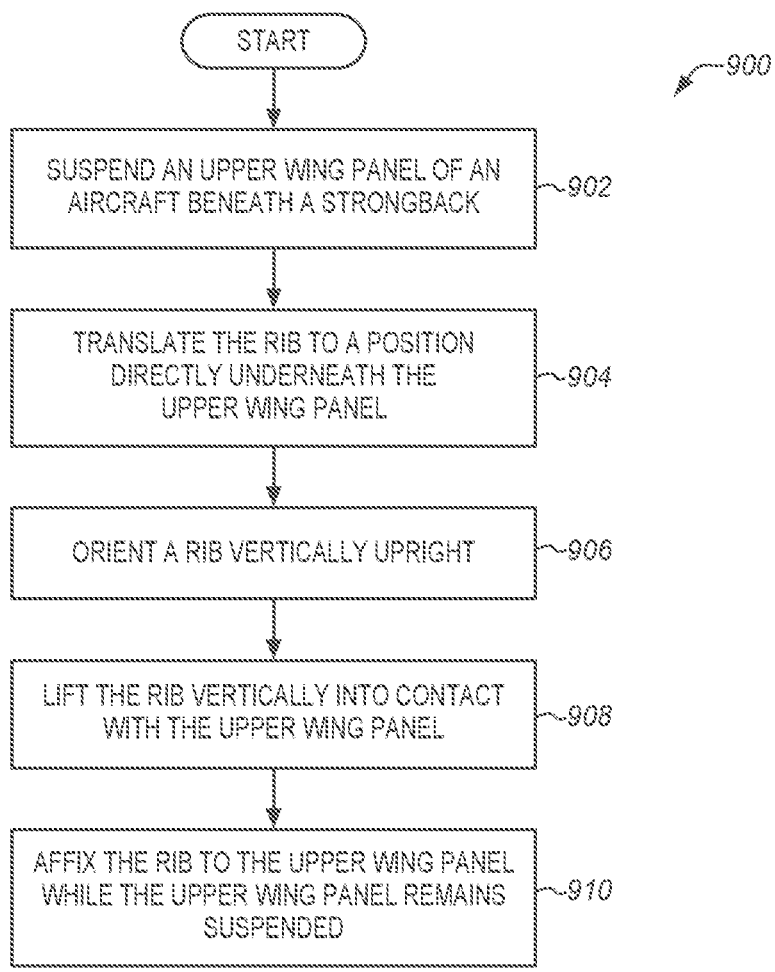
FIG. 12 is a flowchart illustrating a method of affixing a rib to an upper wing panel in an illustrative embodiment.

In accordance with the components and operations discussed above, FIG. 12 is a flowchart illustrating a method 900 of installing a rib into an upper wing panel in the production of a wing assembly in an illustrative embodiment. The description of the method will refer to components and concepts discussed above and shown in the drawings, but the method is applicable to a variety of settings. Step 902 includes suspending an upper wing panel 550-1 of an aircraft beneath a shuttle, such as strongback 540. In accordance with many of the methods described above, this step may include (and/or be preceded by) demolding the upper wing panel 550-1 from a layup mandrel, indexing the upper wing panel to the strongback 540, and/or coupling the wing panel with the strongback (such as via vacuum couplers 548 of pogos 545) to hold the upper wing panel while enforcing a contour onto it.

Step 904 includes translating the rib to a position underneath the upper wing panel. This step may be performed while the wing panel is paused between pulses through work stations. In some embodiments, this includes driving a shuttle (such as cart 700, which may be a manually operated cart, an AGV, or otherwise-configured vehicle) that supports the rib into the desired position. The cart may be controlled according to an NC program, and may be positioned based on a track/rail system that enforces a desired orientation, or marks at the factory floor that indicate a desired position for placement, via radar or lidar, visual tracking, etc. In the illustrated embodiment, the position to which the rib is translated is directly beneath the location on the upper wing panel to which the rib will be installed.

Method 900 is shown to include a step 906 of orienting the rib 572 vertically upright. In some embodiments, after demolding, the rib 572 is assembled or otherwise worked on while in an upright position, such as on a jig or similar frame, and thus may not need to be oriented upright for installation (for example if moved directly from the jig to the cart 700 without changing its orientation). A jig may be used in order to place or enforce a desired contour, such as a flat contour, onto the rib. As noted above, a stiffener that runs the length of the rib is coupled to the rib after demolding to enforce a contour onto the rib. In some embodiments, the rib may be (or become) oriented in a direction other than a vertical orientation, such as during assembly or while being supplied to the rib install station, such that vertically upright orientation is needed prior to installation. In some embodiments, the orienting is performed by placing the rib 572 onto the cart 700, where the rib is then held at the desired vertical orientation by supports 706. Method 900 may, in some embodiments, include supplying ribs in a just in time (JIT) fashion, such as via a feeder line that is configured to have a suitable takt time for JIT delivery.

Although in the illustrated embodiment, the "orienting" step 906 is shown to follow the "translating" step 904, this is not required to all embodiments. In some embodiments, the "orienting" step (906) is performed as a part of, or at least partially during, the "translating" step (904). In some embodiments, orienting is performed prior to translating (such as during loading the rib 572 onto the cart 700).

In step 908, the rib 572 is placed into contact with the upper wing panel. As noted above, this may be performed lifting the rib vertically, such as by driving actuators 704 of the cart 700 to raise the rib 572 into contact with the lower surface 576 of the upper wing panel 550-1. In some embodiments, this may be performed by lowering the upper wing panel, such as by means of pogos 545 of the strongback 540, into contact with the rib. In some embodiments, a combination of lifting the rib and lowering the wing panel is performed, in order to bring the components into contact. In some embodiments, placing the rib 572 into contact with the upper wing panel 550-1 includes mating the rib to one or more indexing features of the wing panel (such as by coupling alignment features 584 and 586 as shown in FIG. 11C). This may ensure final precise alignment of the rib 572 with the upper wing panel 550-1.

As shown, for example, in FIG. 5D, the ribs 572 in some embodiments may be fastened to the wing panel 550, or at least one or more portions of the lower surface thereof, at an angle, shown as installation angle θ. As such, in fabrication methods in which the rib 572 is oriented vertically, or in other words at an angle typically normal to a track 510 and/or floor surface 710, and then lifted upward to the lower surface of the wing panel, installing the ribs at the desired installation angle θ relative to the wing panel may be facilitated by disposing the wing panel in a suitable orientation, e.g., by disposing the wing panel so that the lower surface thereof is canted at an angle that is complementary to the installation angle θ. This may be done during initially suspending the upper wing panel 550-1 beneath the strongback(s) in the suitable orientation, or the pogos may have their lengths adjusted prior to the rib installation procedure in a manner configured to change the orientation of the wing panel to one suitable for installation of the ribs.

In step 910, the rib 572 is affixed to the upper wing panel 550-1 while the upper wing panel remains suspended from the strongback 540. Affixing, as the term is used herein, encompasses temporarily holding the rib in position, such as by tack fastening, clamping, and/or other techniques, as well as permanently installing. In some embodiments, the rib 572 is held in position prior to permanent installation, such as to allow selective installation of shims into gaps, if any, at the rib to wing panel interface. In some embodiments, installing includes driving or otherwise installing fasteners through the upper wing panel 550-1 and the rib 572. These operations may be performed via end effectors that install lockbolts, or by other means. In some embodiments, so as not to obstruct or interfere with fastening operations, vacuum attachment performed via vacuum couplers 548 located between or among, but in any case, distinct from, rib install locations. Thus, in such embodiments, the vacuum couplers 548 are disposed on the wing panel 550 so that their locations do not interfere with operations such as tack fastening and/or permanent fastener installation of the rib 572, performed by technicians or automation.

Steps 904 (translating the rib), 908 (placing the rib into contact with the wing panel), and 910 (affixing the rib to the wing panel) are all performed while the wing panel 550 is suspended, and/or while maintaining the rib 572 vertically upright. One or more, or all, of the steps of method 900 are performed at a rib install station. The method 900, or a sequence of steps thereof, may be performed iteratively for a plurality of ribs 572 to be installed onto the same wing panel 550.

Method 900 provides a technical benefit over prior systems and techniques, because it enables a contour to be enforced upon a wing panel 550, and for ribs 572 to be rapidly installed into the wing panel while the contour remains enforced. By keeping the ribs vertically oriented throughout the installation process, method 900 can save labor and increase efficiency on the factory floor and/or on an assembly line.

In some embodiments, after at least one rib has been affixed (e.g., installed to upper wing panel 550-1), spars 580 are affixed to the ribs and to the wing panel, such as to close off the leading and trailing edge portions of the wing panels/ribs. In some of such embodiments, sections of spars are joined lengthwise to each other at a rib to make a spar, making the rib a part of the splice between spar segments. In some of such embodiments, spars 580 are affixed at a station downstream of a rib install station, such as a spar install station, such as spar install station 530 of assembly line 500 as shown in FIGS. 5E and 5F. In one embodiment, a spar 580 consists of three spar sections, so there are two spar/rib splices. In some embodiments, spars 580 and ribs 572 are affixed simultaneously to a wing panel 550, such as at two different stations and/or two different locations on the wing panel 550.

The installation of the ribs and spars to the wing panel, and to each other, may include any suitable technique, including those disclosed herein. Some embodiments of the method 900 continue, such as with the joining of a lower wing panel to the ribs and spars installed to the upper wing panel. A more detailed explanation of one manner in which this is carried out is provided below with reference to FIGS. 16A-16C, which illustrate one manner of installing shims during the assembly of a wing assembly.

In some embodiments, there is a work station upstream of the spar install station where the wing panel is trimmed to final production dimensions (e.g., its final perimeter) and the indexing features in the manufacturing excess are removed (i.e., along with the manufacturing excess). This trimming is followed by sealing and painting, performed in a pulsed or continuous fashion. In some embodiments, trimming of the wing panel to its final perimeter (and/or sealing and painting) is performed after ribs and/or spars are installed.

Figure 13:
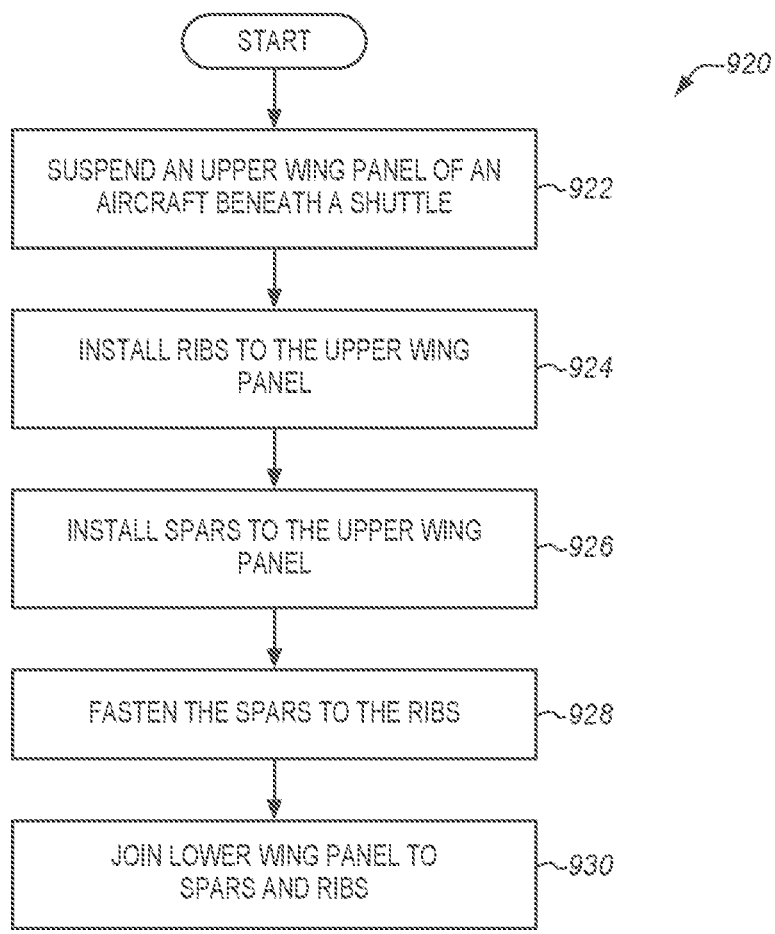
FIGS. 13-15 are flowcharts illustrating methods of installing ribs and spars to an upper wing panel in an illustrative embodiment.

FIG. 13 is a flowchart illustrating a method 920 of assembling a wing assembly in an illustrative embodiment, which involves components, concepts, and processes discussed in detail above, but which focuses on the aspect of the installation of ribs and spars to an upper wing panel while the wing panel is suspended beneath a shuttle. As such, step 922 includes suspending an upper wing panel 550 of an aircraft beneath a shuttle, such as a strongback (for example, strongback 540). Step 924 includes installing ribs 572 onto the upper wing panel 550-1. Step 926 includes installing spars 580 onto the upper wing panel 550-1. Step 928 includes fastening the spars 580 to the ribs 572. Finally, step 930 includes joining a lower wing panel 550-2 to the spars 580 and ribs 572.

As noted above, the joining of the various wing assembly components may occur in a different sequence than as shown in the illustrated embodiments. In some embodiments, one or more of the ribs are installed prior to the installation of the spars (or spar sections). In some embodiments, all of the ribs are installed prior to the installation of the spars (or spar sections). In some embodiments, ribs and spars are installed at the same time, or overlapping in time, for example in multiple work stations in an assembly line, and/or at multiple locations on the wing panel.

Figure 14:
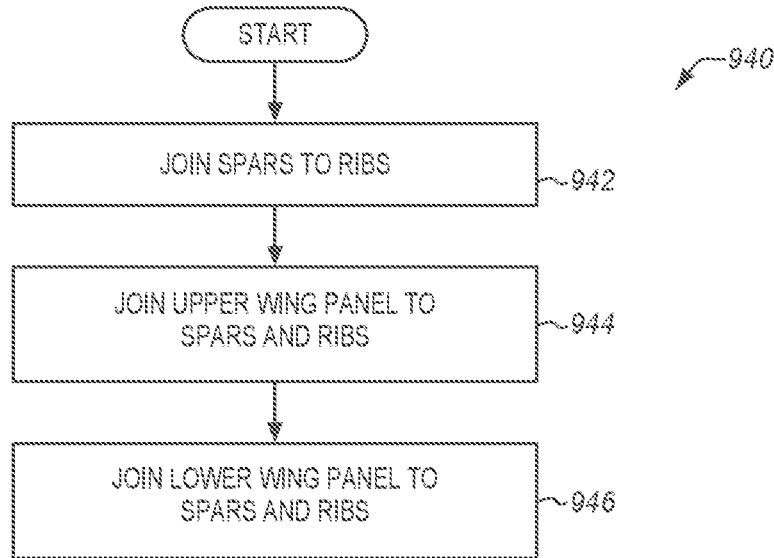

Further, in some embodiments, spars 580 (or spar sections) are joined to ribs 572 prior to affixing the ribs to a wing panel (such as upper wing panel 550-1), to produce a wing assembly having a horizontal, open ladder-like structure such as support structure 588 (best seen in FIG. 5G), to which the upper and lower wing panels 550 are then installed. FIG. 14 is a flowchart illustrating a further method 940 of assembling a wing assembly in such an embodiment. The embodiment includes joining of spars 580 to ribs 572 in step 942. An upper wing panel 550 is then joined to the spars 580 and ribs 572—or one side of the support structure 588—in step 944. This process may involve suspending the upper wing panel 550-1 beneath a shuttle, such as a strongback, as in other example methods, and raising the support structure 588 of joined ribs and spars into position to affix it to the upper wing panel. In some of such embodiments, all of the ribs and spars are fastened together prior to joining with an upper wing panel; in others of such embodiments, further ribs and/or spars, or spar sections, are attached to the wing assembly after the support structure 588 is joined with the upper wing panel. A lower wing panel is finally joined to the opposite side of the support structure 588 of the joined spars 580 and ribs 572 to complete the wing assembly, in step 946.

As noted above, in some configurations of an assembly line for a wing assembly, various work stations may be arranged in a manner that facilitates performing several operations on a wing panel at the same time, or overlapping in time, as the wing panel is moved in a process direction along the assembly line. FIG. 5A, for example, shows a configuration in which different sections of the same wing panel 550 are positioned within multiple work stations 520; in particular, NDI station 524, cut-out station 526, and rib install station 528. In other embodiments, further work stations 520 such as spar install station 530 (FIG. 5E), support structure assembly station 532 and/or install station 534 (FIG. 5G), as well as a rib-to-spar attach station 598 and/or a panel join station 599 (see FIG. 5F) may also be so arranged.

Figure 15:
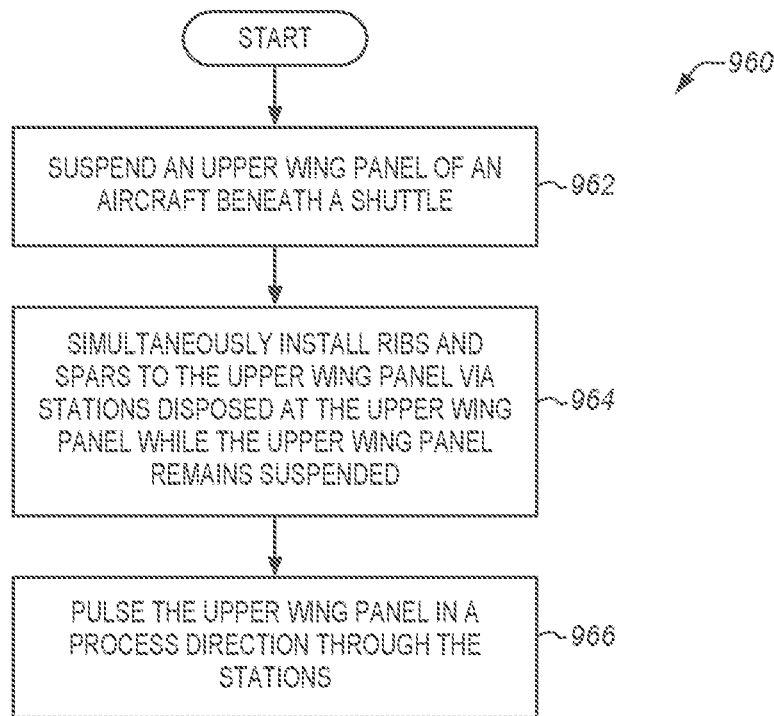

FIG. 15 is a flowchart illustrating aspects of multiple operations being performed to a wing panel at the same time, or overlapping in time, and shows a method 960 of assembling a wing, or wing assembly, such as by installing a rib and spar to an upper wing panel, in an illustrative embodiment. Step 962 includes suspending an upper wing panel 550-1 of an aircraft beneath a shuttle, such as a strongback (for example, strongback 540). Step 964 includes installing one or more ribs 572 and one or more spars 580 (or sections of spars 580) to the upper wing panel 550 via stations 520 disposed at the upper wing panel, at the same time or at least overlapping in time, while the upper wing panel remains suspended. Step 966 includes pulsing the upper wing panel in a process direction through the work stations 520. In some embodiments, additional work stations 520 also perform operations on the wing panel during these operations, including installing access ports (at a cut-out station), attaching ribs to spars (at a rib-to-spar attach station), and so forth. In a further embodiment, the work stations install ribs and spars during pauses between pulses of the upper wing panel. In a further embodiment, the method further includes affixing a lower wing panel to rib(s) and spar(s) installed to the upper wing panel.

Various aspects of wing assembly, such as rib and spar installation to a wing panel, may involve installation of shims between the wing panel and one or more ribs and/or spars, for example if any gaps between the various components exceed a certain size, such as a shimming tolerance threshold. Shim installation may be performed, for example, after ribs and spars have been clamped and/or tacked into place, but before the ribs and spars have been fastened together in the assembly line 500 of FIG. 5A, before or after a lower wing panel has been attached. The shims fill gaps between the various components (e.g., between a rib and the upper or lower wing panel, between a spar and the upper or lower wing panel, between a rib and a spar, and so forth), once the components have been located to each other and tacked/clamped into place.

FIGS. 16A and 16B are diagrams illustrating automated installation of shims between ribs and wing panels in illustrative embodiments, specifically by means of an end effector of a robot arm that may be detachably coupled to the stiffener of each rib. In more detail, as shown in both FIGS.

16A and 16B, a wing assembly 600 is suspended below a strongback (not shown) by means of adjustable-length pogos 545 that include vacuum couplers 548 that are coupled to the upper surface 574 of a wing panel 550 of the wing assembly. FIG. 16A shows an embodiment in which the wing assembly 600 includes one wing panel 550, in the form of an upper wing panel (indicated at 550-1), whereas FIG. 16B shows an embodiment in which the wing assembly 600 also includes a second wing panel 550 in the form of a lower wing panel (indicated at 550-2). The wing assembly 600 is shown to have a number of ribs 572 affixed to the lower surface 576 of the upper wing panel 550-1.

In some embodiments, there may be one or more gaps between coupled components of a wing assembly 600, such as between a rib 572 and the surface of the wing panel to which it is installed, between a spar 580 and a wing panel 550, between a rib 572 and a spar 580, and so forth. If a gap is determined to exceed a certain size, in that one or more dimensions of the gap (e.g., width, depth, length, etc.) exceeds a certain threshold, which is also referred to herein as a shimming tolerance threshold, then a shim of a suitable size and configuration is installed into the gap, to fill it. In the illustrated embodiment, this is done by a robot arm 750, and more specifically by an end effector 752 of the robot arm. End effector 752 is shown in FIG. 16A to include a grasping device 754 configured to hold a shim 756, such as to install into a gap that has been determined to be a shim location (indicated as 758). In some embodiments, the end effector 752 includes components or devices for inspection (not shown), such as a camera, laser, ultrasonic device, probe or feeler gauge, and so forth, in order to scan or otherwise visually or physically detect or assess gaps along the joint between joined components, and further to make or enable the determination of whether a gap exceeds a shimming tolerance threshold and is thus a suitable location for installation of a shim 756 (i.e. a shim location 758). In some embodiments, the robot arm 750 includes multiple end effectors 752, such as one for inspection and another for installation.

Although other configurations are possible, in FIG. 16A, robot arm 750 is shown as a kinematic chain of actuators 760 and rigid bodies 762 that extends from a carriage 764. Carriage 764 is in turn mounted on stiffener 648 of the rib 572. Stiffener 648 is also referred to herein as a "bracket." In some embodiments, such as described above, the bracket 648 is installed to the rib 572 prior to installation of the rib to the wing panel 550, to function as a stiffener, that is, to stabilize the rib and/or enforce a desired (e.g. flat) contour to the rib. As such, bracket 648 in some embodiments serves both as a stiffener and as a connection point for the robot arm. In further embodiments, the bracket 648 may additionally or alternatively serve as a general connection point for machinery or equipment used to move or otherwise handle the rib during fabrication and/or assembly operations. In some embodiments, the bracket is removably attached, e.g. with bolts or other like fasteners. As detailed further below, the coupling between the carriage 764 of the robot arm 750 and the bracket 648 of the rib 572 is a removable one, so that the robot arm may be coupled and de-coupled from the bracket via a detachably mounting the carriage 764 on the bracket. Further, in the illustrated embodiment, the coupling is such that the carriage 764 is independently movable along the length of the bracket, such as to facilitate the robot arm to access gaps and/or shim locations 758 along the length of the rib 572.

The robot arm 750 may be moved (e.g. relocated) from one bracket to another, such as by being decoupled from a first bracket and then coupled to a second one, to operate in different locations along the wing assembly 600. In the embodiment shown in FIG. 16A, this is done by means a cart 770. Cart 770 includes a set of wheels 772 mounted to and configured to support a cart body 774 relative to a surface, such as a floor surface. One or more wheels 772 may be motorized or otherwise driven. Cart body 774 in turn supports a telescopic lift 776, which is configured to engage, and raise or lower, carriage 764. As such, cart 770 is configured to position the carriage 764 for coupling to bracket 648, or to move the carriage after it is de-coupled from the bracket of a first rib 572 to a position in which it may be coupled to a bracket of a second rib, and so forth, such as by a combination of raising or lowering the lift 776 and moving the position of the cart body relative to a floor surface (and/or rib 572) by means of wheels 772.

As depicted, cart 770 also includes a controller 778, which may partially or completely control the movements of cart body 774 and/or lift 776, and/or the coupling/decoupling of carriage 764 relative to a bracket of a rib 572. Controller 778 may, in whole or in part, control the operations of robot arm 750 and its end effector 752. In some embodiments, robot arm 750 is operated in accordance with an NC program by controller 778 to visually inspect a location between the rib 572 and the wing panel 550, in order to determine whether shims 756 will be used, and what size of shims will be used, and/or to install the shims. In other embodiments, some or all of these movements are remotely controlled, such as by an operator, or by a floor controller (not shown). Thus, it can be understood that FIG. 16A illustrates multiple operations. For example, cart 770 and lift 776 are shown to cooperate to position carriage 764 in contact with bracket 648 of a rib 572. Also, robot arm 750, which extends from carriage 764, is shown to have its end effector 752 holding a shim 756 for installation into shim location 758. The various components of the cart 770 and robot arm 750 are shown in simplified, partially schematic form, for ease of explanation. Cabling and wiring, such as to provide power to the robot arm 750 and/or cart 770 from an external or integrated power source (not shown), and so forth, are not illustrated in this view.

FIG. 16A also shows a shim feeder line schematically represented at 780, which, in the illustrated embodiment, is configured to supply shims 756 for installation by robot arm 750. In some embodiments, shim feeder line 780 is configured to dynamically fabricate shims 756 for installation, such as responsive to signals or communications provided by an operator and/or controller 778, based on input received from an end effector 752 configured to measure or otherwise assess each gap that is encountered during an analysis.

As such, it can be seen that an example operation of automatic shim installation for a wing assembly may proceed by assessing each of a sequence of locations in a wing assembly, such as each of a series of locations in which, for example, prior analysis indicates that a shim location 758 exists (or may exist), or the entirety of each of the joints between components that are joined together, and so forth. In one example, the carriage 764 of the robot arm 750 is sequentially coupled with the bracket 648 of each of several ribs 572 installed to a wing panel 550, to perform detection and analysis of each gap, and/or shim installation for each shim location 758, in the space bounded by one or two adjacent ribs 572. This space is also referred to as a bay 790. As noted above, in such an example, the carriage 764 may move along the bracket 648 to allow inspection and/or installation of the entire length of the rib 572, or at least the sides of the ribs (or rib) that define the bay in which the robot arm 750 is mounted. In the embodiment shown in FIG. 16A, five ribs 572 (also individually indicated as 572-1, 572-2, 572-3, 572-4, and 572-5), are shown installed to upper wing panel 550-1, forming six bays 790 (which are only individually indicated, as 790-1, 790-2, 790-3, 790-4, 790-5, and 790-6). Carriage 764 is shown coupled to the bracket 648 of rib 572-4, allowing end effector 752 of robot arm 750 to inspect and/or install shims 756 not only to the side of rib 572-4 to which the bracket 648 is installed, but also to one side of the next adjacent rib (that is, rib 572-3), and any other location accessible in bay 790-4. Accordingly, by coupling the carriage 764 of the robot arm 750 to the bracket 648 of each rib 572, shim installation may be performed in each bay 790-1, 790-2, etc. In a bay in which there is not a bracket 648 to which carriage 764 may be coupled, such as bay 790-6 in FIG. 16A, gap inspection and/or shim installation may be performed by moving the robot arm 750 by means of the cart body 774 and telescopic lift 776. In other embodiments, additional brackets may be installed in order to allow inspection and/or shim installation solely by means of a bracket-mounted robot arm 750. There may be more or fewer ribs (and correspondingly more or fewer bays) in different wing assemblies. In some embodiments, the robot arm 750 is coupled with a bracket 648 of a rib 572 prior to the rib being placed against the wing panel.

In some cases, a shim location 758 may be detected and/or assessed from both sides of a rib 572, in which case shim installation may be performed from whichever side enables a more efficient operation. In some embodiments, multiple robot arms are simultaneously deployed on the same wing assembly, which (among other benefits) may facilitate efficient shim installation in shim locations that may be fillable from either side. In some of such embodiments, a single cart may facilitate the positioning (and re-positioning) of each of multiple robot arms, such as by lifting a carriage of a first robot arm into place for mounting on a first bracket, then disengaging from the carriage to leave the robot arm on the first bracket, then moving to engage a carriage of a second robot arm, such as to move it into place for mounting on a second bracket (e.g., in a different bay), and so forth.

In FIG. 16B, as noted above, wing assembly 600 is shown to also include lower wing panel 550-2. Also, the telescopic lift 776 is shown to extend through an access port 792 in the lower wing panel 550-2 in order to access the bracket 648, such as to couple (or de-couple) carriage 764 to (or from) the bracket. Access port 792 may have been installed at an upstream work station 520, such as cut-out station 526 as shown in FIG. 5A. Access port 792 is sized to allow insertion and subsequent removal of robot arm 750 (including carriage 764). To minimize the size of access port 792, robot arm 750 may be extended, or folded, or otherwise aligned into a configuration having a minimal cross-section for insertion and withdrawal through the access port. Alternatively, robot arm 750 may be sized and/or configured specifically to fit through a predetermined access port size. Lower wing panel 550-2 is shown to include several access ports 792, one for each bay, to allow a robot arm 750 to be inserted and then coupled in order to perform inspection and/or shim installation in each bay. In one embodiment, the sides of the two ribs that define a bay are inspected and/or shimmed by the robot arm 750 while it is disposed within that bay, which reduces the number of times that the robot arm 750 is aligned with the access port 792 for insertion or removal.

In some embodiments, FIGS. 16A and 16B depict two phases of a sequential operation, in which installation of shims 756 (e.g., upper shims) to shim locations 758 between ribs 572 and the lower surface of the upper wing panel 550-1 is first performed (as shown in FIG. 16A), followed by installation of the lower wing panel 550-2 to the wing assembly 600, followed by installation of shims (e.g. lower shims) to shim locations between ribs 572 and the upper surface 574 of the lower wing panel 550-2 (as shown in FIG. 16B). In other words, in such embodiments, the lower wing panel 550-2 is installed after the upper shims are installed. In other embodiments, FIGS. 16A and 16B depict alternative operations—for example, FIG. 16A may represent the first stage of the sequential operation described above, whereas FIG. 16B may represent an operation in which lower wing panel 550-2 is installed to the wing assembly 600 before installation of any (upper or lower) shims 756. In either case, the robot arm 750 may be moved from bay to bay along the length of the wing assembly by means of the cart 770 in order to perform shim installation in each bay. As described above, in some embodiments, multiple robot arms are deployed for shim location detection and/or analysis, and/or shim installation, in more than one bay, at the same time.

FIG. 16C depicts a view of a rib 572 to which the carriage 764 of robot arm 750 is installed—specifically, rib 572-4 as shown in FIG. 16A—and thus corresponds with view arrows 16C of FIG. 16A. However, the components illustrated in FIG. 16C are applicable to any rib 572 in the illustrated embodiment. Only carriage 764 of the robot arm is shown in FIG. 16C, for clarity, and components of the strongback (e.g. pogos and vacuum couplers) are also not shown in this view. FIG. 16C provides a view of an illustrative example configuration of bracket or stiffener 648, which is shown to be installed against the web 646 of the rib 572. More specifically, the bracket 648 is shown to be mated with indexing features at the rib 572, which are generically shown as indexing features 794. The indexing features may facilitate alignment of the bracket 648 with the rib 572 during installation thereto, and may take any suitable form, such as through-holes in web 646 that are configured to receive fasteners such as bolts. FIG. 16C further illustrates that the bracket 648 comprises a rack 796 having teeth 798 to which the carriage 764 is clamped or otherwise removably attached. The carriage 764 is configured to utilize the teeth 798 to translate back and forth along the bracket 648 in a controllable and indexed manner (e.g., via a driven mechanism that engages the teeth, such as a pinion, a worm gear, and so forth). The position of the robot arm may thus be indexed with respect to a rib, such as the rib to which the carriage of the robot arm is coupled, based on a position of the bracket 648 (or relative to the bracket 648), and a position of the carriage 764 along the bracket 648. Although not required to all embodiments, bracket 648 in FIG. 16C is also shown to include a centering feature 654 that may facilitate indexing, such as by enabling more rapid determination the position of the carriage to a known reference point.

In one embodiment, the carriage 764 is operable to drive the robot arm (not shown) along the bracket 648 via a rack-and-pinion system in which the teeth 798 form the rack. Other embodiments of bracket 648 and/or carriage 764 have a different configuration to enable movement of carriage 764 along the bracket. In the illustrated embodiment, the carriage 764 is also capable of rotation, as shown by arrow 1012, in order to enhance movement of, and access by, the robot arm.

FIG. 16C also shows a representative pair of spars 580 installed to the upper wing panel 550-1, at either end of the rib 572. The spars 580 are illustrated in a simplified form and thus are not shown to include, for example, specialized upper and lower cap shapes that facilitate fastener connections to a wing panel. Teeth 798 are shown to extend sufficiently toward the ends of the bracket 648, which in this embodiment is coterminous with the rib 572 to which it is installed, to allow the carriage 764 to move close enough to the spars so that gap assessment and/or shim installation by the robot arm may be performed at the joint(s) between the spar and the wing panel(s), and/or at the joint between the spar and the rib. In further embodiments, the bracket 648 facilitates track mounting of a collar and/or nut installer. This may be particularly beneficial in circumstances where a lower wing panel is already installed and access is only available through access ports. Also, although the rib 572 and wing panel 550 are not shown to accurate scale or dimension, FIG. 16C shows that a number of gaps exist between the rib 572 and the lower surface 576 of the upper wing panel 550-1, such as at representative shim location 758.

As noted above, in some embodiments, the robot arm 750 performs operations in addition to shim installation, such as detection and/or inspection of gaps to facilitate the identification of shim locations 758. In some embodiments, the robot arm performs additional operations including sealing, sealant inspection, fastener installation, collar or nut installation on fasteners, collar or nut installation inspection, and so forth. The robot arm 750 may perform such operations via a selection of interchangeable end effectors 752 (which, for example, may be exchanged while the carriage 764 of the robot arm 750 is coupled to the bracket 648, such as via an access port 792), or performed with multi-functional end effectors 752, or with multiple robot arms 750 that can each be installed and left in place on a bracket, in some cases with more than one such robot arm coupled to a bracket. The robot arm 750 may be operated automatically or remotely via a floor-based controller that enables a technician to operate the robot arm (e.g., via remote control). After completing its work, a robot arm 750 can be re-attached to the cart 770 and removed.

Figure 17B:
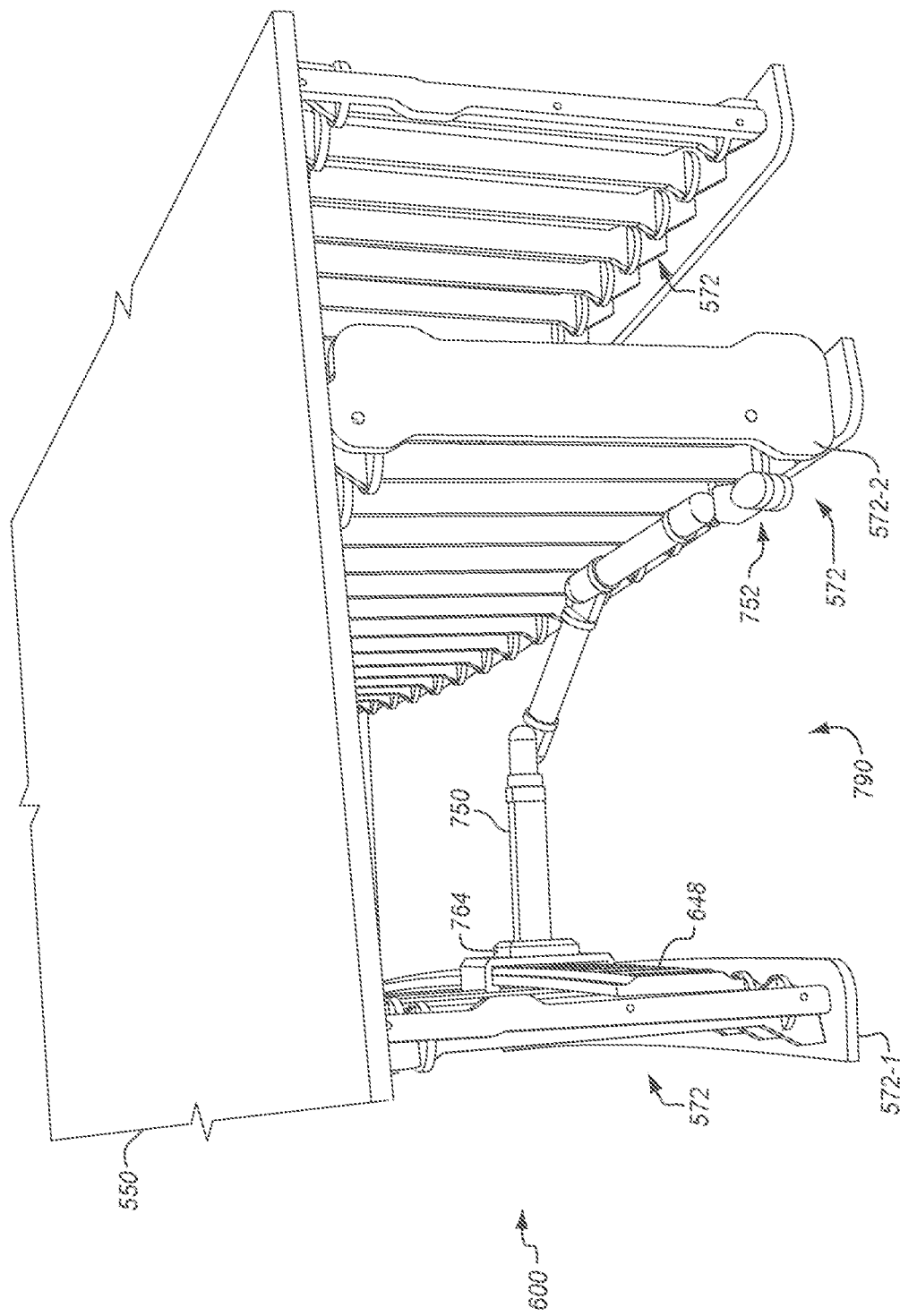
Figure 17C:
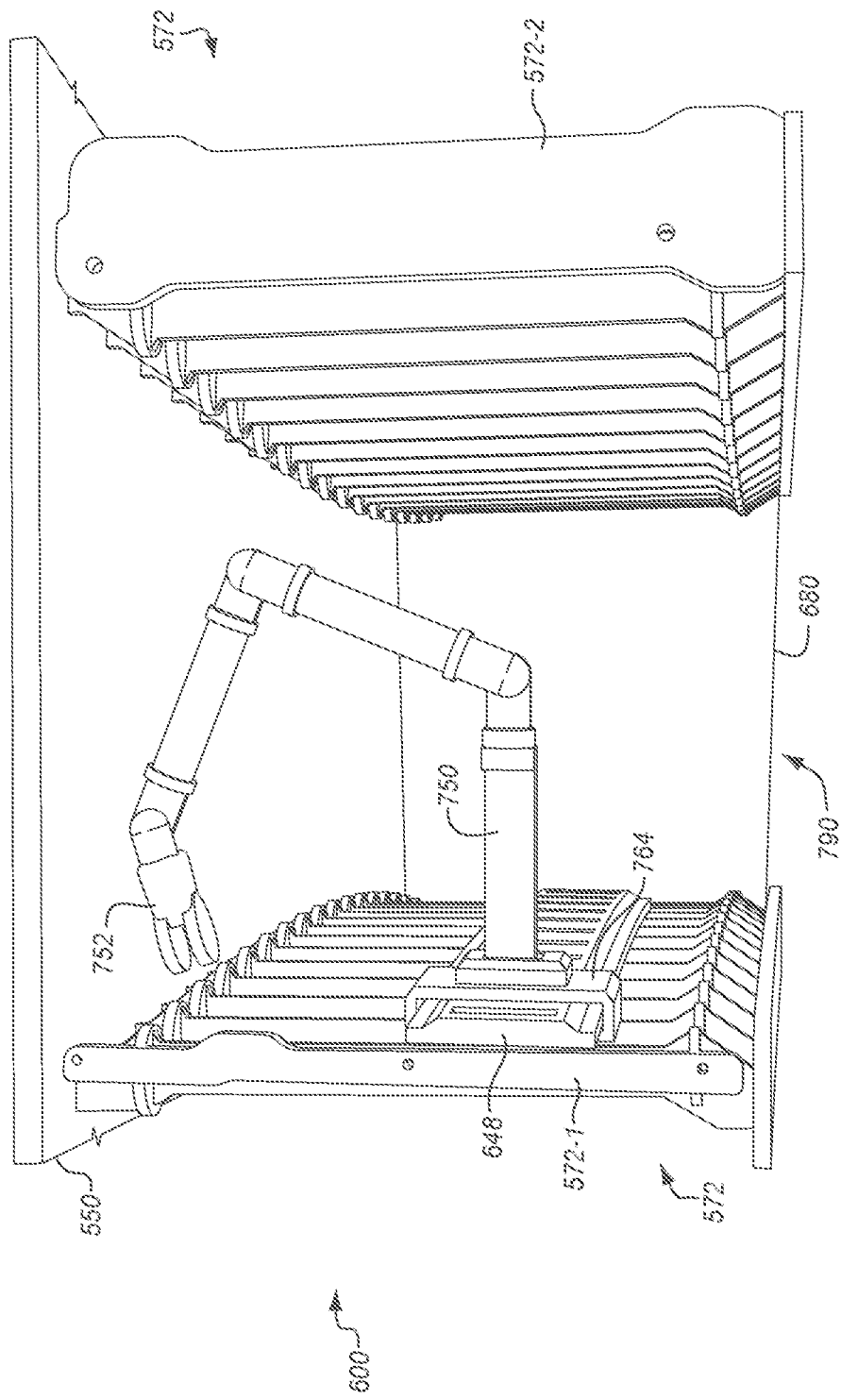

FIGS. 17A-17C are perspective views of robot arms 750 each operating to inspect gaps, install shims 756 in shim locations 758, install sealant or collars/nuts, and so forth, in a bay 790 disposed between two ribs 572 and bounded on one side by a spar 580 of an example wing assembly 600. In the embodiments depicted in these drawings, a technician sets up, operates, and maintains the robot arm 750, after placement of the carriage 764 of the robot arm on a bracket 648 via a cart (not shown). For simplicity, the following discussion assumes that the robot arm 750 operates in the same bay 790, between the same two ribs 572 (individually numbered as 572-1 and 572-2), in each of this series of drawings. In FIG. 17A, the robot arm 750 is mounted on a bracket 648 installed against rib 572-1, and operates its end effector 752 to inspect ribs 572 placed against an upper wing panel 550, and specifically a location between rib 572-2 and the surface of the wing panel 550 against which it is positioned. Based on the inspection, the robot arm 750 will selectively install shims 756 at shim locations 758 within the bay. In FIG. 17B, the carriage 764 of the robot arm 750 has progressed along the bracket 648 to a position closer to the end of the bracket as compared to its position in FIG. 17A, and is shown using its end effector 752 to inspect a location near the bottom of rib 572-2. In FIG. 17C, the robot arm 750 has used its end effector 752 to place a shim (not shown) at a shim location 758 above bracket 648, where rib 572-1 is affixed to upper wing panel 550. With the shim in place, fasteners may be installed through the upper wing panel 550 and the rib 572-1 to secure the wing panel to the rib, or at least the portions thereof that are local to the shim, with the shim in place. In some embodiments, a shim is fastened in place by means of one or more fasteners; in some embodiments, a shim is instead held in place in a friction fit due to the fastening of the rib to the wing panel.

Figure 18:
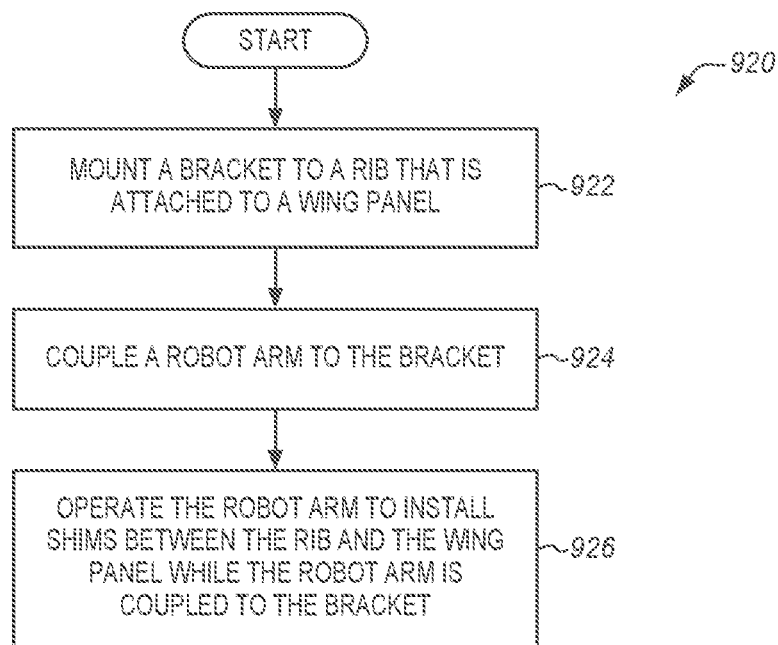
FIG. 18 is a flowchart illustrating a method of shim installation using a robot arm in an illustrative embodiment.

With the aforementioned components and concepts in mind, FIG. 18 is a flowchart illustrating a method 920 for operating a robot arm (such as robot arm 750) to perform tasks related to wing assembly (such as in a wing assembly 600) in an illustrative embodiment. Step 922 includes mounting a bracket 648 to a rib 572. In some embodiments, this is done prior to holding or placing the rib against a wing panel 550, such as after demolding the rib and during (or after) other preparation of the rib for installation to the wing panel. In some embodiments, this is done after holding or placing the rib against the wing panel. Mounting the bracket 648 may be facilitated by aligning the bracket with indexing features of the rib 572 (e.g., complementary cup-and-cone features, through-holes for receiving bolts, and so forth). Once mounted, the bracket 648 enforces a desired contour, such as a flat contour, onto the rib 572. In some embodiments, the bracket is removably mounted.

After the bracket 648 has been mounted to the rib 572, step 924 includes coupling a robot arm 750 to the bracket. In some embodiments, this is performed by detachably mounting a carriage 764 on the bracket. In some of such embodiments, a wheeled cart 770 that is outfitted with a telescopic lift 776 configured to support the carriage is deployed, for example for moving the carriage into a suitable orientation and/or position for mounting on the bracket. The coupling of the robot arm 750 to the bracket 648 may be accomplished via clamping, suction, magnets, mechanical alignment with a track on the bracket, and so forth. In some embodiments, the coupling is configured to allow the robot arm 750 to move relative to the bracket 648, such as by means of a carriage 764 configured for movement along the bracket. In some of such embodiments, the bracket includes teeth that facilitate a rack and pinion system with the carriage. With the carriage 764 and/or the robot arm 750 coupled to the bracket 648, a location of the robot arm 750 within the reference system of the wing assembly 600 (e.g., relative to one or more components of the wing assembly, such as a wing panel, or a rib, or a bracket mounted to the rib, or a spar, and so forth) is known. In that sense, coupling the robot arm 750 to the bracket 648 may include indexing the position of the robot arm relative to the bracket.

Once coupled, in step 926, the robot arm 750 is operated to install one or more shims between the rib and the wing panel, at the rib to wing panel interface (i.e. while the robot arm is coupled to the bracket 648, via the carriage 764). As explained above, this may include moving the robot arm 750 (e.g., by driving the carriage 764) along a length of the bracket 648, in order to align the robot arm 750 with shim locations at the rib, and/or move the robot arm within range of additional shim locations.

In some embodiments of the method 920, the robot arm is operated, via a suitably configured end effector, to inspect the rib to wing panel interface, such as to detect, inspect, and/or measure gaps between the components. In some of such embodiments, the result of a measurement is communicated, e.g. to a technician or a controller, to determine whether a particular gap exceeds a shimming tolerance threshold, which may represent an out of tolerance condition, and thus is considered to be a shim location (into which a shim is installed). In some of such embodiments, the result of a measurement is used to select a suitable shim to be installed, e.g., by size, dimension, taper, or other characteristic, to rectify the out of tolerance condition.

Shims 756 may be supplied via a shim feeder line in any suitable manner. For example, a selection of shims (e.g. of differing tapers and/or sizes, etc.) may be stocked in a bin accessible to the robot arm. In some embodiments, a new shim is dynamically fabricated, or a pre-fabricated shim is adjusted (e.g., trimmed), such as based on inspection and/or measurement of the gap, and then delivered for insertion into the shim location 758 and provided just in time for placement.

After the shim 756 has been installed, the method may further include retracting the robot arm 750, and moving the carriage 764 to a new location along the bracket 648 for further shim installation and/or other operations. If shim 756 installation into shim locations 758 accessible from the bracket 648 is complete, then the carriage 764 may be decoupled from the bracket, and moved to a new location (such as to the bracket of another rib). In some embodiments, this is facilitated with a wheeled cart outfitted with a telescopic lift. In some embodiments, this involves removing the robot arm 750 through an access gap, such as in a lower wing panel 550-2.

As can be appreciated with respect to the description above of FIGS. 16A through 17C, method 900 may be employed in a wing assembly 600 that includes a variety of components and configurations. For example, although described in the context of an embodiment in which one rib is held against a wing panel, the method may be employed iteratively in a wing assembly that includes multiple ribs held against the wing panel. In other words, once steps 922, 924, and 926 are performed to install shims in shim locations between a first rib and a wing panel, the steps may be repeated to install shims to shim locations between a second rib and the wing panel. Method 900 may further be employed in a wing assembly 600 in which multiple ribs 572 are held at their upper edges against a wing panel, such as an upper wing panel 550-1, and in which another wing panel, such as a lower wing panel 550-2, is held against the opposite (or lower) edges of the ribs. In such a configuration, the lower wing panel 550-2 may be added to the wing assembly prior to, or between, shim installation operations. In one example, the method includes performing steps 922, 924, and 926 first for upper shim locations between the ribs and the upper wing panel, followed by the addition of the lower wing panel to the wing assembly, followed by performing steps 922, 924, and 926 for lower shim locations between the ribs and the lower wing panel. As noted above, subsequent to shim installation between a rib and a wing panel, the rib may be fastened (e.g. installed) to the wing panel. In another example, the method includes performing shim installation on both upper and lower shim locations, for example in a configuration in which the lower wing panel has already been placed. In either of these examples, the method includes repositioning the robot arm, for example to couple the carriage to the brackets of different ribs, by moving (e.g. withdrawing and inserting) the robot arm through access gaps in a wing panel, such as in the lower wing panel.

Figure 19:
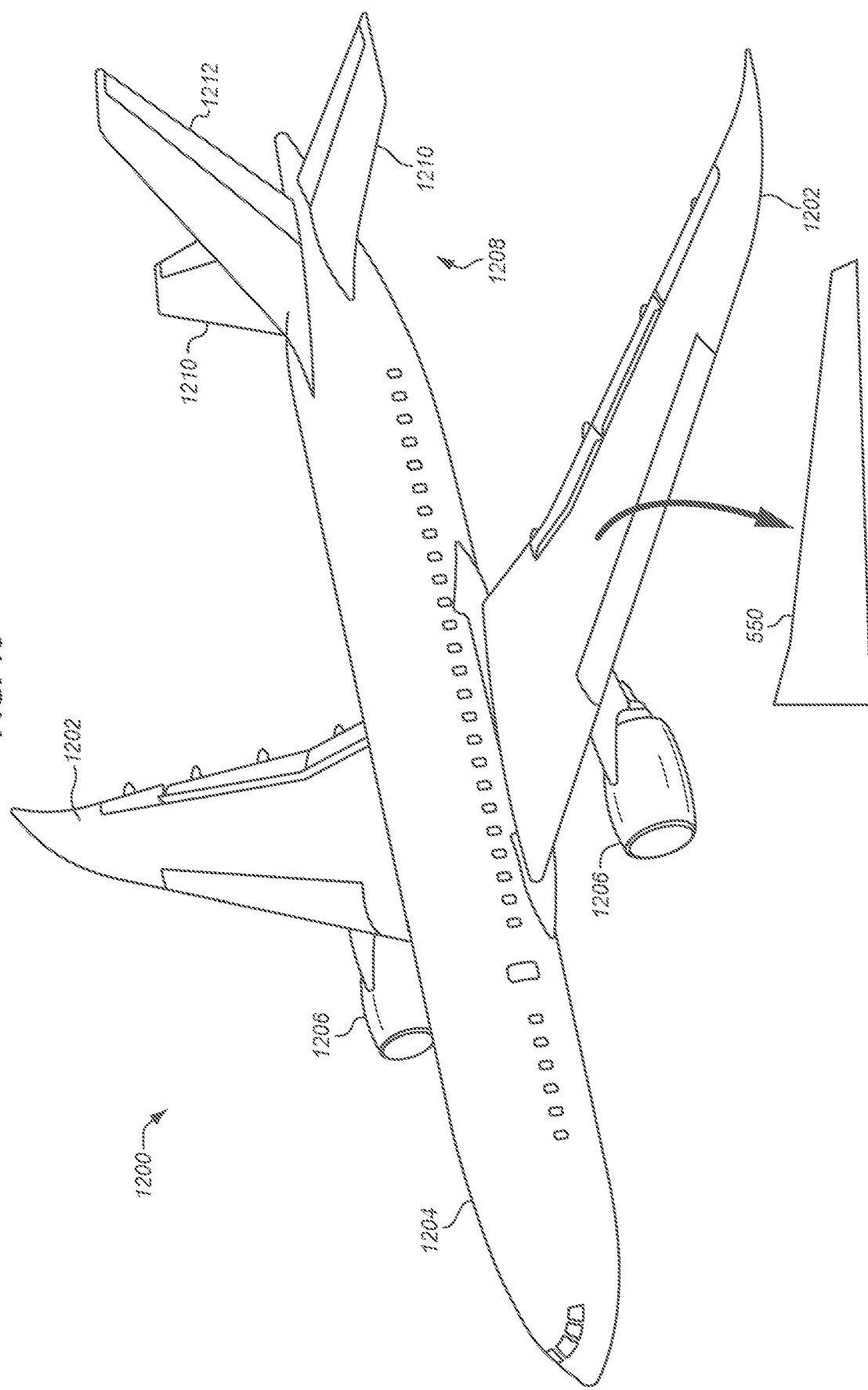
FIG. 19 is a perspective view of an aircraft that includes a fully assembled wing in an illustrative embodiment.

Turning now to FIG. 19, an illustration of a representative aircraft 1200 is depicted in which an illustrative embodiment of a wing panel and/or a wing assembly produced in accordance with aspects of the present disclosure may be implemented. In other words, aircraft 1200 is an example of an aircraft which can be formed using composite parts, wing panels, and/or wing assemblies produced according to one or more aspects of: the illustrative fabrication methods shown in FIG. 1 and FIGS. 2A and 2B; the illustrative schema shown in FIG. 4; the illustrative assembly line 500 shown in FIGS. 5A-5F; the illustrative rib and spar installation techniques shown in 11A-11D; the illustrative shim installation techniques shown in FIGS. 16A-16C and FIGS. 17A-17C; one or more of the methods shown in the remaining drawings; and/or any of the aforementioned as discussed above. In this illustrative example, aircraft 1200 has wings 1202 attached to and extending to either side of a fuselage 1204. Aircraft 1200 includes an engine 1206 attached to each wing 1202. Disposed at the rear end of fuselage 1204 is tail section 1208, which includes an opposed pair of horizontal stabilizers 1210 and a vertical stabilizer 1212. Wings 1202 are formed of an upper wing panel 550 and a lower wing panel (not shown) joined together, with an assembly of ribs and spars (not shown) at least partially forming the interior structure thereof.

Figure 20:
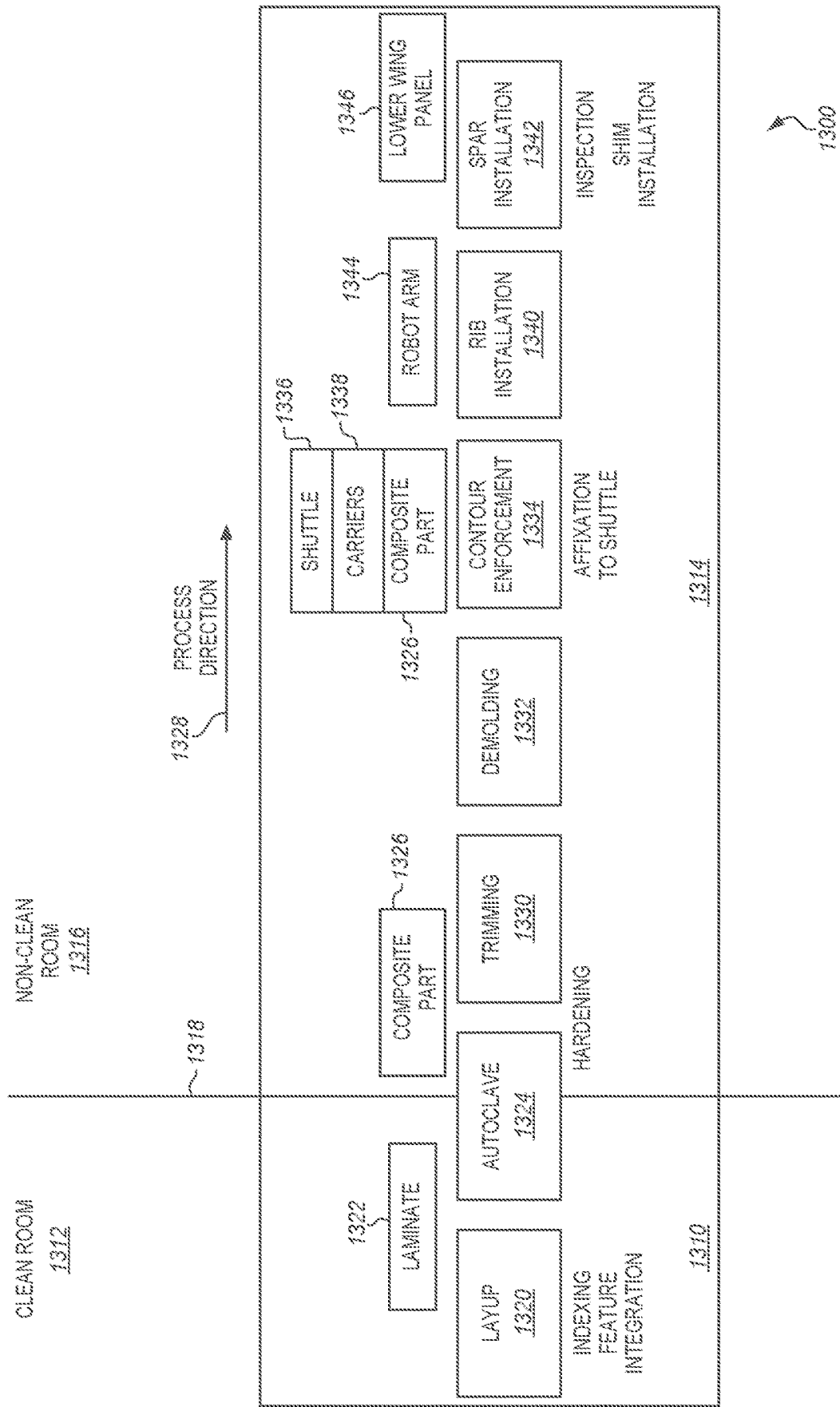
FIG. 20 is a block diagram of various components and systems discussed herein in an illustrative embodiment.

FIG. 20 is a block diagram of various components and systems (or stages) discussed herein in an illustrative embodiment. Specifically, FIG. 20 depicts a factory 1300 that includes a first assembly line 1310 in a clean room environment indicated at 1312, and a second assembly line 1314 in a non-clean room environment 1316. A boundary (e.g., one or more walls or enclosures), represented at 1318, separate the clean room 1312 and non-clean room 1316 environments. At layup 1320, indexing features (such as indexing features 210) are integrated into a laminate 1322 (such as preform 200) for a wing panel. The laminate 1322 is hardened at an autoclave 1324 into a composite part 1326. In accordance with the embodiments herein, the composite part 1326 is a wing panel (e.g., wing panel 550), and more specifically an upper wing panel, but factory 1300 may be configured to fabricate, process, and otherwise do work upon composite parts that take the form of other aircraft components in addition to a wing panel. The composite part 1326 is then transitioned to the assembly line 1314, which in the illustrated embodiment is shown to progress the composite part 1326 in a process direction 1328 through various systems and stages specific to those appropriate for an upper wing panel. For example, at the assembly line 1314, a trimming stage 1330 removes excess material and/or installs additional indexing features into the composite part 1326. At demolding 1332, the composite part 1326 is demolded (e.g., removed from a layup mandrel), after which a contour is enforced onto the composite part 1326 via contour enforcement 1334, in which the composite part 1326 is affixed to a shuttle 1336 (such as one or more strongbacks 540) that includes carriers 1338 (e.g., adjustable-length pogos 545 that include vacuum couplers 548). The shuttle 1336, such as via the carriers 1338, enforce a contour onto the composite part 1326 as the composite part is advanced along the assembly line 1314. Ribs and spars are installed onto the composite part 1326 as it is progressed through rib installation 1340 and spar installation 1342. Inspection of the rib and spar assembly, and shim installation, is performed by a robot arm 1344, as needed. A lower wing panel 1346 is then attached to form a wing assembly (e.g., wing assembly 600). The various systems and stages described with regard to factory 1300 may incorporate or be in the form of the various work stations 520 discussed above. Moreover, not all of the work stations 520 described above are specifically shown in FIG. 20, for simplicity, although the assembly line 1314 may include such stations as one or more NDI stations 524, cut out stations 526, and so forth. Other operations described above with respect to FIG. 20 may incorporate or be in the form of one or more of the feeder, layup, or assembly lines shown in schema 480 and shown in FIG. 4; for example, trimming 1330 and demolding 1332 may take place in a demolding operation 490-11.

Figure 21:
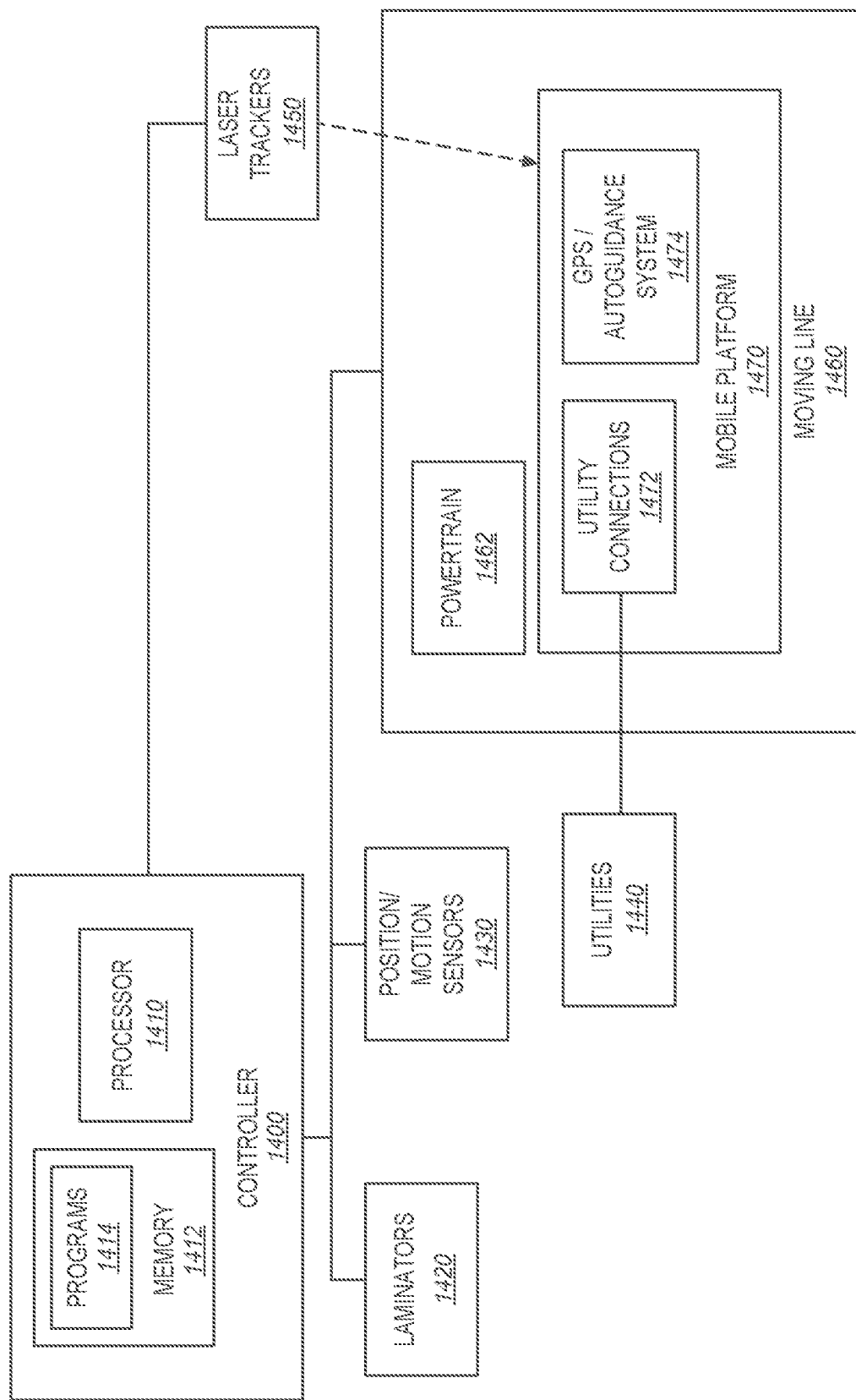
FIG. 21 broadly illustrates control components of a production system that performs ultrasonic inspection in an illustrative embodiment.

Attention is now directed to FIG. 21, which broadly illustrates control components of a production system that performs (e.g. continuously) lamination and/or ultrasonic inspection in an illustrative embodiment. A controller 1400 coordinates and controls operation of laminators 1420 and movement of one or more mobile platforms 1470 along a moving line 1460 having a powertrain 1462. The controller 1400 may comprise a processor 1410 which is coupled with a memory 1412 that stores programs 1414. In one example, the mobile platforms 1470 are driven along a moving line 1460 that is driven continuously by the powertrain 1462, which is controlled by the controller 1400. In this example, the mobile platform 1470 includes utility connections 1472 which may include electrical, pneumatic and/or hydraulic quick disconnects that couple the mobile platform 1470 with externally sourced utilities 1440. In other examples, as previously mentioned, the mobile platforms 2470 may comprise, e.g., mandrels and/or other tools, parts, supplies, and so forth, on automated conveyances such as Automated Guided Vehicles (AGVs) that include on board utilities, as well as a GPS/autoguidance system 1474. In still further examples, the movement of the mobile platforms 1470 is controlled using laser trackers 1450. Position and/or motion sensors 1430 coupled with the controller 1400 are used to determine the position of the mobile platforms 1470 as well as the powertrain 1462.

Figure 22:
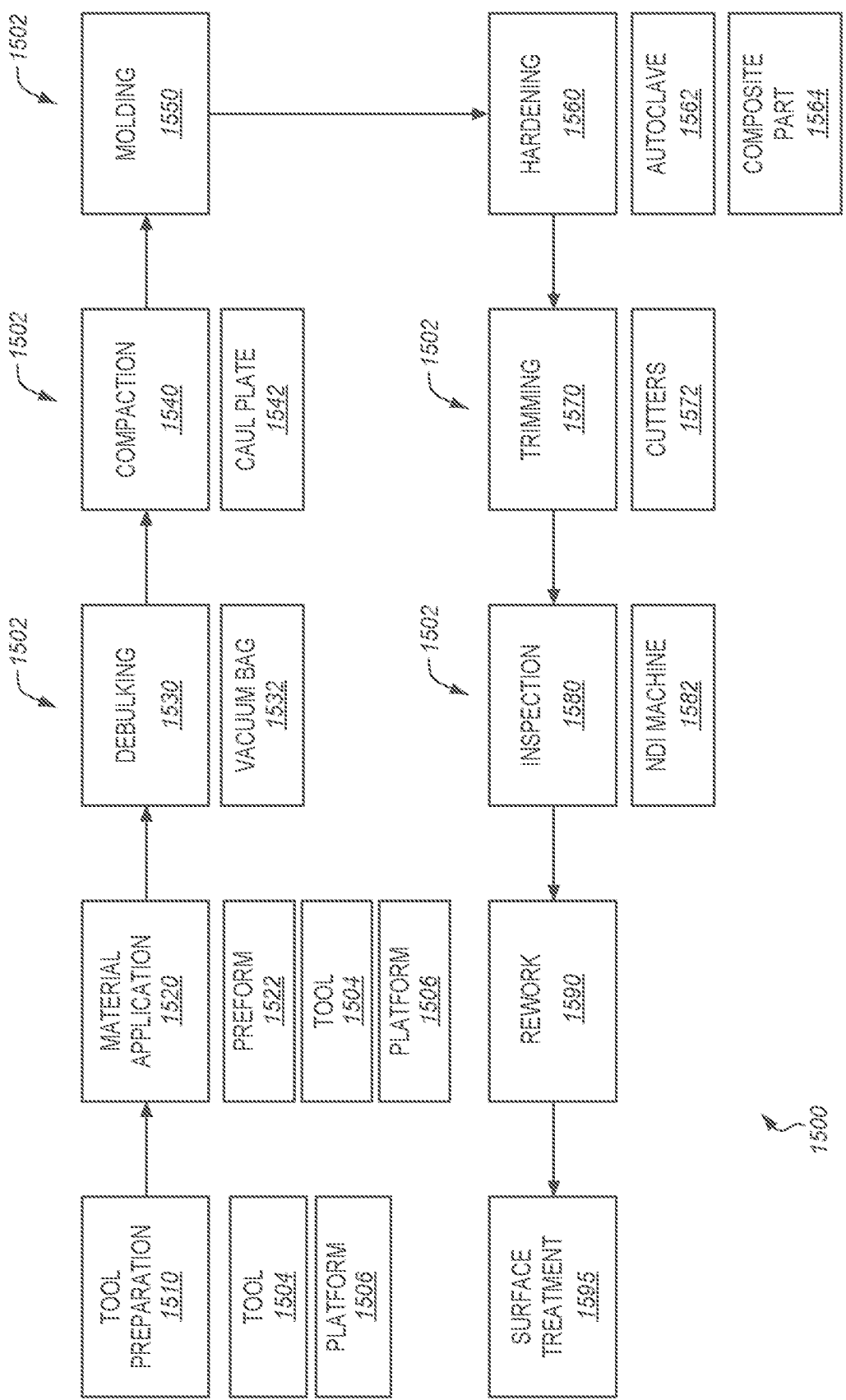
FIG. 22 depicts an assembly line in an illustrative embodiment.

FIG. 22 depicts a view of an assembly line 1500 in an illustrative embodiment (e.g., of a continuous assembly line), in terms of a progression of work zones 1502 arranged along a moving line and configured to perform a variety of operations. The work zones include a work zone for tool preparation 1510 involving cleaning of, or application of coatings and/or potting compound to, or repairs to, a tool 1504 (e.g., layup mandrel 110), following which the tool 1504 is transported on a platform 1506 to additional work zones 1502. The additional work zones include a work zone for material application 1520 (e.g., where lamination operations are performed) in order to form a preform 1522 (such as preform 200). The preform 1522 may then be delivered via the assembly line 1500 to downstream work zones, including a work zone for debulking 1530 and, a work zone for compaction 1540, and a work zone for molding 1550. Debulking and/or compacting the preform 1522 may comprise vacuum compaction performed via a vacuum bag 1532. Molding the preform 1522 may be performed via precure forming, and/or via a combination of molding between the tool 1504 and a caul plate 1542.

The preform 1522 is further moved to work zone for hardening 1560 the preform 1522 into a composite part 1564 (e.g., composite part 250, which may be in the form of a wing panel 550), such as at an autoclave 1562, a work zone for trimming 1570 (e.g., via cutters 1572) the composite part 1564, a work zone for inspection 1580 (e.g., via an NDI machine 1582) of the composite part 1564, a work zone for rework 1590, and/or a work zone for surface treatment 1595.

In one embodiment, the trimming process may involve mass trimming of the preform 1522 before it is hardened, followed by more specific trimming after the composite part 1564 has been formed. Inspection of the composite part 1564 may include visual inspection as well as inspection using NDI (nondestructive inspection) equipment. Although reworking the composite part 1564 along the assembly line 500 is possible, in many cases the composite part 1564 may not require rework. The composite part 1564 then proceeds in process direction 541 through assembly line 500.

Examples

In the following examples, additional processes, systems, and methods are described in the context of a fabrication and assembly system for wings for aircraft.

Figure 23:
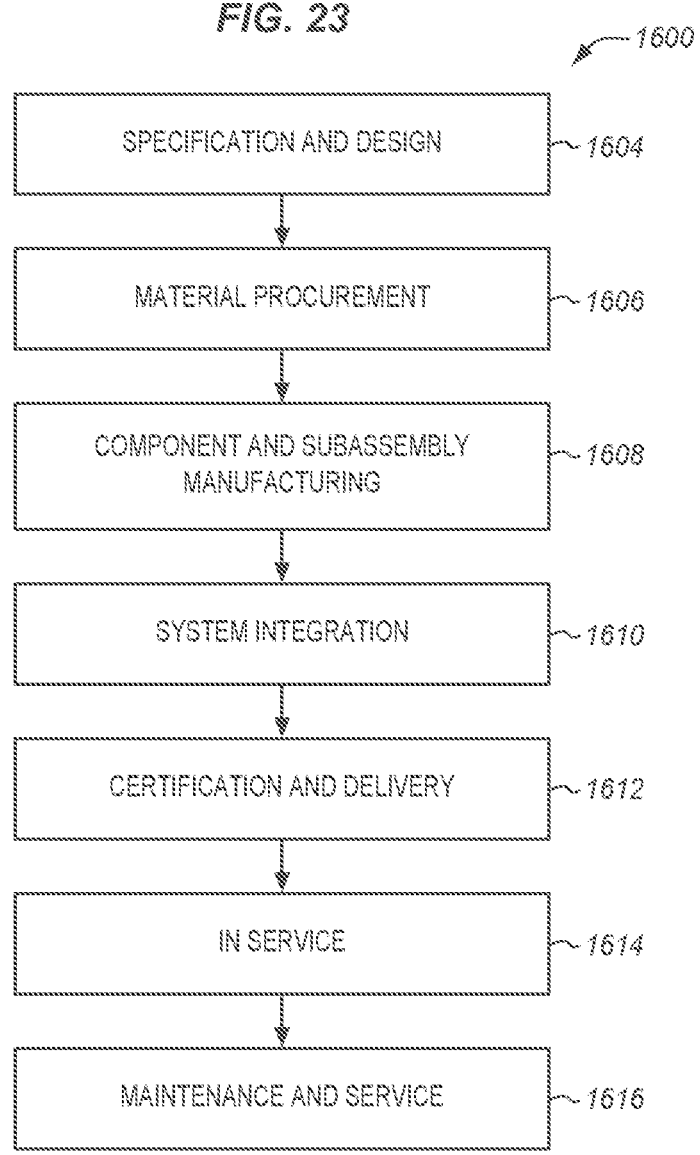
FIG. 23 is a flow diagram of aircraft production and service methodology in an illustrative embodiment.
Figure 24:
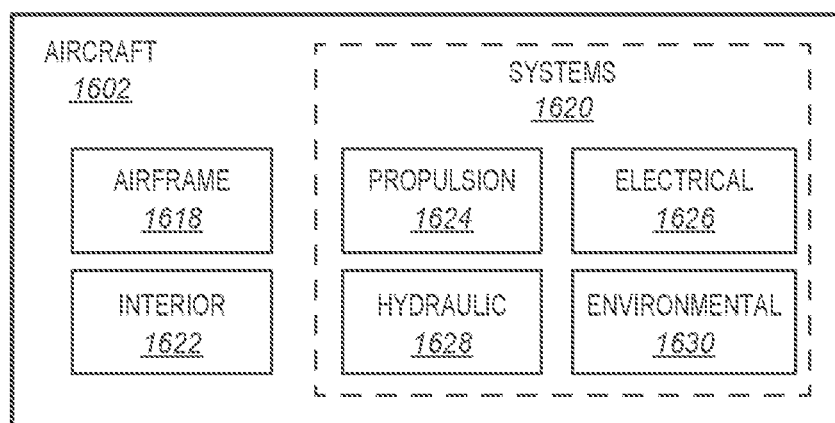
FIG. 24 is a block diagram of an aircraft in an illustrative embodiment.

Referring more particularly to the drawings, embodiments of the disclosure may be described in the context of aircraft manufacturing and service in method 1600 as shown in FIG. 23 and an aircraft 1602 as shown in FIG. 24. During pre-production, method 1600 may include specification and design 1604 of the aircraft 1602 and material procurement 1606. During production, component and subassembly manufacturing 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine work in maintenance and service 1616 (which may also include modification, reconfiguration, refurbishment, and so on). Apparatus and methods embodied herein may be employed during any one or more suitable stages of the production and service described in method 1600 (e.g., specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion system 1624, electrical system 1626, hydraulic system 1628, environmental 1630).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 1602 produced by method 1600 may include an airframe 1618 with a plurality of systems 1620 and an interior 1622. Examples of systems 1620 include one or more of a propulsion system 1624, an electrical system 1626, a hydraulic system 1628, and an environmental system 1630. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1600. For example, components or subassemblies corresponding to component and subassembly manufacturing 1608 may be fabricated or manufactured in a manner similar to components or subassemblies produced while the aircraft 1602 is in service. Also, one or more apparatus embodiments, method embodiments, or a combination thereof may be utilized during the subassembly manufacturing 1608 and system integration 1610, for example, by substantially expediting assembly of or reducing the cost of an aircraft 1602. Similarly, one or more of apparatus embodiments, method embodiments, or a combination thereof may be utilized while the aircraft 1602 is in service, for example and without limitation during the maintenance and service 1616. Thus, the invention may be used in any stages discussed herein, or any combination thereof, such as specification and design 1604, material procurement 1606, component and subassembly manufacturing 1608, system integration 1610, certification and delivery 1612, service 1614, maintenance and service 1616) and/or any suitable component of aircraft 1602 (e.g., airframe 1618, systems 1620, interior 1622, propulsion system 1624, electrical system 1626, hydraulic system 1628, and/or environmental 1630.

In one embodiment, a part comprises a portion of airframe 1618, and is manufactured during component and subassembly manufacturing 1608. The part may then be assembled into an aircraft in system integration 1610, and then be utilized in service 1614 until wear renders the part unusable. Then, in maintenance and service 1616, the part may be discarded and replaced with a newly manufactured part. Inventive components and methods may be utilized throughout component and subassembly manufacturing 1608 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for assembling a wing, the method comprising: mounting a stiffener to a rib of the wing that enforces a desired contour onto the rib; providing a sole support to a robot arm by coupling the robot arm to the rib of the wing via the stiffener on the rib; and operating the robot arm to install one or more shims between the rib and a panel of the wing while the robot arm is coupled to the stiffener.

2. The method of claim 1, further comprising indexing a position of the robot arm relative to the stiffener.

3. The method of claim 1, further comprising driving the robot arm along the stiffener to align the robot arm with shim locations along a rib to panel interface.

4. The method of claim 1, further comprising delivering the one or more shims via a feeder line to the robot arm.

5. The method of claim 1, wherein the panel is an upper wing panel held against an upper edge of the rib, and wherein the method further comprises, subsequent to operating the robot arm to install the one or more shims between the rib and the upper wing panel, holding a lower wing panel against a lower edge of the rib.

6. The method of claim 5, further comprising operating the robot arm to install the one or more shims between the rib and the lower wing panel while the robot arm is coupled to the stiffener.

7. The method of claim 1, further comprising mounting the stiffener to the rib.

8. The method of claim 7, further comprising holding the rib against the panel of the wing.

9. The method of claim 7, wherein mounting the stiffener to the rib comprises aligning the stiffener with indexing features at the rib.

10. The method of claim 7, wherein the stiffener is detachably mounted to the rib.

11. The method of claim 1, wherein the robot arm is detachably coupled to the stiffener.

12. The method of claim 11, further comprising decoupling the robot arm from the stiffener subsequent to operating the robot arm to install the one or more shims.

13. The method of claim 12, further comprising iteratively coupling the robot arm, and operating the robot arm to install the one or more shims, for each of a plurality of ribs held against the panel of the wing.

14. The method of claim 1, further comprising inspecting a rib to panel interface.

15. The method of claim 14, wherein inspecting the rib to panel interface is performed by operating the robot arm.

16. The method of claim 14, wherein inspecting the rib to panel interface is performed via an end effector of the robot arm to identify locations for shims.

17. The method of claim 14, further comprising determining whether a gap at the rib to panel interface is greater than a shimming tolerance threshold.

18. The method of claim 17, further comprising selecting a shim based on a size of a gap that is greater than the shimming tolerance threshold.

19. The method of claim 17, further comprising fabricating a shim based on a size of the gap that is greater than the shimming tolerance threshold.

20. The method of claim 1, further comprising fastening the rib to the panel.

21. The method of claim 20, wherein fastening the rib to the panel is performed subsequent to operating the robot arm to install the one or more shims.

22. The method of claim 21, wherein fastening the rib to the panel is performed subsequent to operating the robot arm to install all of the one or more shims.

23. A method of shimming a rib of an aircraft, the method comprising: attaching a stiffener on to the rib; enforcing a desired contour onto the rib using the stiffener; holding the rib against a wing panel; coupling a robot arm to the stiffener; and operating the robot arm and installing one or more shims between the rib and the wing panel while the robot arm is solely supported by the stiffener.

24. A non-transitory computer readable medium that comprises programmed instructions configured to control an assembly system for a wing, such that the assembly system comprises: a robot arm; a stiffener, configured to provide a sole support for the robot arm, attached to a rib of the wing and coupled to the robot arm, wherein the stiffener is configured to enforce a desired contour onto the rib; and the robot arm configured to install one or more shims between the rib and a panel of the wing, operating the robot arm to install the one or more shims between the rib and a wing panel while the robot arm is coupled to the stiffener.

25. A method of assembling a portion of an aircraft, the method comprising a processor executing programmed instructions stored on a computer readable medium and controlling: attaching a stiffener to a rib; enforcing a desired contour onto the rib using the stiffener; holding the rib against a wing panel; coupling a robot arm to and solely supporting the robot arm on the stiffener; and operating the robot arm to install one or more shims between the rib and the wing panel while the robot arm is coupled to the stiffener.

26. A system configured to assemble a wing, such that the system comprises: a carriage coupled to a stiffener on a rib and solely supported by the stiffener; wherein the stiffener is removably attached to the rib and configured to enforce a desired contour onto the rib; a robot arm that extends from the carriage and is configured to inspect a gap at an interface between the rib and a wing panel; and wherein the carriage is configured as a sole support for the robot arm.

27. A method of fabricating a portion of an aircraft, the method comprising: attaching a stiffener to a rib of the aircraft; enforcing a desired contour onto the rib using the stiffener; solely supporting a robot arm comprising an end effector by coupling a carriage supporting the robot arm to the stiffener; wherein the carriage is solely supported by the stiffener; extending the robot arm from the carriage; and using the end effector to inspect an interface between the rib and a wing panel and install a shim at the interface.

28. A method of fabricating a portion of an aircraft, the method comprising: attaching a stiffener to a first rib of the aircraft; enforcing a desired contour onto the first rib using the stiffener; providing sole support for a robot arm by mounting the robot arm comprising an end effector on the first rib via the stiffener; and performing work upon an interface between a second rib and a panel of a wing of the aircraft using the end effector, the work being selected from a group consisting of: inspecting the interface, installing a shim at the interface, and installing fasteners at the interface.

* * * * *